(12) United States Patent
Ninomiya et al.

(10) Patent No.: US 7,715,695 B2
(45) Date of Patent: May 11, 2010

(54) APPARATUS FOR MANAGING REMOVABLE STORAGE MEDIA THAT CAN BE CONNECTED THERETO, AND METHOD, PROGRAM, AND SYSTEM LSI FOR MANAGING REMOVABLE STORAGE MEDIA

(75) Inventors: Masako Ninomiya, Hiroshima (JP); Youichi Yamamoto, Hiroshima (JP)

(73) Assignee: Panasonic Corporation, Osaka (JP)

( * ) Notice: Subject to any disclaimer, the term of this patent is extended or adjusted under 35 U.S.C. 154(b) by 1408 days.

(21) Appl. No.: 10/533,552

(22) PCT Filed: Nov. 26, 2003

(86) PCT No.: PCT/JP03/15056

§ 371 (c)(1),
(2), (4) Date: May 3, 2005

(87) PCT Pub. No.: WO2004/049151

PCT Pub. Date: Jun. 10, 2004

(65) Prior Publication Data

US 2006/0028936 A1    Feb. 9, 2006

(30) Foreign Application Priority Data

Nov. 26, 2002   (JP)   ............................. 2002-342443

(51) Int. Cl.
H04N 7/64   (2006.01)
(52) U.S. Cl. ......................................... 386/113; 386/46
(58) Field of Classification Search ................... 386/46, 386/68, 81, 82, 111, 112, 124–126, 113; 725/88–90, 102; 375/240
See application file for complete search history.

(56) References Cited

U.S. PATENT DOCUMENTS

| 5,260,801 | A | * | 11/1993 | Temma et al. | 386/122 |
| 6,205,580 | B1 | * | 3/2001 | Hirose | 717/162 |
| 7,240,081 | B1 | * | 7/2007 | Okayasu et al. | 707/205 |
| 7,268,800 | B2 | * | 9/2007 | Yamagishi | 348/207.1 |
| 2002/0056102 | A1 | | 5/2002 | Dillon et al. | |
| 2002/0097984 | A1 | * | 7/2002 | Abecassis | 386/70 |

FOREIGN PATENT DOCUMENTS

EP    0 751 515    1/1997

(Continued)

*Primary Examiner*—Thai Tran
*Assistant Examiner*—Mishawn Dunn
(74) *Attorney, Agent, or Firm*—Wenderoth, Lind & Ponack, L.L.P.

(57) ABSTRACT

A storage media management apparatus includes a dividing unit 63e that divides a content into a plurality of content parts, a management information generating unit 63c that generates a plurality of pieces of content management information in correspondence to the plurality of content parts, each piece of content management information including (a) reconstruction information for reconstructing the content by concatenating a corresponding content part with the other content parts, and (b) individual information for making the corresponding content part individually usable, a content recording 63d unit 63d that records each content part together with a corresponding piece of content management information onto a different one of the storage media, and a table editing unit 61 that judges whether the content is to be concatenated and made usable, or the content parts are to be individually made usable.

18 Claims, 39 Drawing Sheets

FOREIGN PATENT DOCUMENTS

| | | |
|---|---|---|
| EP | 1 205 933 | 5/2002 |
| GB | 2 312 317 | 10/1997 |
| JP | 5-127956 | 5/1993 |
| JP | 2000-188729 | 7/2000 |
| JP | 2001-52446 | 2/2001 |

* cited by examiner

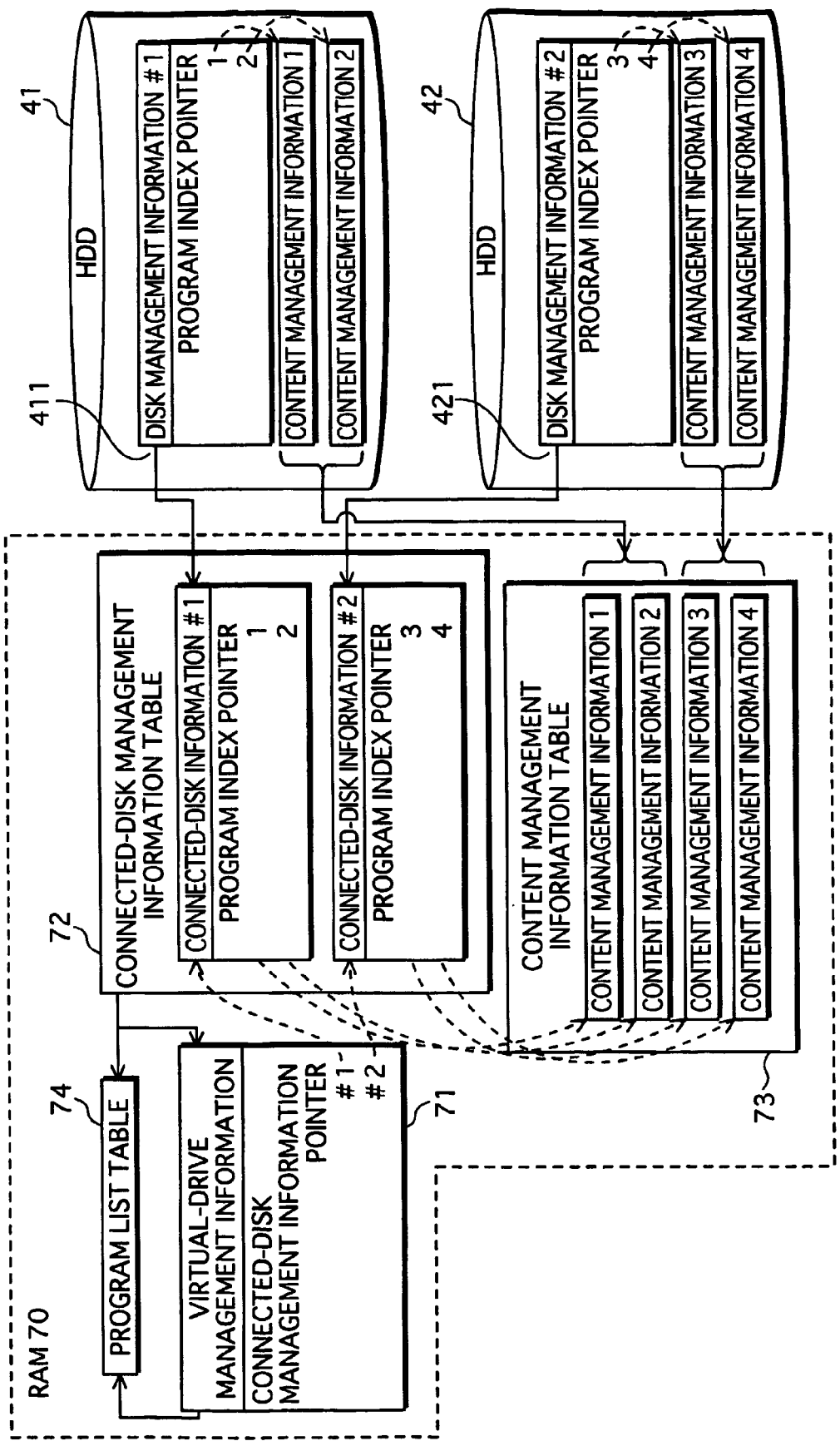

FIG.4

| | |
|---|---|
| 411 | |
| DISK ID INFORMATION | 411a |
| TABLE LENGTH | 411b |
| CONTENT TOTAL NUMBER | 411c |
| CONTENT PART TOTAL NUMBER | 411d |
| DISK ENTIRE CAPACITY | 411e |
| DISK UNAVAILABLE CAPACITY | 411f |
| DISK AVAILABLE CAPACITY | 411g |
| PROGRAM INDEX POINTER | 411h |

FIG.5

| |
|---|
| CONTENT ID INFORMATION |
| TABLE LENGTH |
| DIVIDE FLAG |
| REMOVE FLAG |
| TOTAL DIVISION NUMBER |
| SEQUENCE NUMBER |
| RECORDING START POSITION |
| RECORDING LENGTH |
| MANAGEMENT-PURPOSE INFORMATION |

FIG.6

| | |
|---|---|
| 71 | |
| TABLE LENGTH | 71a |
| DISK TOTAL NUMBER | 71b |
| PROGRAM TOTAL NUMBER | 71c |
| VIRTUALLY-ONE-PROGRAM TOTAL NUMBER | 71d |
| VIRTUAL-DRIVE ENTIRE CAPACITY | 71e |
| VIRTUAL-DRIVE UNAVAILABLE CAPACITY | 71f |
| VIRTUAL-DRIVE AVAILABLE CAPACITY | 71g |
| CONNECTED-DISK MANAGEMENT INFORMATION POINTER | 71h |
| ⋮ | |

FIG.8

| 73 | 73a | 73b | 73c | 73d | 73e | 73f | 73g | 73h | 73i |
|---|---|---|---|---|---|---|---|---|---|
| | PROGRAM ID INFORMATION | TABLE LENGTH | DIVIDE FLAG | REMOVE FLAG | TOTAL DIVISION NUMBER | SEQUENCE NUMBER | RECORDING START POSITION | RECORDING LENGTH | MANAGEMENT -PURPOSE INFORMATION |
| | . . . . . | . . . . . | . . . . . | . . . . . | . . . . . | . . . . . | . . . . . | . . . . . | . . . . . |

FIG.27

| PRESET-RECORDING ID | RECORDING START DATE AND TIME | RECORDING END DATE AND TIME | RECORDING CH |

FIG.28

| 75 | 75a | 75b | 75c | 75d | 75e | 75f | 75g | 75h | 75i | 75j |
|---|---|---|---|---|---|---|---|---|---|---|
| | PROGRAM ID INFORMATION | TABLE LENGTH | DIVIDE FLAG | REMOVE FLAG | TOTAL DIVISION NUMBER | SEQUENCE NUMBER | RECORDING START POSITION | RECORDING LENGTH | MANAGEMENT-PURPOSE INFORMATION | PRESET-RECORDING ID |
| | . . . . . . | . . . . . . | . . . . . . | . . . . . . | . . . . . . | . . . . . . | . . . . . . | . . . . . . | . . . . . . | . . . . . . . |

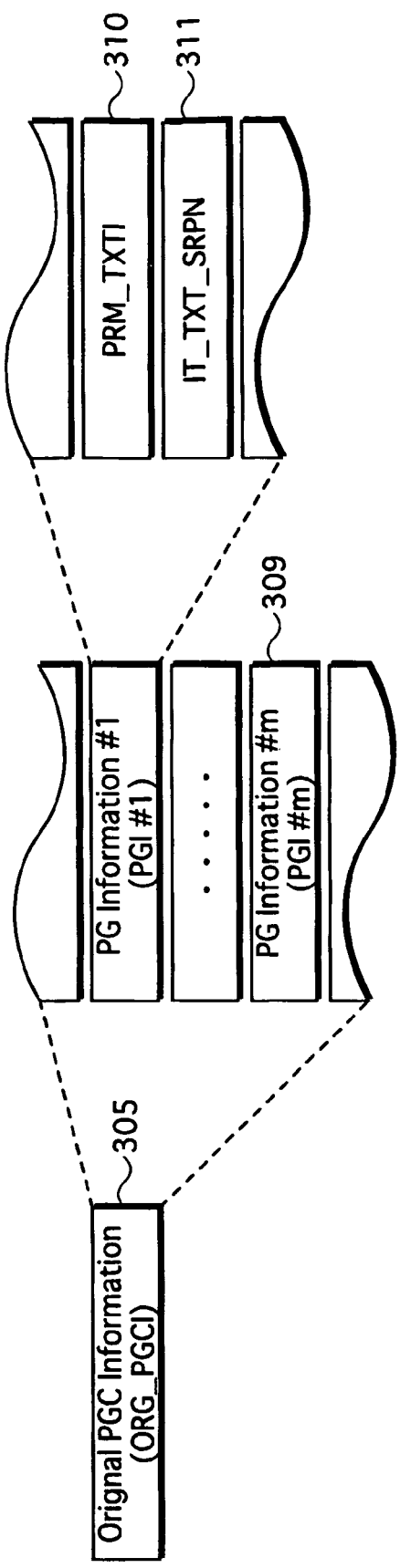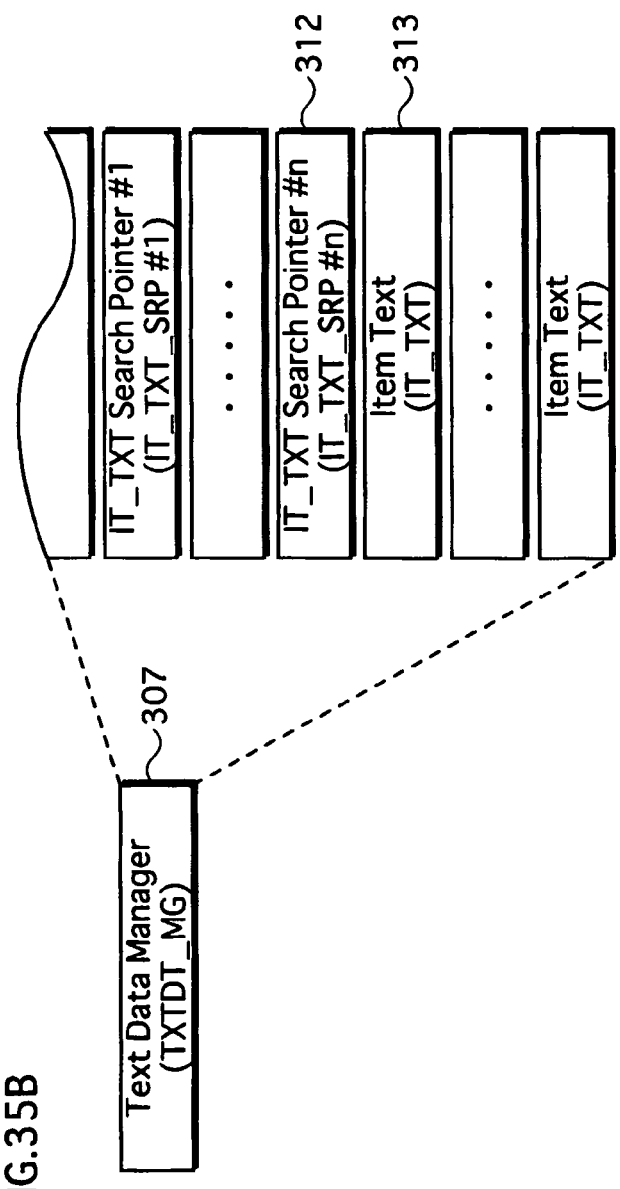
FIG.35A
FIG.35B

APPARATUS FOR MANAGING REMOVABLE STORAGE MEDIA THAT CAN BE CONNECTED THERETO, AND METHOD, PROGRAM, AND SYSTEM LSI FOR MANAGING REMOVABLE STORAGE MEDIA

TECHNICAL FIELD

The present invention relates to a technique for managing a plurality of removable storage media.

BACKGROUND ART

DVD/HDD recorders using DVDs and HDDs (Hard Disk Drives) as storage media are widely used to record various contents. A user may record broadcast contents onto an HDD of a DVD/HDD recorder and view recorded contents, and may further move or copy his or her favorite contents from the HDD to a DVD to keep the contents for a long time. To enable a longer recording time, the demand is increasing for a larger memory capacity of DVD/HDD recorders.

Conventional DVD/HDD recorders have met the demand for a larger memory capacity, by installing more storage media therein and handling storage areas of the storage media as one logically-integrated storage area (hereafter referred to as a "virtual-drive storage area"). As one example, Document 1 (Japanese Laid-Open Patent Application No. 2001-052466) discloses a technique for controlling one content stored as being divided into a plurality of storage media, to enable the divided parts to be played back continuously. Here, HDD cartridges, which are easily connectable and removable, may be used as the storage media additionally installed in DVD/HDD recorders. As one example, Document 2 (Japanese Patent Application No. H10-362972) discloses a technique for managing such easily connectable and removable HDD cartridges.

The storage media management method disclosed in Document 1, however, may be faced with a problem when one content is stored as being divided into a plurality of storage media. If a storage medium storing a part of the content is removed from the DVD/HDD recorder, playback of the content once started from its first part is suspended at such a missing part. The suspension of playback may upset the user who had already viewed the first part and expected to view the entire parts of the content, and in turn may disinterest the user in viewing the content.

With a prospective widespread of easily connectable and removable storage media, this problem is expected to appear more frequently. Therefore, the urgent task now is to find solutions to this problem.

DISCLOSURE OF THE INVENTION

In view of the above problem, the object of the present invention is to provide a storage media management apparatus, a storage media management method, and a storage media management program for managing a plurality of removable storage media so as to enable trouble-free playback of a content that is stored as being divided into a plurality of storage media.

The above object of the present invention can be achieved by a storage media management apparatus to and from which a plurality of storage media are connected and disconnected, including: a dividing unit operable to divide a content into a plurality of content parts, for storing the content as being divided into a plurality of storage media; a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable; a writing unit operable to write each content part together with a corresponding piece of management information, to a different one of the storage media; and a reconstruction judging unit operable, when a content part stored in one of the storage media is to be used, to judge whether the content is to be reconstructed and made usable, or the content parts are to be individually made usable, based on the piece of management information stored in each storage medium.

According to this configuration, even when a content is stored as being divided into unused storage areas of a plurality of storage media, each storage medium stores a piece of management information corresponding to a content part stored therein. Based on such pieces of management information, the judgment can be performed as to whether the content is to be reconstructed by concatenating the content parts and made usable, or the content parts are to be individually made usable.

Accordingly, a plurality of removable storage media can be managed in such a manner that content parts stored therein can be played back without any troubles. Assume for example that a storage medium storing one of the content parts to reconstruct the content is removed from the storage media management apparatus. Even in this case, the other content parts stored in other storage media connected to the storage media management apparatus can be individually made usable. In this case, a message indicating that the other content parts are stored in the connected storage media may be presented to the user, or the other content parts may be played back. Further even in this case, if the removed storage medium is again connected to the storage media management apparatus to enable all the content parts to be stored in the storage media connected to the storage media management apparatus, the storage media management apparatus can then recognize these content parts as the content, based on the reconstruction information corresponding to each content part. In this case, a message indicating that the content is stored in the connected storage media may be presented to the user, or the content may be played back.

Also, the storage media management apparatus may further include: a reading unit operable to read the pieces of management information from storage media that have been connected; and a program information generating unit operable to generate, based on reconstruction information included in each piece of management information read by the reading unit, reconstruction program information for presenting the content as one program, when the reconstruction judging unit judges that the content is to be reconstructed and made usable.

According to this configuration, the storage media management apparatus can present the content that has been stored as being divided into unused areas of a plurality of storage media, in the same state as the content before being divided.

Also, the reconstruction judging unit may judge that the content parts are to be individually made usable, when the reading unit fails to read any of the pieces of management information, and the program information generating unit may generate, for each piece of management information read by the reading unit, individual program information for presenting a corresponding content part as an individual program, when the reconstruction judging unit judges that the content parts are to be individually made usable.

According to this configuration, the storage media management apparatus does not require information about a configuration of each storage media at the time of content recording, and therefore, can present each of a plurality of content parts stored in the connected storage media, even when a storage medium storing one of the content parts has been removed.

Also, the reconstruction judging unit may judge that the content parts are to be individually made usable, when the reading unit fails to read any of the pieces of management information, and the program information generating unit may not generate the reconstruction program information, when the reconstruction judging unit judges that the content parts are to be individually made usable.

According to this configuration, the storage media management apparatus can avoid such a case where the content is used in an incomplete state where a part of the content is missing.

Also, each piece of management information may include alteration information indicating whether a corresponding content part has been altered in a disconnected-state where a storage medium storing the corresponding content part is being disconnected, the reconstruction judging unit may judge that the content parts are to be individually made usable, when alteration information included in any of the pieces of management information read by the reading unit indicates that a corresponding content part has been altered in the disconnected-state, and the program information generating unit may generate, for each piece of management information read by the reading unit, individual program information for presenting a corresponding content part as an individual program, when the reconstruction judging unit judges that the content parts are to be individually made usable.

According to this configuration, when a content part is altered by another apparatus and is no longer continuous to the other content parts, the storage media management apparatus does not permit these content parts to be concatenated together to reconstruct the content for use, but presents each content part as an individual program.

Accordingly, the storage media management apparatus can avoid such a case where the content is used in an incomplete state where a part of the content has been edited and may not be continuous to and from the preceding and following content parts.

Also, the alteration information may include (a) initial-state information that is a part of the reconstruction information and indicates an initial state of a corresponding content part and (b) current-state information that is a part of the individual information and indicates a current state of the corresponding content part. Here, the initial-state information matching the current-state information indicates that the corresponding content part has not been altered in a disconnected-state where a storage medium storing the corresponding content part is being disconnected, and the initial-state information not matching the current-state information indicates that the corresponding content part has been altered in the disconnected-state.

According to this configuration, the storage media management apparatus can judge correctly whether a content part has been altered.

Also, each piece of management information may include alteration information indicating whether a corresponding content part has been altered in a disconnected-state where a storage medium storing the corresponding content part is being disconnected, the reconstruction judging unit may judge that the content parts are to be individually made usable, when alteration information included in any of the pieces of management information read by the reading unit indicates that a corresponding content part has been altered in the disconnected-state, and the program information generating unit may not generate the reconstruction program information, when the reconstruction judging unit judges that the content parts are to be individually made usable.

According to this configuration, when a content part is altered by another apparatus and is no longer continuous to the other content parts, the storage media management apparatus does not permit these content parts to be concatenated together to reconstruct the content for use.

Accordingly, the storage medium management apparatus can avoid such a case where the content is used in an incomplete state where a part of the content has been edited and may not be continuous to and from the preceding and following parts.

Also, the alteration information may include (a) initial-state information that is a part of the reconstruction information and indicates an initial state of a corresponding content part and (b) current-state information that is a part of the individual information and indicates a current state of the corresponding content part. Here, the initial-state information matching the current-state information indicates that the corresponding content part has not been altered in a disconnected-state where a storage medium storing the corresponding content part is being disconnected, and the initial-state information not matching the current-state information indicates that the corresponding content part has been altered in the disconnected-state.

According to this configuration, the storage media management apparatus can judge correctly whether a content part has been altered.

Also, the storage media management apparatus may further include a presenting unit operable to present the content as being usable, when the program information generating unit generates the reconstruction program information for presenting the content.

According to this configuration, a content that is stored as being divided into a plurality of storage media can be presented to the user in the same state as the content before being divided.

Accordingly, the user of the storage media management apparatus can use a content without being aware of whether the content is divided.

Also, the storage media management apparatus may further include a medium configuration presenting unit operable to present information indicating which one of the storage media stores each content part.

According to this configuration, the content storage state of each storage medium can be checked.

Accordingly, the user of the storage media management apparatus can operate a storage medium after checking a content stored therein, and therefore, can easily manage a content that is stored as being divided into a plurality of storage media.

Also, the storage media management apparatus may further include a warning unit operable to, when a storage medium storing one of the content parts is to be disconnected, warn that the content is made unusable after the disconnection.

According to this configuration, such a case unintended by the user can be prevented, where the content parts cannot be used in the same state as the content before being divided.

Also, each piece of management information may include total number information indicating a total number of the content parts, and the storage media management apparatus may further include a usable proportion presenting unit operable to present a proportion of (a) content parts stored in storage media that have been connected and (b) content parts not stored in the storage media that have been connected, among all the content parts a number of which is equal to the total number indicated by the total number information.

According to this configuration, the user can check a proportion of usable content parts in the content.

Also, the individual information may include at least an identifier for uniquely identifying a corresponding content part, and position information indicating a position at which the corresponding content part is stored in a storage medium, and the reconstruction information may include at least an identifier for uniquely identifying the content, total number information indicating a total number of the content parts, and sequence number information indicating a sequence number given to a corresponding content part among sequence numbers given sequentially to all the content parts.

According to this configuration, the storage media management apparatus can correctly reconstruct the content and make it usable when judging that the content is to be reconstructed, and can make each content part individually usable when judging that the content parts are to be individually made usable.

Also, the dividing unit may not divide the content when a data amount of the content is smaller than a capacity of an unused storage area of one of the storage media, and divides the content into the plurality of content parts when the data amount of the content is larger than a capacity of an unused storage area of each of the storage media, and the writing unit may write each content part to a different one of the storage media, when the dividing unit divides the content, and write the content to a storage media that has an unused storage area whose capacity is larger than the data amount of the content, when the dividing unit does not divide the content.

According to this configuration, the storage media management apparatus can record one content onto one storage medium when finding that the content can be stored in the storage medium without being divided. By doing so, the possibility of contents being divided can be reduced.

Accordingly, the possibility of contents partially being unusable by removing a storage medium can be reduced.

Also, the writing unit may include a selecting unit operable to select a storage medium whose unused storage area has the largest capacity among the plurality of storage media, and the writing unit may write one of the content parts to the storage medium selected by the selecting unit when the dividing unit divides the content, and write the content to the storage medium selected by the selecting unit when the dividing unit does not divide the content.

According to this configuration, the storage media management apparatus can store a content into a storage medium having the largest unused storage area, so that the possibility of one content being divided can be reduced. Even in the case of diving one content, the content can be divided by the largest possible size. Therefore, the number of content parts into which the content is divided can be reduced.

Accordingly, the possibility of partial missing of a content caused by removing a storage medium from the storage media management apparatus can be reduced.

Also, each piece of management information may include presetting-condition information indicating a condition of presetting on which writing of a corresponding content part is based, the writing unit may include a same-condition detecting unit operable to detect, when the content is written based on presetting, a same-type content whose presetting-condition information indicates a same condition of presetting as indicated by presetting-condition information corresponding to the content, and the writing unit may write one of the content parts to a storage medium storing the same-type content detected by the same-condition detecting unit when the dividing unit divides the content, and write the content to the storage medium storing the same-type content detected by the same-type detecting unit when the dividing unit does not divide the content.

According to this configuration, contents for which recording is preset using the same condition can be recorded onto the same storage medium. For example, the possibility of a series of contents to be cyclically recorded every day every week, etc., being recorded onto the same storage medium can be raised.

Accordingly, a series of contents to be cyclically recorded onto a plurality of storage media, are prevented from being dispersed by removing a storage medium.

Also, the storage media management apparatus may further include: an available area judging unit operable to judge whether both of a first storage medium and a second storage medium have unused storage areas; and an available area adjusting unit operable to, when both of the first storage medium and the second storage medium have unused storage areas and both of the first storage medium and the second storage medium respectively store two of the content parts, move one content part stored in one of the first storage medium and the second storage medium to another one of the first storage medium and the second storage medium.

According to this configuration, a content recorded as being divided into a plurality of storage media can be recorded onto one storage medium.

Accordingly, the possibility of a content being divided into a plurality of storage media can be reduced. The possibility of partial missing of a program caused by removing a storage medium from the storage media management apparatus can be reduced. Further, unused storage areas remaining in a plurality of storage media can be combined into one storage medium.

The above object of the present invention can also be achieved by a storage media management method for use in a storage media management apparatus to and from which a plurality of storage media are connected and disconnected, the method including: a dividing step of dividing a content into a plurality of content parts, for storing the content as being divided into a plurality of storage media; a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable; a writing step of writing each content part together with a corresponding piece of management information, to a different one of storage media; and a reconstruction judging step of judging, when a content part stored in one of the storage media is to be used, whether the content is to be reconstructed and made usable, or the content parts are to be individually made usable, based on the piece of management information stored in each storage medium.

Also, in the dividing step, the content may not be divided when a data amount of the content is smaller than a capacity of an unused storage area of one of the storage media, and the content may be divided into the plurality of content parts when the data amount of the content is larger than a capacity of an unused storage area of each of the storage media, and in the writing step, each content part may be written to a different one of the storage media, when the content is divided in the dividing step, and the content may be written to a storage media that has an unused storage area whose capacity is larger than the data amount of the content, when the content is not divided in the dividing step.

Also, the writing step may include: a selecting substep of selecting a storage medium whose unused storage area has the largest capacity among the plurality of storage media; and a largest unused area writing substep of writing one of the content parts to the storage medium selected in the selecting substep when the content is divided in the dividing step, and writing the content to the storage medium selected in the selecting substep when the content is not divided in the dividing step.

According to this configuration, even when a content is stored as being divided into unused storage areas of a plurality of storage areas, each storage medium stores a piece of management information corresponding to a content part stored therein. Based on such pieces of management information, the judgment can be performed as to whether the content is to be reconstructed by concatenating the content parts and made usable, or the content parts are to be individually made usable.

Accordingly, a plurality of removable storage media can be managed in such a manner that content parts stored therein can be played back without any troubles.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 3 shows a management information group for realizing the functions corresponding to an FS layer and a virtual FS layer relating to the first embodiment;

FIG. 4 shows disk management information 411 stored in an HDD 41 in detail;

FIG. 5 shows one piece of content management information in detail;

FIG. 6 shows a data structure of virtual-drive management information 71 stored in a RAM 70;

FIG. 8 shows a data structure of a content management information table 73 stored in the RAM 70;

FIG. 27 shows a data structure of one piece of presetting information;

FIG. 28 shows a data structure of a content management information table 75 stored in a RAM 70;

FIG. 35A shows a part of information included in $ORG_{13}$ PGC I305 and TDT MG 307; FIG. 35B shows a part of information included in $ORG_{13}$ PGC I305 and TDT MG 307;

BEST MODE FOR CARRYING OUT THE INVENTION

First Embodiment

<Outline>

The following describes a DVD/HDD recorder 100 relating to a first embodiment of the present invention, as one example of the storage media management apparatus of the present invention.

The DVD/HDD recorder 100 includes a plurality of slots for connecting storage media thereto. The DVD/HDD recorder 100 may obtain one content, i.e., one sequence of video, audio, etc., via broadcasting and the like, and record the content as being divided into a plurality of storage media that are connected to the slots.

The DVD/HDD recorder 100 stores therein management information for concatenating such parts of the content that have been respectively stored in a plurality of storage media. Using the management information, the DVD/HDD recorder 100 can present, to the user, these content parts respectively stored in the storage media, as virtually-continuous one content. Further, the DVD/HDD recorder 100 stores therein management information for managing each part of the content stored in each storage medium. Each storage medium also stores therein such management information for managing a content part stored therein. Due to this, the DVD/HDD recorder 100 can operate appropriately in various cases where a plurality of storage media are connected or removed.

The following describes the storage media management apparatus of the present invention, with reference to the drawings.

<Configuration>

The following first describes a hardware configuration of the DVD/HDD recorder 100 relating to the first embodiment of the present invention.

Figure 1:
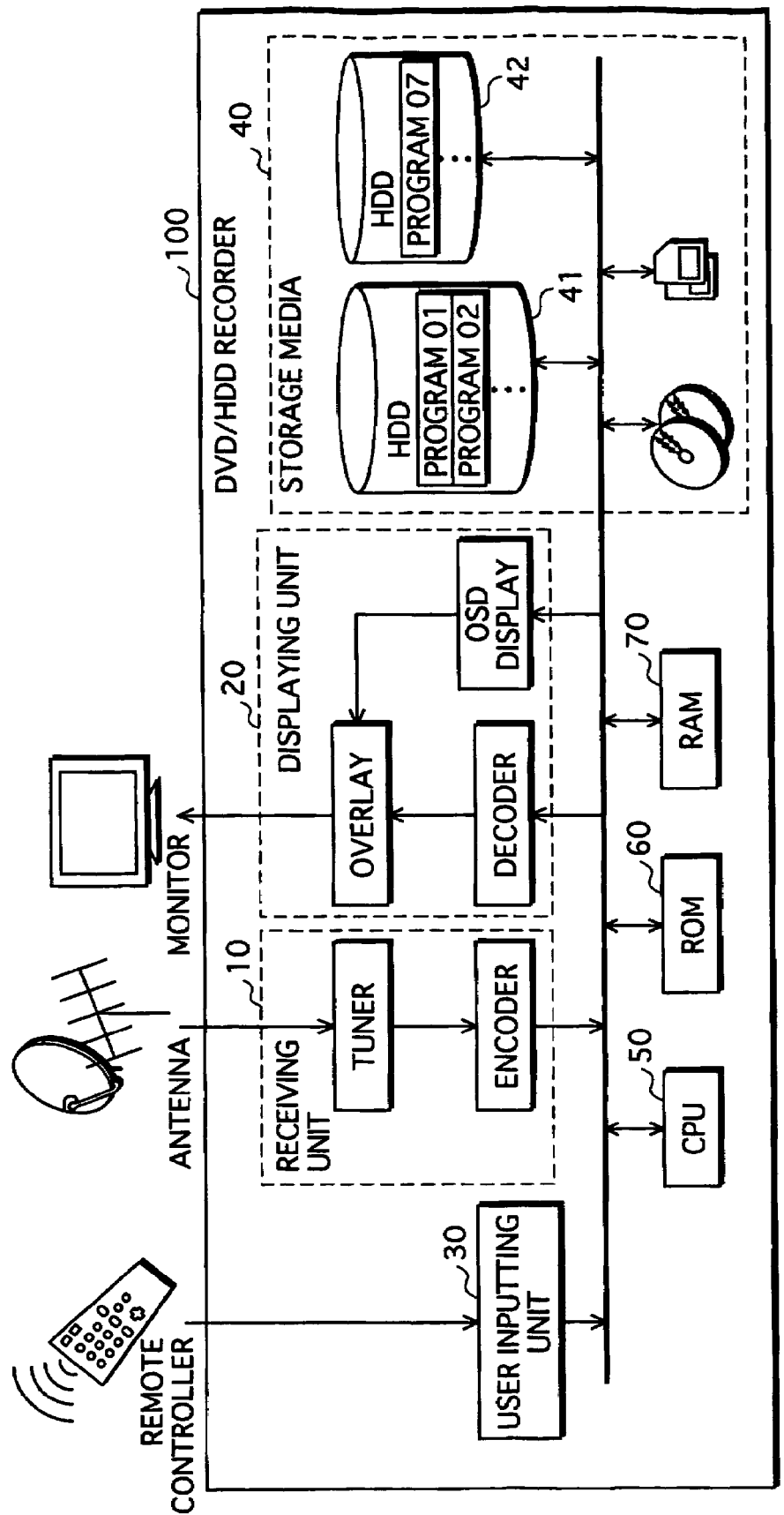
FIG. 1 shows a configuration of a DVD/HDD recorder 100 relating to a first embodiment of the present invention.

FIG. 1 shows the configuration of the DVD/HDD recorder 100. The DVD/HDD recorder 100 includes a receiving unit 10, a displaying unit 20, a user inputting unit 30, storage media 40, a CPU 50, a ROM 60, and a RAM 70. The management of storage media, which is the goal of the present invention, is enabled by the CPU 50 reading and executing software stored in the ROM 60.

The receiving unit 10 encodes a signal of a sequence of video, audio, etc., received via an antenna, to generate a content for recording purposes. In this specification, "one (a) content" intends to mean one data stream of video, audio, etc., which has been encoded based on the MPEG-2 algorithm or the like.

The displaying unit 20 decodes a content read from such a storage medium as an HDD, to generate a signal of video and audio, and outputs the generated signal to a monitor connected to the DVD/HDD recorder 100.

The user inputting unit 30 receives a user input via a remote controller or via an operation of buttons provided in the DVD/HDD recorder 100.

The DVD/HDD recorder 100 uses, as its storage media 40, an HDD 41 and an HDD 42. It should be noted here that the storage media management relating to the first embodiment is described based on the assumption that the storage media are HDDs. However, other storage media such as DVD-RAMs and memory cards may also be connected to the DVD/HDD recorder 100, and these storage media can also be managed using the same method as that described in the first embodiment.

The HDDs 41 and 42 are specifically HDD cartridges that can be connected to and removed from the DVD/HDD recorder 100 by a user operation, and their storage areas are managed under such a file system as the UDF (Universal Disk Format).

The operations of the DVD/HDD recorder 100 are controlled by the CPU 50 reading and executing software 110 stored in the ROM 60.

The ROM 60 stores therein the software 110 for controlling the operations of the DVD/HDD recorder 100.

The RAM 70 is a memory area for storing management information for managing storage areas of a plurality of storage media as one logically-integrated storage area. The RAM 70 specifically stores therein a program list table, which is described in detail later.

The following describes, in layers, the functions of the DVD/HDD recorder 100 for managing recorded contents.

Figure 2:
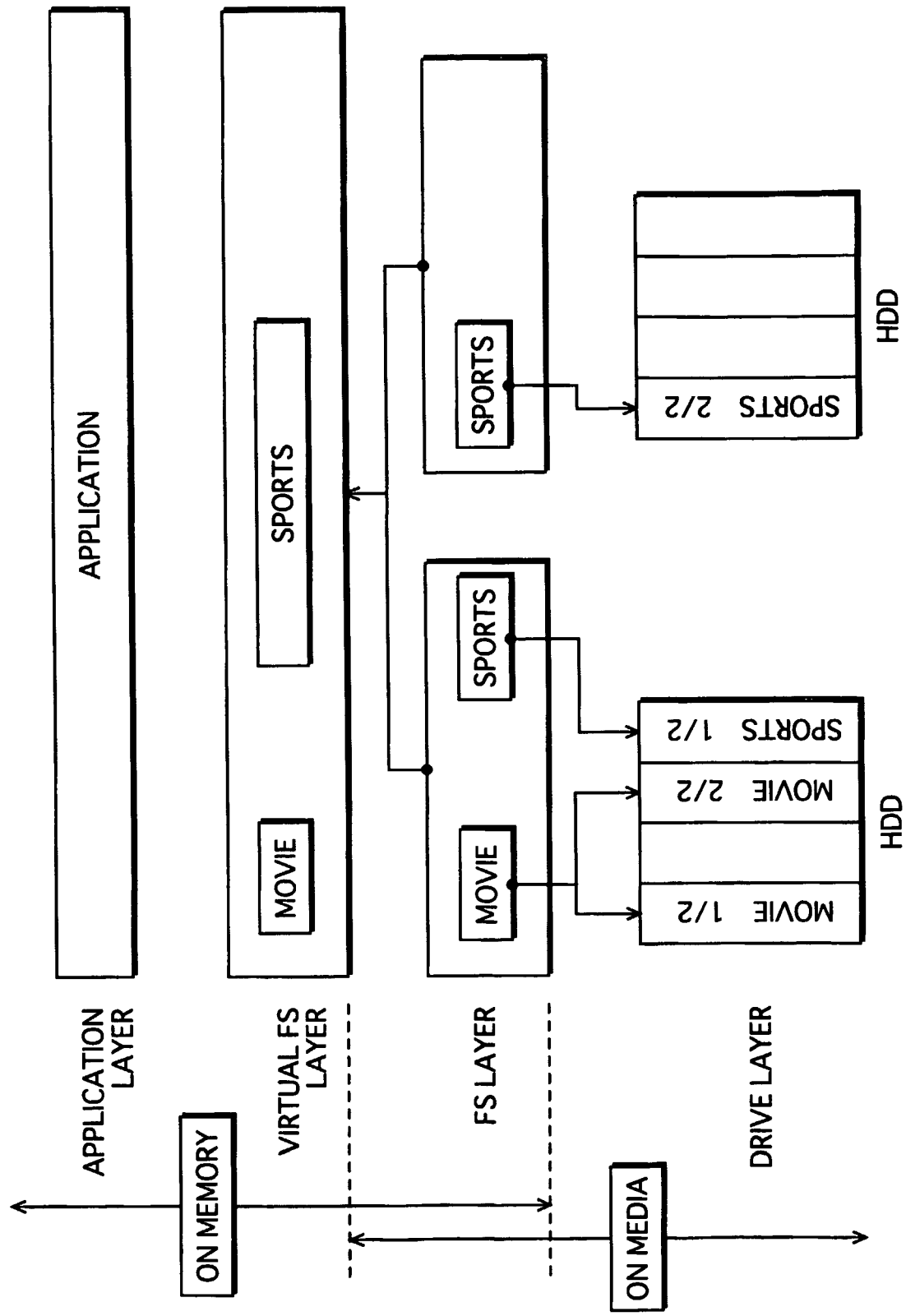
FIG. 2 shows, in layers, the functions of the DVD/HDD recorder 100 for managing recorded contents.

FIG. 2 shows, in layers, the functions of the DVD/HDD recorder 100 for managing recorded contents. The DVD/HDD recorder 100 manages its storage areas, using an application layer, a virtual FS (File System) layer, a FS layer, and a drive layer.

The drive layer corresponds to the function of managing a storage area of each storage medium using LBA (Logical Block Address), specifically, the function of receiving an address at which data is to be recorded or an address at which data is to be read, and recording or reading data to or from a storage medium.

The FS layer corresponds to the function of managing contents stored in each storage medium, specifically, the function of receiving a designation of a target content from an upper layer, and passing an address at which the target content to be accessed is stored, to the drive layer.

Each storage medium storing a content also stores therein management information for managing the content. Therefore, a recording apparatus of any type can manage, by the FS layer, a content stored in each storage medium. For example, when an HDD cartridge removed from the DVD/HDD recorder 100 is connected to another DVD/HDD recorder, a content stored in the HDD cartridge can be handled by the other DVD/HDD recorder.

Here, for storage media management apparatuses that manage storage areas of a plurality of storage media as individual storage areas without integrating these areas as one storage area, the FS layer supplies a content stored in each storage medium to the application layer. In the case of such storage media management apparatuses, a problem arises when one content composed of a data stream of continuous video, audio, etc., is stored as being divided into a plurality of storage media. In this case, the FS layer supplies, to the application layer, each divided part of the data stream as one program. If this happens, the application layer fails to handle the original content, i.e., the data stream of continuous video, audio, etc., as one program.

In view of this problem, for the DVD/HDD recorder 100 relating to the first embodiment of the present invention, a virtual FS layer is newly provided between the application layer and the FS layer. The virtual FS layer aims to manage a plurality of storage media as one virtual drive. The virtual FS layer enables a plurality of divided parts of a data stream of continuous video, audio, etc., stored respectively in a plurality of storage media, to be managed as one program.

When one content composed of a data stream of continuous video, audio, etc., is stored as being divided into a plurality of storage media, the virtual FS layer manages (a) the original content and (b) its divided parts respectively stored in the storage media, in correspondence with each other. Therefore, upon receipt of a designation of a program (as a processing target) from the application layer, the virtual FS layer can identify divided parts of a content corresponding to the designated program, and can pass the identified divided parts to the FS layer as the processing target.

In this specification, one data stream of continuous video, audio, etc., is referred to as a "content", whereas one data stream unit that is supplied from the virtual FS layer to the application layer for serving as a unit to be handled by the user is referred to as a "program". Also, when one content is stored as being divided into a plurality of storage media, each divided part of the content stored in a different storage medium is hereafter referred to as a "content part", and the original content reconstructed by concatenating the content parts is referred to as a "virtually-one-content". A "program", which is the above-described particular unit, may correspond to one content (a physically-one-content), or may correspond to a virtually-one-content constructed by concatenating once-divided content parts, and a program corresponding to a virtually-one-content may be particularly referred to as a virtually-one-program.

The application layer provides the user with the operations of recording, playback, etc., of programs managed by the virtual FS layer.

Here, the DVD/HDD recorder 100 records a content, which has been obtained via broadcasting or the like, as being divided into a plurality of storage media, only when finding that an available storage area of one storage medium is not large enough to store the entire content. The DVD/HDD recorder 100 divides the content in such a manner that content parts can be logically handled. To be more specific, the DVD/HDD recorder 100 with the configuration described later divides the content in time units, so that each content part can also be viewed as an individual program.

This is the end of description on the functions of the DVD/HDD recorder 100 for managing recorded contents.

The following describes information stored in the HDDs 41 and 42, and the RAM 70, for enabling the DVD/HDD recorder 100 to realize the functions of the FS layer and the virtual FS layer.

FIG. 3 shows a management information group for realizing the functions of the FS layer and the virtual FS layer in the first embodiment.

The HDDs 41 and 42 each store one piece of disk management information and pieces of content management information corresponding in one-to-one to contents (or content parts) stored in its storage area. The FS layer uses these pieces of management information to manage the state of the storage area of each HDD, and to manage contents (or content parts) stored in the storage area of each HDD.

One piece of disk management information stored in each HDD includes information about the state of the storage area of the HDD and pointers to the pieces of content management information. Each piece of content management information includes information about the state of the corresponding content (or content part). Due to such pieces of management information stored in an HDD, contents (or content parts) stored in the HDD can be supplied as "programs", from the FS layer to the application layer, when the HDD is newly connected to a storage media management apparatus other than the DVD/HDD recorder 100.

The RAM 70 stores virtual-drive management information, a connected-disk management information table, a content management information table, and a program list table.

The FS layer uses these pieces of information to manage the state of a "virtual-drive storage area", which is a storage area of a virtual drive constructed by logically integrating the storage areas of all the HDDs, and also to manage programs.

The content management information table stored in the RAM 70 includes pieces of content management information in one-to-one correspondence to all the contents (or content parts) managed by the FS layer. The connected-disk management information table includes the same information as the pieces of disk management information held by all the HDDs managed by the FS layer. In this way, with its RAM 70 storing the same information as the management information group held by each HDD, the recording apparatus does not have to access each HDD when generating and updating the virtual-drive management information or generating and updating the program list table.

Also, the virtual-drive management information stored in the RAM 70 includes (a) information about the state of the virtual-drive storage area generated by combining the pieces of information included in the connected-disk management information table, and (b) pointers to the pieces of connected-disk information included in the connected-disk management information table. The program list table lists programs managed by the virtual FS layer, with each program corresponding either to one content or content parts. Using these pieces of information, the virtual FS layer can supply, to the application layer, the storage areas of the HDDs 41 and 42 as one virtual-drive storage area, and also can supply, to the application layer, content parts supplied from the FS layer as virtually-one-program.

The following describes, in detail, disk management information and content management information for realizing the function of the FS layer.

FIG. 4 shows, in detail, one piece of disk management information, i.e., disk management information 411 stored in the HDD 41.

The disk management information 411 is used to manage the storage area of the HDD 41. The disk management information 411 roughly includes information about the state of the storage area of the HDD 41 and a pointer to each content (or content part) stored in the HDD 41. To be more specific, the disk management information 411 includes the items: "disk ID information" 411$a$, "table length" 411$b$, "content total number" 411$c$, "content part total number" 411$d$, "disk entire capacity" 411$e$, "disk unavailable capacity" 411$f$, "disk available capacity" 411$g$, and "program index pointer" 411$h$.

The "disk ID information" 4111$a$ is an identifier unique to the HDD 41, and is specifically a manufacture's serial number or the like given at the time when the HDD 41 was manufactured.

The "content total number" 411$c$ is the total number of contents stored in the HDD 41.

The "content part total number" 411$d$ is the total number of content parts stored in the HDD 41.

The "disk entire capacity" 411$e$ is a memory capacity of the entire storage area of the HDD 41.

The "disk unavailable capacity" 411$f$ is a memory capacity of an unavailable storage area of the HDD 41 where contents (or content parts) are currently stored.

The "disk available capacity" 411$g$ is a memory capacity of an available storage area of the HDD 41 where contents (or content parts) are not currently stored.

The "program index pointer" 411$h$ is the arrangement of pointers each indicating an address at which a piece of content management information corresponding to a content (or content part) stored in the HDD 41 is stored. The number of pointers is the same as the number of contents (or content parts) stored in the HDD 41.

The following describes, in detail, one piece of content management information.

Content management information is a part of management information required for realizing the function of the FS layer in the DVD/HDD recorder 100 relating to the first embodiment. One piece of content management information roughly includes information about the corresponding content (or content part) (specifically, a title, an address of a recording start position, a recording length, etc.) to be managed by the FS layer in storage media management apparatuses handling storage areas of a plurality of storage media as individual areas without integrating them into one area. In addition to this, the piece of content management information includes, when this piece of content management corresponds to a content part, information about a positional relationship with other content parts to be concatenated together to construct a virtually-one-content (specifically, content ID information, a divide flag, a remove flag, a total division number, a sequence number, etc.).

FIG. 5 shows, in detail, one piece of content management information.

The HDD stores therein pieces of content management information corresponding in one-to-one to contents (or content parts) stored therein. Each piece of content management information corresponding to one content (or content part) includes the items "content ID information", "table length", "divide flag", "remove flag", "total division number", "sequence number", "recording start position", "recording length", and "management-purpose information".

The "content ID information" is an identifier unique to the corresponding content (or content part). To be more specific, a value containing the recording start time of the corresponding content (or content part) and a manufacture's serial number of the apparatus that has recorded the corresponding content (or content part) is used as this identifier. It should be noted here that content parts to be concatenated together to construct a virtually-one-content are each given the same value as the content ID information.

The "divide flag" indicates whether this piece of content management information corresponds to a content part. The divide flag shows "1" when this piece of content management information corresponds to a content part, and shows "0" in any other cases.

The "remove flag" indicates whether the HDD 41 storing this piece of content management information has been removed from the DVD/HDD recorder 100 that has recorded the corresponding content (or content part). The remove flag shows "1" when the HDD 41 has been removed, and shows "0" in any other cases.

The "total division number" is a value indicating, when this piece of management information corresponds to a content part, the number of all the content parts to be concatenated together to construct a virtually-one-content.

The "sequence number" is a value indicating, when this piece of content management information corresponds to a content part, a sequence number given to this content part among all the content parts to be concatenated together, with the first content part being given the sequence number "0". When this content management information does not correspond to a content part, the sequence number shows a null value of "−1".

Each piece of content management information also includes management-purpose information, i.e., information used for content management according to the DVD-RAM format. The management-purpose information includes the recording date and time of the corresponding content (or content part), a playback time, a program title, and content copy control information.

With the disk management information 411 and the pieces of content management information being stored in the HDD 41, the corresponding contents (or content parts) stored in the HDD 41 can be used even when the HDD 41 is newly connected to a storage media management apparatus other than the DVD/HDD recorder 100.

Likewise, the HDD 42 stores disk management information 421 and a piece of content management information corresponding to each content (or content part) stored in the HDD 42. These pieces of management information have the same structures as the above-described pieces of management information stored in the HDD 41, and therefore are not described in detail here.

The following describes in detail the virtual-drive management information, the connected-disk management information table, the content management information table, and the program list table for realizing the function of the virtual FS layer. These pieces of management information are stored in the storage area of the RAM 70.

FIG. 6 shows a data structure of the virtual-drive management information 71 stored in the RAM 70.

The virtual-drive management information 71 roughly includes information about the state of the storage area of the virtual drive that is constructed by virtually integrating the storage areas of the HDD 41 and the HDD 42, and pointers to pieces of disk management information of the HDDs included in the connected-disk management information table. The virtual-drive management information 71 manages the storage areas of the HDD 41 and the HDD 42 connected to the DVD/HDD recorder 100 as one continuous storage area.

The virtual-drive management information 71 includes the items "table length" 71a, "disk total number" 71b, "program total number" 71c, "virtually-one-program total number" 71d, "virtual-drive entire capacity" 71e, "virtual-drive unavailable capacity" 71f, "virtual-drive available capacity" 71g, and "connected-disk management information pointer" 71h.

The "disk total number" 71b is the number of HDDs constructing the virtual drive. When only one HDD has been connected to the DVD/HDD recorder 100, the virtual-drive management information 71 includes only one piece of information about the HDD. When no HDD has been connected to the DVD/HDD recorder 100, the disk total number 71b shows "0", and the virtual-drive entire capacity 71e, the virtual-drive unavailable capacity 71f, and the virtual-drive available capacity 71g all show "0".

The "program total number" 71c is the number of programs to be supplied from the virtual FS layer to the application layer.

Here, a program may be one content stored in one HDD, or may be a virtually-one content constructed by concatenating two content parts stored respectively in the HDD 41 and the HDD 42.

The "virtually-one-program total number" 71d is the number of virtually-one-programs each of which is constructed by concatenating two content parts stored respectively in the HDD 41 and the HDD 42. As defined above, a "virtually-one-program" corresponds to a virtually-one-content that is constructed by concatenating content parts.

The "virtual-drive entire capacity" 71e is a memory capacity of the entire storage area of the virtual drive, which is presented to the user as one continuous storage area. The virtual-drive entire capacity 71e is a value obtained by summing up values of a "disk entire capacity" 72e, which indicates a memory capacity of the entire storage area of each HDD constructing the virtual drive.

The "virtual-drive unavailable capacity" 71f is a memory capacity of an unavailable storage area of the virtual drive, and is a value obtained by summing up values of a "disk unavailable capacity" 72f, which indicates a memory capacity of an unavailable storage area of each HDD constructing the virtual drive.

The "virtual-drive available capacity" 71g is a memory capacity of an available storage area of the virtual drive, and is a value obtained by summing up values of a "disk available capacity" 72g, which indicates a memory capacity of an available storage area of each HDD constructing the virtual drive.

The "connected-disk management information pointer" 71h is the arrangement of pointers to pieces of connected-disk information included in the connected-disk management information table 72. The number of pointers included in the connected-disk management information table 72 is the same as the number of the HDDs connected to the DVD/HDD recorder 100.

It should be noted here that pieces of connected-disk information stored in the RAM 70 are the same as pieces of disk management information respectively stored in the HDDs. The connected-disk management information pointer 71h indicates an address at which the corresponding piece of connected-disk information is stored in the storage area of the RAM 70.

The following describes the connected-disk management information table 72 in detail.

Figure 7:
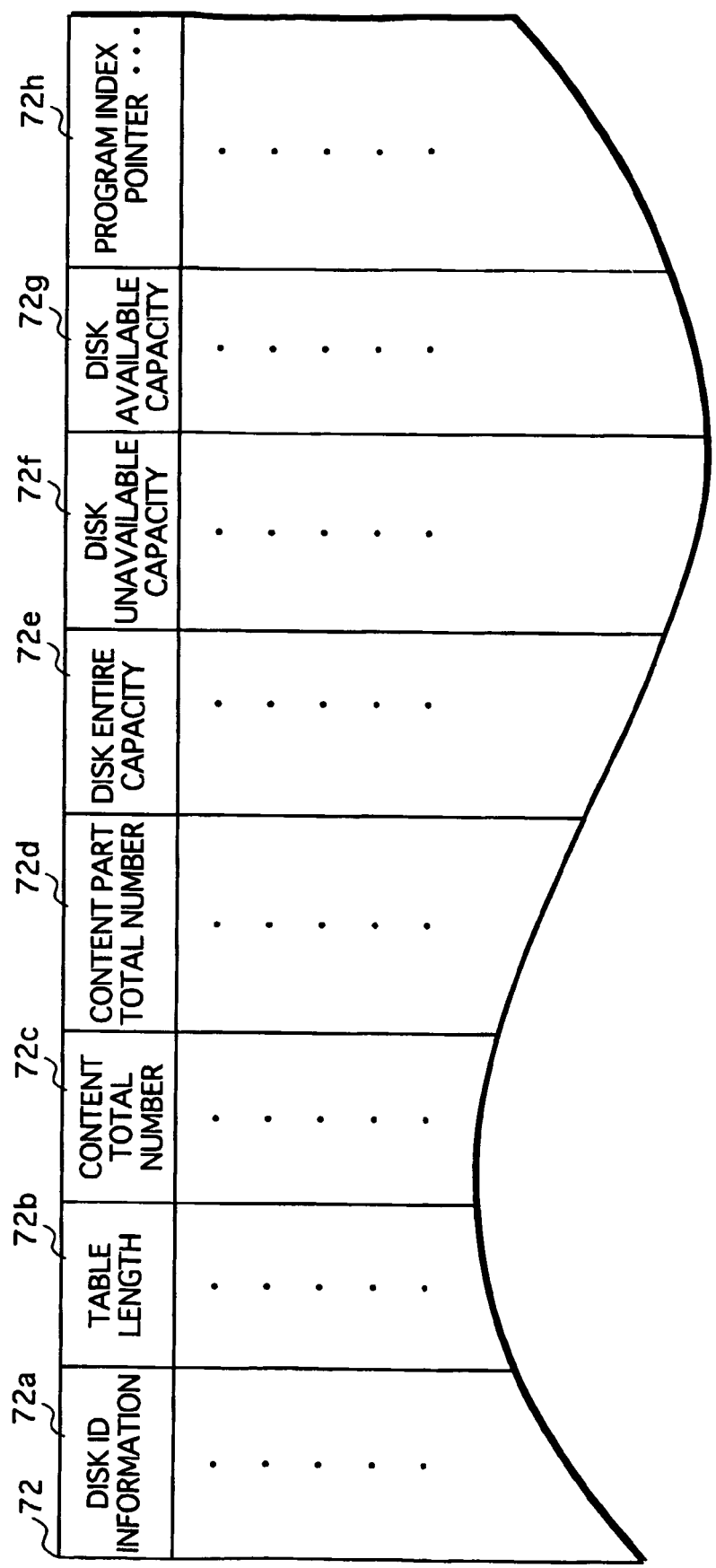
FIG. 7 shows a data structure of a connected-disk management information table 72 stored in the RAM 70.

FIG. 7 shows a data structure of the connected-disk management information table 72 stored in the RAM 70. The connected-disk management information table 72 includes pieces of connected-disk information corresponding in one-to-one to the HDDs that have been connected to the DVD/HDD recorder 100.

A piece of connected-disk information corresponding to one HDD includes the same items as those of a piece of disk management information stored in the HDD. Also, the piece of connected-disk information is entered into the connected-disk management information table 72 when the HDD is connected to the DVD/HDD recorder 100, and is deleted from the connected-disk management information table when the HDD is removed from the DVD/HDD recorder 100.

The connected-disk information has the same data structure as the disk management information. One piece of connected-disk information includes the items "disk ID information" 72a, "table length" 72b, "content total number" 72c, "content part total number" 72d, "disk entire capacity" 72e, "disk unavailable capacity" 72f, "disk available capacity" 72g, and "program index pointer" 72h.

The "program index pointer" 72h is the arrangement of pointers to pieces of content management information included in the content management information table 73. The number of pointers is the same as the number of contents (or content parts) stored in the corresponding HDD.

It should be noted here that each piece of content management information included in the content management information table 73 is information obtained by copying, into the RAM 70, the corresponding piece of content management information stored in each HDD. In other words, the content management information table 73 stores the same pieces of information as the pieces of content management information stored in each HDD. The content management information table 73 therefore includes pieces of content management information each of which includes information about the corresponding content (or a content part) (specifically, an address of a recording start position, a recording length, etc.) to be managed by the FS layer in storage media management apparatuses handling storage areas of a plurality of storage media as individual areas without integrating them into one area. In addition to this, each piece of content management information includes, when this piece of content management information corresponds to a content part, information used to concatenate a plurality of content parts to construct a physically-one-content in the virtual FS layer (specifically, content ID information, a divide flag, a remove flag, a total division number, a sequence number, etc.).

The following describes the content management information table 73 in detail.

FIG. 8 shows a data structure of the content management information table 73 stored in the RAM 70.

The content management information table 73 stores pieces of content management information in one-to-one correspondence to the contents (or content parts) stored in all the HDDs connected to the DVD/HDD recorder 100.

Also, the pieces of content management information included in the content management information table 73 include the same items as those of the pieces of content management information stored in the HDDs. Each piece of content management information includes the items "program ID information" 73a, "table length" 73b, "divide flag" 73c, "remove flag" 73d, "total division number" 73e, "sequence number" 73f, "recording start position" 73g, "recording length" 73h, and "management-purpose information" 73i.

With the connected-disk management information table 72 and the content management information table 73 being stored in the RAM 70, and the same disk management information and the same content management information being stored in each HDD, alteration of contents (or content parts) stored in each HDD can be detected. When an once-removed HDD is connected again to the DVD/HDD recorder 100, any alteration of contents (or content parts) stored in the HDD made after the removal of the HDD can be detected.

To be more specific, the recording start position 73g and the recording length 73h included in one piece of content management information included in the content management table 73 are compared with the recording start position and the recording length included in the same piece of content management information stored in the HDD, to see if they match. With this comparison, whether the corresponding content (or content part) has been edited by a storage media management apparatus other than the DVD/HDD recorder 100 can be determined. In this way, the recording start position indicating the start address of an area where the content is stored and the recording length indicating the recording size of the content can be used to judge whether the content (or content part) has been altered.

Also, with the disk management information being stored in the HDD removed from the DVD/HDD recorder 100, contents (or content parts) stored in the HDD can be used by another DVD/HDD recorder when the HDD is newly connected to the other DVD/HDD recorder.

The following describes the program list table 74 in detail.

Figure 9:
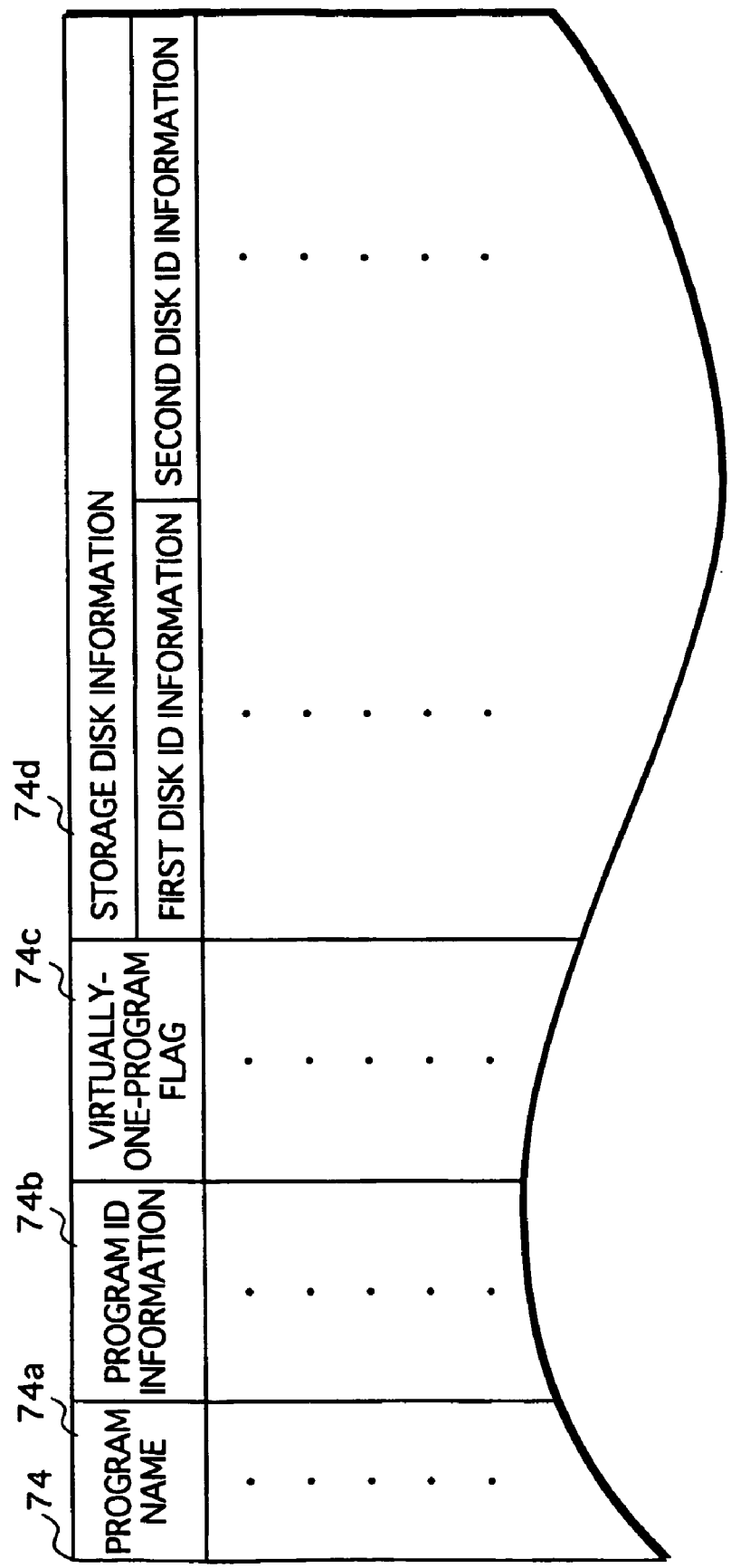
FIG. 9 shows a data structure of a program list table 74 stored in the RAM 70.

FIG. 9 shows a data structure of the program list table 74 stored in the RAM 70.

The program list table 74 stores pieces of program information corresponding in one-to-one to programs to be supplied from the virtual FS layer to the application layer. A table editing unit 61, which is described later, generates the program list table 74 based on the content management information table 73. The program list table 74 stores the same number of pieces of program information as the number of programs within the virtual drive. The pieces of program information correspond in one-to-one to the programs. Each piece of program information includes the items "program name" 74a, "program ID information" 74b, "virtually-one-program flag" 74c, and "storage disk information" 74d.

The "program name" 74a is a name of a program that is presented to the user.

The "program ID information" 74b is an identifier unique to a program and is given when the corresponding content is recorded onto the HDD. The "program ID information" 74b has the same value as the value of the "program ID information" 73a of the corresponding content.

The "virtually-one-program flag" 74c indicates whether a program is a virtually-one-program constructed by a plurality of content parts. The virtually-one-program flag 74c shows "0" when the program is a virtually-one-program, and shows "0" in any other cases.

The "storage disk information" 74d is information about an HDD(s) on which the corresponding content (or corresponding content parts) is recorded. Specifically, the disk ID information 72a identifying such an HDD is set as the storage disk information 74d. When the program is a virtually-one-program, the storage disk information 74d lists values of the disk ID information 72a for all the content parts constructing the virtually-one-program in the order of smaller values of their sequence numbers.

Programs listed in the program list table 74 are presented to the user as viewable programs.

It should be noted here that a program listed in the program list table 74 may correspond to a content (a physically-one-content) stored in an HDD, or may correspond to a virtually-one-content constructed by concatenating a plurality of content parts respectively stored in a plurality of HDDs.

Due to the virtual-drive management information 71, the connected-disk management information table 72, the content management information table 73, and the program list table 74 described above, when the virtual FS layer integrates the storage areas of the HDDs 41 and 42 into a virtual-drive storage area, and is supplied, from the FS layer, with content parts of one content obtained via broadcasting etc., the virtual FS layer can concatenate these content parts to construct a virtually-one-content, and can supply the virtually-one-content as one program to the application layer. Also, the virtual FS layer can give instructions to the FS layer, to process these content parts constructing the program of the processing target.

This is the end of description on the information stored in the HDDs 41 and 42 and the RAM 70 for realizing the functions of the FS layer and the virtual FS layer in the DVD/HDD recorder 100.

The following describes a software configuration of the DVD/HDD recorder 100 in detail.

The operations of the DVD/HDD recorder 100 relating to the first embodiment are controlled by the CPU executing the software 110 stored in the ROM 60.

Figure 10:
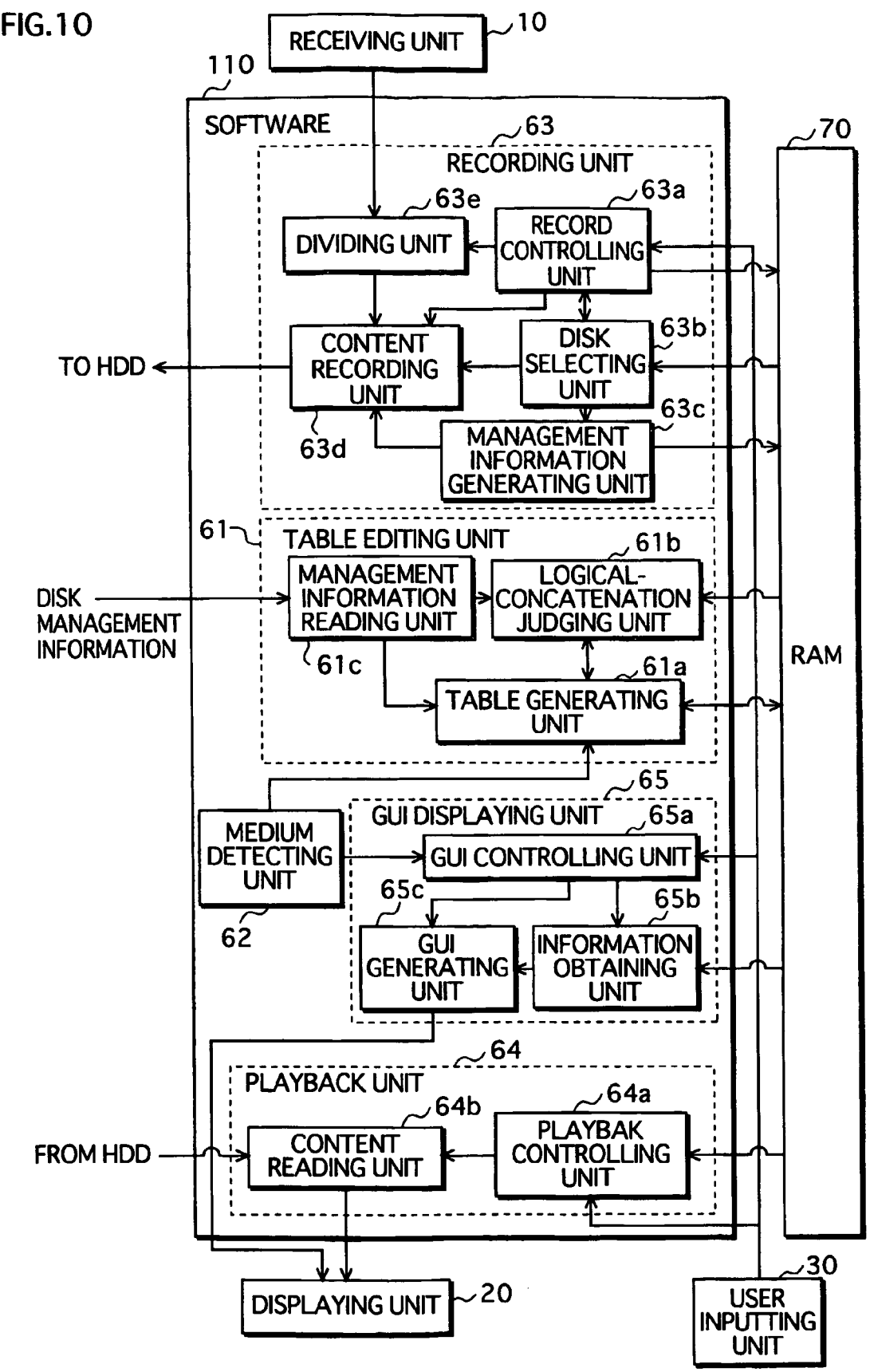
FIG. 10 is a functional block diagram showing a functional configuration of software 110 for controlling the DVD/HDD recorder 100.

FIG. 10 is a block diagram showing a functional configuration of the software 110 controlling the DVD/HDD recorder 100. The software 110 includes the functional blocks: table editing unit 61; medium detecting unit 62; recording unit 63; playback unit 64; and GUI displaying unit 65.

The table editing unit 61 internally has a table generating unit 61a, a logical-concatenation judging unit 61b, and a management information reading unit 61c. The table editing unit 61 updates the management information group for realizing the function of the virtual FS layer when an HDD is connected, when an HDD is removed, and when a content is recoded.

The table generating unit 61a updates, when an HDD is connected, the management information group (the virtual-drive management information 71, the connected-disk management information table 72, the content management information table 73, and the program list table 74) using disk management information read by the management information reading unit 61c. When an HDD is removed, the table generating unit 61a updates the management information group by deleting information corresponding to the removed HDD. Also, when the disk unavailable capacity and the disk available capacity of an HDD are changed by recording a content onto the HDD, the table generating unit 61a updates the management information group stored in the RAM 70.

The logical-concatenation judging unit 61b judges whether all content parts necessary for constructing a virtually-one-content are stored in HDDs connected to the DVD/HDD recorder 100. When judging all the content parts are stored in the HDDs connected to the DVD/HDD recorder 100, the logical-concatenation judging unit 61b performs a logical-concatenation judgment process. In the logical-concatenation judgment process, the logical-concatenation judging unit 61b judges whether a content part stored in a newly connected HDD has been edited, to see whether the content parts can construct a virtually-one-content that is the same as the original content before being divided and the virtually-one-content can be entered into the program list table 74 as one program.

The management information reading unit 61c reads the management information group (disk management information and content management information) stored in an HDD, and outputs the read management information group to the table generating unit 61a and the logical-concatenation judging unit 61b.

The medium detecting unit 62 detects connection or removal of an HDD caused by a user operation.

The recording unit 63 internally has a record controlling unit 63a, a disk selecting unit 63b, a management information generating unit 63c, a content recording unit 63d, and a dividing unit 63e. The recording unit 63 records, onto an HDD, a content received from the receiving unit 10.

The record controlling unit 63a is a functional block for controlling recording of a content onto an HDD and updating management information relating to the recorded content. When finding that an available storage area of one HDD is not large enough to store the entire content, the record controlling unit 63a divides the content into content parts and records the content parts and pieces of content management information corresponding in one-to-one to the content parts respectively onto a plurality of HDDs. To be more specific, the record controlling unit 63a receives a record instruction via a user operation, and instructs the disk selecting unit 63b to select an HDD onto which a content is to be recorded (target HDD), and instructs the content recording unit 63d to record the content onto the target HDD. Further, the record controlling unit 63a updates the management information group stored in the RAM 70, based on the result of recording of the content. Also, upon receipt of a message from the disk selecting unit 63b indicating that an available capacity of the target HDD is used up during the recording, the record controlling unit 63a instructs the dividing unit 63e to divide the content, and updates the management information stored in the RAM 70 accordingly.

The disk selecting unit 63b selects an HDD having an available storage area as a target HDD, by referring to the disk available capacity 72g in the connected-disk management information table 72, and designates the selected HDD as the target HDD, to the content recording unit 63d. When the available storage area of the target HDD is used up during recording of the content, the disk selecting unit 63b gives a message indicating that the target HDD is to be changed, to the record controlling unit 63a. The disk selecting unit 63b selects another HDD with an available storage area, and designates the selected HDD as a next target HDD, to the content recording unit 63d.

The management information generating unit 63c monitors changing of the target HDD performed by the disk selecting unit 63b, and generates a piece of content management information for each recorded content or each recorded content part. The management information generating unit 63c enters the generated piece of content management information into the content management information table 73, and also, records the generated piece of content management information onto the target HDD via the content recording unit 63d.

The content recording unit 63d records a content obtained via the dividing unit 63e, onto an HDD selected by the disk selecting unit 63b, and records a piece of content management information received from the management information generating unit 63c, onto the target HDD. When the dividing unit 63e divides a content into a plurality of content parts, the content recording unit 63d records each content part onto an HDD selected by the disk selecting unit 63b.

The dividing unit 63e outputs a content received by the receiving unit 10, to the content recording unit 63d. Upon receipt of an instruction to divide the content by the record controlling unit 64a, the dividing unit 63e divides the content at the point where the instruction is received, and outputs the content parts to the content recording unit 63d.

The playback unit 64 internally has a playback controlling unit 64a and a content reading unit 64b. The playback unit 64 plays back a program.

The playback controlling unit 64a is a functional block for controlling playback of programs included in the program list table 74. Specifically, the playback controlling unit 64a searches the program list table 74 for a content corresponding to the program to be played back, and instructs the content reading unit 64b to read the content.

The content reading unit 64b reads the content from the HDD as instructed by the playback controlling unit 64a, and outputs the read content to the displaying unit 20.

The GUI displaying unit 65 internally has a GUI controlling unit 65a, an information obtaining unit 65b, and a GUI generating unit 65c. The GUI displaying unit 65 generates a GUI image and displays the GUI image on the displaying unit 20.

The GUI controlling unit 65a receives a GUI display instruction via a user operation or the like, and determines a type of a GUI image to be displayed. The GUI controlling unit 65a then instructs the information obtaining unit 65b to obtain information to be used to generate the GUI image, and instructs the GUI generating unit 65c to generate the GUI image.

The information obtaining unit 65b obtains, according to the instruction given by the GUI controlling unit 65a, information to be used to generate the designated GUI image from the management information group stored in the RAM 70.

Figure 11:
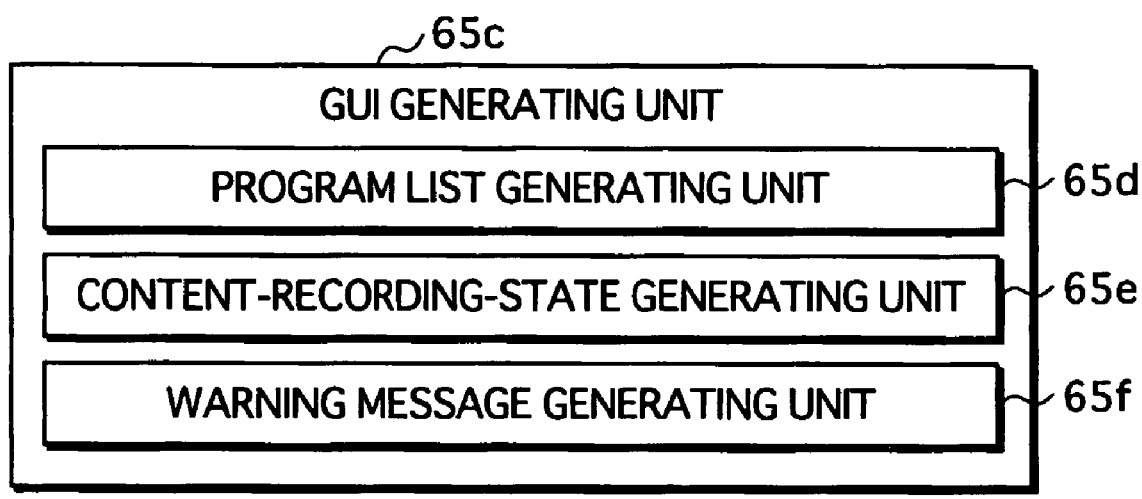
FIG. 11 shows an internal configuration of a GUI generating unit 65c.

FIG. 11 shows an internal configuration of the GUI generating unit 65c.

The GUI generating unit 65c internally has a program list generating unit 65d, a content-recording-state generating unit 65e, and a warning message generating unit 65f. Based on the information obtained by the information obtaining unit 65b, the GUI generating unit 65c generates a GUI image designated by the GUI controlling unit 65a and outputs the generated GUI image to the displaying unit 20.

The program list generating unit 65d generates a program list window for displaying a list of playable programs that are included in the program list table 74.

The content-recording-state generating unit 65e generates a content-recording-state window for displaying the content-recording-state of each HDD.

The warning message generating unit 65f generates a warning message window for displaying a warning message when an HDD is removed. The warning message window displays a list of programs that become unplayable after the removal of the HDD.

The following describes a specific example of a GUI image.

First, the following describes the program list window.

Figure 12:
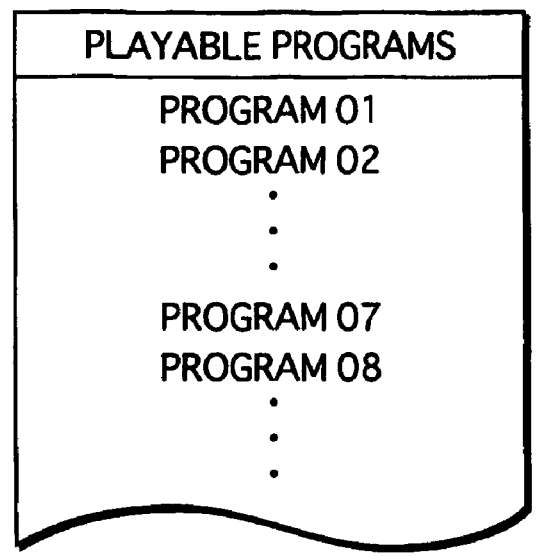
FIG. 12 shows a program list window displaying a list of playable programs.

FIG. 12 shows a program list window for displaying a list of playable programs.

The program list window is for presenting a list of playable programs to the user. The GUI controlling unit 65a receives a request to display the program list window by a user operation, instructs the information obtaining unit 65b to obtain information for the program list window, and instructs the GUI generating unit 65c to generate the program list window.

Upon receipt of the instruction, the information obtaining unit 65b obtains the program names 74a of all the programs listed in the program list table 74, and outputs the obtained information to the GUI generating unit 65c.

The GUI generating unit 65c uses the program list generating unit 65d, to generate the program list window displaying a list of playable programs using the program names 74a obtained by the information obtaining unit 65b. The GUI generating unit 65c displays the generated program list window on the displaying unit 20.

By referring to the program list window displayed as above, the user can check programs that are currently playable, without being aware of whether a content is stored as being divided into two HDDs.

It should be noted here that the information obtaining unit 65b may obtain, for each program listed in the program list table 74, the recording date and time and the playback time of the corresponding content, by referring to a piece of connected-disk information of an HDD storing the corresponding content included in the connected-disk management information table 72, and may display, on the program list window, the recording date and time and the playback time together with the program name of each viewable program.

The following describes the content-recording-state window screen.

Figure 13:
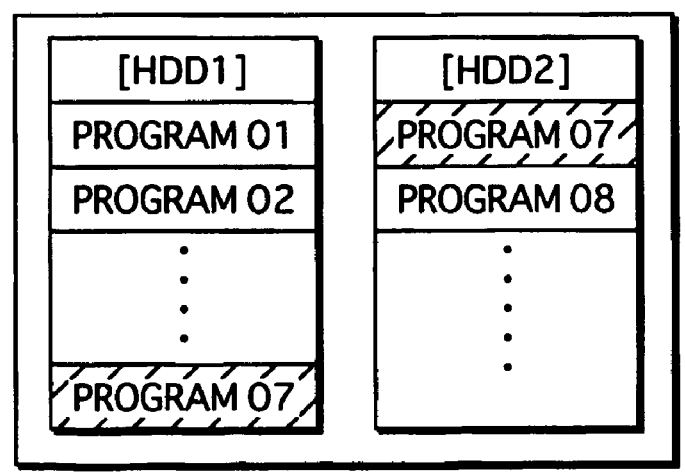
FIG. 13 shows a content-recording-state window displaying the content-recording-state of each HDD.

FIG. 13 shows the content-recording-state window showing the content-recording-state of each HDD.

The content-recording-state window is for presenting, to the user, a list of programs stored in each HDD.

The GUI controlling unit 65a receives a request to display the content-recording-state window by a user operation, instructs the information obtaining unit 65b to obtain information to be used to generate the content-recording-state window, and instructs the GUI generating unit 65c to generate the content-recording-state window.

Upon receipt of the instruction, the information obtaining unit 65b obtains, for each piece of connected-disk information included in the connected-disk management information table 72, the program ID information 73a of each piece of content management information whose address is set as the program index pointer 72h and each program title included in the management-purpose information 73*i*. The information obtaining unit 65*b* then outputs the obtained information to the GUI generating unit 65*c*.

The GUI generating unit 65*c* uses the content-recording-state generating unit 65*e* to generate the content-recording-state window displaying the content-recording-state of each HDD, using the program ID information 73*a* and the program titles obtained by the information obtaining unit 65*b*. The GUI generating unit 65*c* then displays the generated content-recording-state window on the displaying unit 20. When a plurality of HDDs respectively store pieces of content management information having the same value of the program ID information 73*a*, (i.e., when a plurality of HDDs respectively store a plurality of content parts to be concatenated together), the GUI generating unit 65*c* displays, on the content-recording-state window, programs corresponding to these content parts as shaded in the same color.

By referring to the content-recording-state window displayed as described above, the user can check contents stored in each HDD before removing an HDD. Also, the user can check whether a content is stored as being divided into two HDDs.

It should be noted here that the content-recording-state window may be displayed at a timing other than the timing when such a request to display the window is given by a user operation. For example, the content-recording-state window may be displayed before or after the management information group stored in the RAM 70 is updated due to connection or removal of an HDD.

It should be noted here that information to be displayed on the content-recording-state window may not be limited to program titles, but may be other information. For example, the information obtaining unit 65*b* may obtain the playback time or the like from the management-purpose information 73*i* included in each piece of content management information, and may display the playback time of the like on the content-recording-state window.

The following describes the warning message window.

Figure 14:
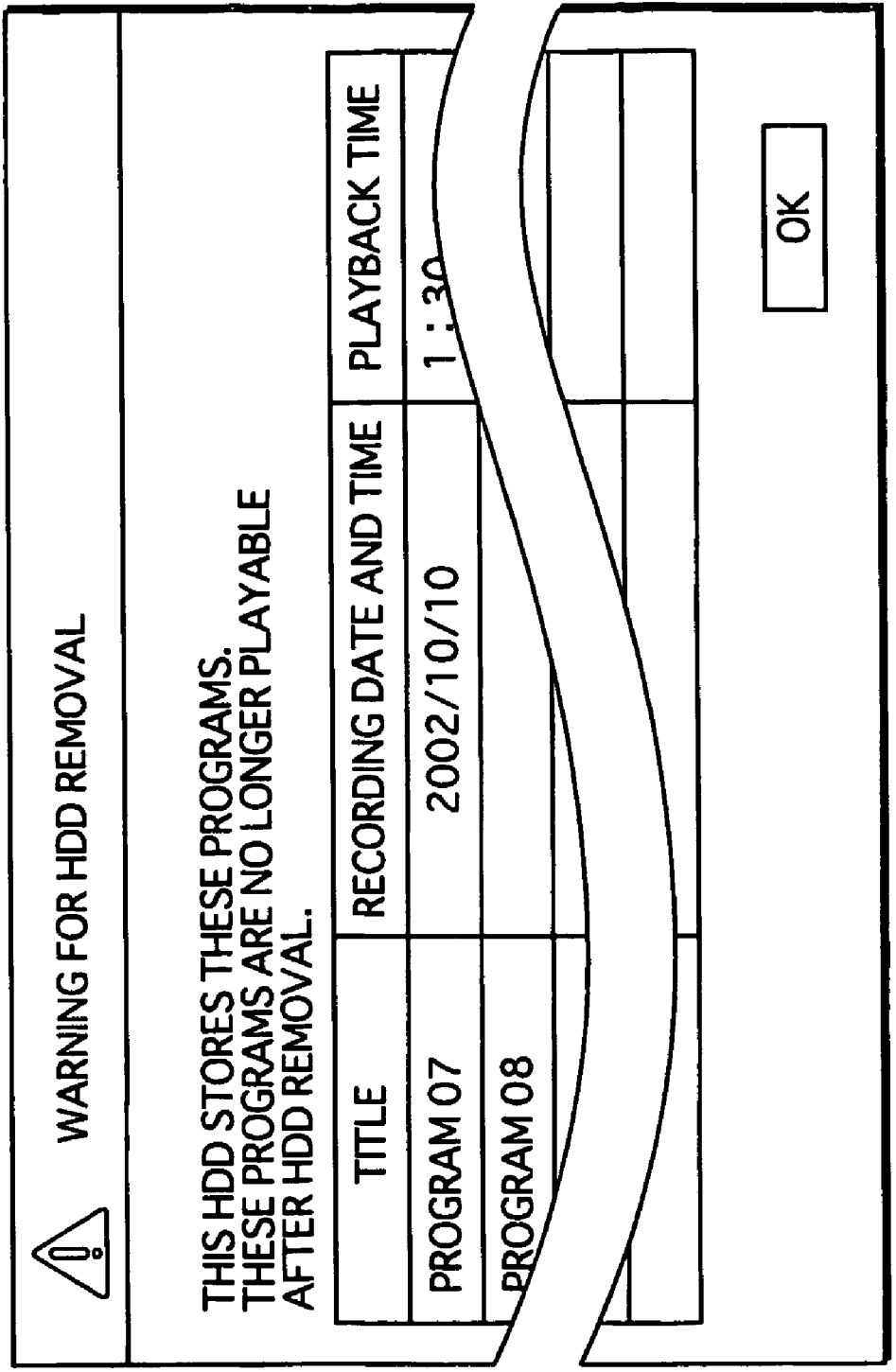
FIG. 14 shows a warning message window displaying a warning message when an HDD is removed.

FIG. 14 shows the warning message window to be displayed when an HDD is removed.

The warning message window is for displaying a warning message to the user when an HDD is removed. The warning message window specifically displays a list of programs that become unplayable after the removal of the HDD.

The GUI controlling unit 65*a* receives a notification of removal of an HDD from the medium detecting unit 62 before the management information group stored in the RAM 70 is updated, and instructs the information obtaining unit 65*b* to obtain information to be used to generate the warning message window, and instructs the GUI generating unit 65*c* to generate the warning message window.

Upon receipt of the instruction, the information obtaining unit 65*b* searches the connected-disk management information table 72 for a piece of connected-disk information of the HDD to be removed, and obtains the program title, the recording date and time, and the playback time from the management-purpose information 73*i* included in each piece of content management information whose address is set at the program index pointer 72*h* of the piece of connected-disk information of the HDD to be removed, and outputs the obtained information to the GUI generating unit 65*c*.

The GUI generating unit 65*c* that has obtained the information from the information obtaining unit 65*b* uses the warning message generating unit 65*f*, to generate the warning message window displaying a list of programs stored in the HDD to be removed, using the information obtained by the information obtaining unit 65*b*. The GUI generating unit 65*c* then displays the warning message window on the displaying unit 20.

By referring to the warning message window described above, the user can check programs that become unplayable after removal of an HDD.

It should be noted here that the information obtaining unit 65*b* may obtain the divide flag 73*c* together with the management-purpose information 73*i*, and the warning message generating unit 65*f* may shade a program corresponding to content parts on the warning message window, to indicate that the program becomes partially unplayable.

The following describes the transition of the state of a virtually-one-program corresponding to content parts stored respectively in a plurality of HDDs in the DVD/HDD recorder 100 with the above-described configuration.

Figure 15:
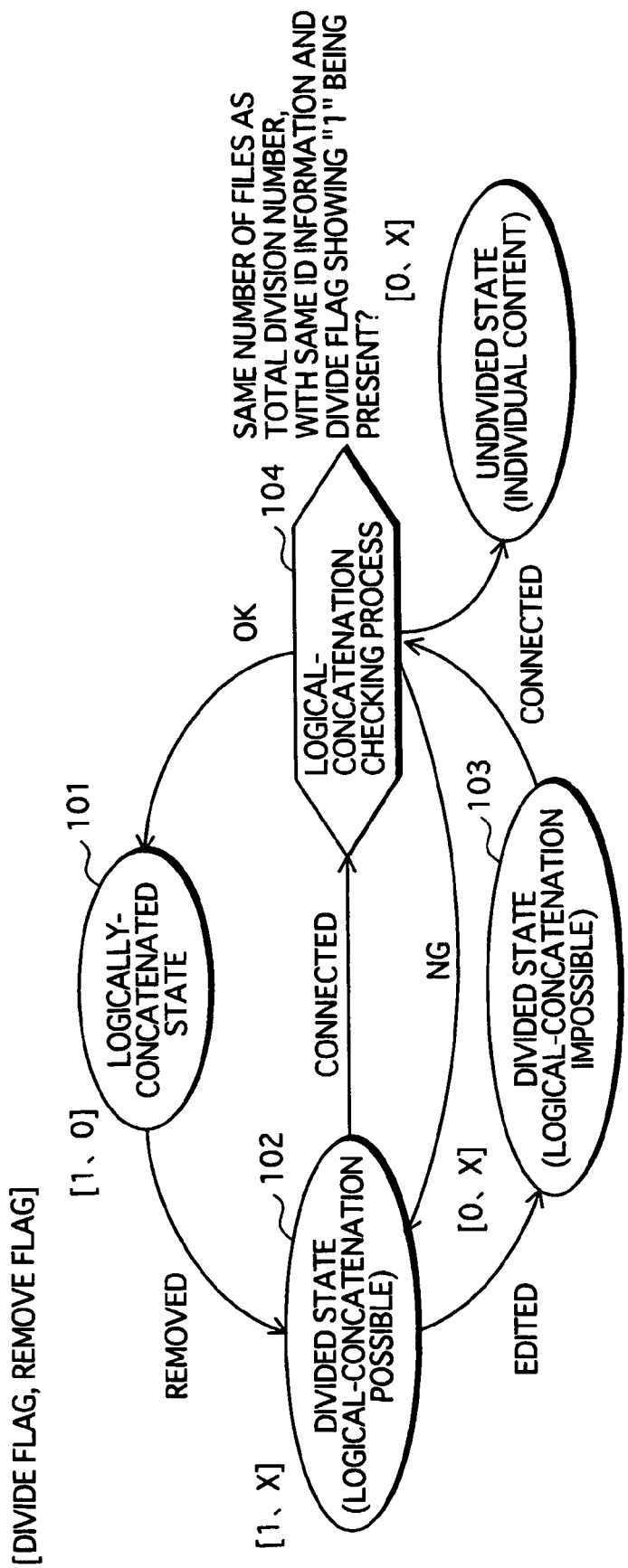
FIG. 15 shows the transition of the state of content parts.

FIG. 15 shows the transition of the state of the content parts.

In a logically-concatenated state 101, all HDDs storing content parts to be concatenated to construct a virtually-one-content have been connected to the DVD/HDD recorder 100. In this state, the content parts having the same value of the program ID information are logically concatenated to construct a virtually-one-content, and the virtually-one-content is entered in the program list table as one program. Removal of any HDD storing one of the content parts from the DVD/HDD recorder causes a transition from the logically-concatenated state 1010 to a divided state 102.

In the divided state 102, an HDD storing one of the content parts concatenated together in the logically-concatenated state 101 has been removed from the DVD/HDD recorder 100. In this state, each of the content parts stored respectively in HDDs connected to the DVD/HDD recorder 100 is entered into the program list table 74 as an individual program. Connection of the removed HDD to another DVD/HDD recorder and alteration of the content part stored in the HDD causes a transition from the divided state 102 to a divided state 103. Also, connection of the removed HDD again to the DVD/HDD recorder 100 causes a transition from the divided state 102 to a logical-concatenation checking process 104.

In the divided state 103, the content part has been edited by a DVD/HDD recorder other than the DVD/HDD recorder 100. Programs listed in the program list table 74 in the divided state 103 are the same as the programs listed in the program list table 74 in the divided state 102. For the edited content part, its storage address in the HDD and/or its size have been altered. Connection of the HDD storing this content part again to the DVD/HDD recorder 100 causes a transition from the divided state 103 to the logical-concatenation checking process 104.

In the logical-concatenation checking process 104, it is checked whether all content parts having the same program ID information as that of the content part stored in the newly connected HDD are stored in the HDDs connected to the DVD/HDD recorder 100. It is checked whether such content parts the number of which is equal to the total division number are stored in the connected HDDs. In the logical-concatenation checking process 104, it is also checked whether the address and the size of the content part stored in the newly connected HDD respectively match the recording start position 73*g* and the recording length 83*h* in the corresponding piece of content management information included in the content management information table 73. When all the content parts having the same program ID information as that of the content part stored in the newly connected HDD the number of which is equal to the total division number are stored, and the address and the size of the content part stored in the newly connected HDD match the corresponding recording start position 73g and the corresponding recording length 73h, a transition is made to the logically-concatenated state 101. When any of the content parts having the same program ID information are not stored, a transition is made to the divided state 102. When the address and the size of the content part stored in the newly connected HDD do not match the corresponding recording start position 73g and the corresponding recording length 73h, meaning that the content part stored in the newly connected HDD has been edited, a transition is made to an undivided state 105.

In the undivided state 105, the divide flag 73c of the content part whose address and size do not match the corresponding recording start position 73g and the corresponding recording length 73h is changed to "0", so that this content part is no longer recognized as a part of one program, but is recognized as one program. This content part and other content parts having the same program ID information are entered into the program list table 74 as individual programs.

In the logical-concatenation checking process 104, the divide flag 73c of only a content part judged to have been edited by another DVD/HDD recorder is set to "0". In the logical-concatenation checking process 104, however, the divide flag 73c for all the content parts having the same program ID information as the edited content part may be set to "0".

According to the above-described configuration, the DVD/HDD recorder 100 relating to the first embodiment can handle storage areas of two removable HDDs as one continuous storage area, by utilizing the management information group (the virtual drive management table 71, the connected-disk management information table 72, the content management information table 73, and the program list table 74). Even when a content is stored as being divided into two HDDs, therefore, the DVD/HDD recorder 100 can present the divided parts of the content as one program managed in the program list table 74, and thereby enabling the content parts corresponding to one program to be played back in the same manner as that for the original content before being divided. Further, each HDD stores one piece of disk management information. Due to this, even when one HDD storing a content part is removed from the DVD/HDD recorder 100, another content part that is stored in another HDD and that is to be concatenated together with such a missing content part can be recognized and played back as an individual program.

<Operations>

The following describes the operations of the DVD/HDD recorder 100 with the above-described configuration.

Figure 16:
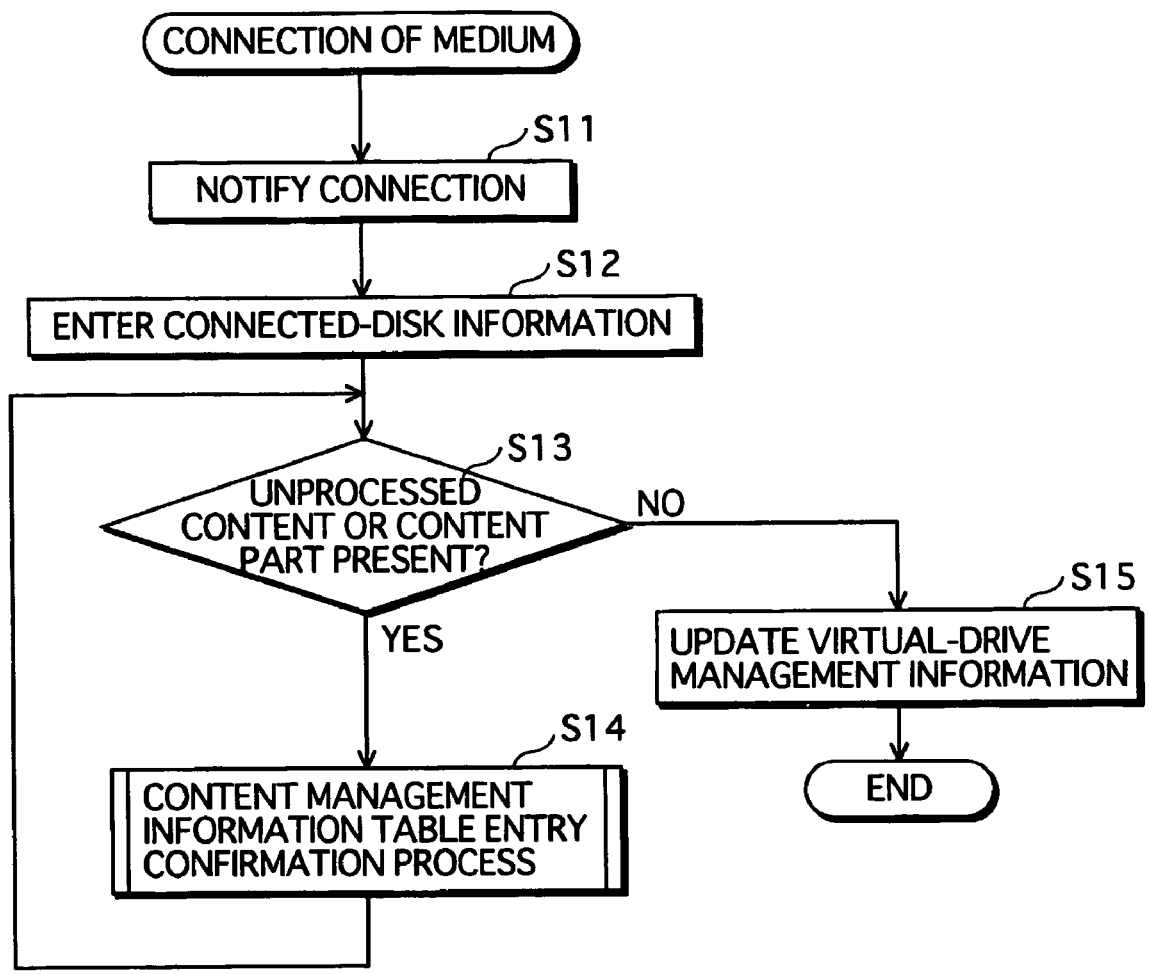
FIG. 16 is a flowchart showing an operation of the DVD/HDD recorder 100 when an HDD is connected thereto.

FIG. 16 is a flowchart showing the operation of the DVD/HDD recorder 100 when an HDD is connected thereto.

When an HDD is newly connected to the DVD/HDD recorder 100, the medium detecting unit 62 detects connection of the HDD, and notifies the table generating unit 61a of the detected connection (S11). Upon receipt of the detected connection, the table generating unit 61a updates the management information group stored in the RAM 70 by the following procedures.

First, the table generating unit 61a obtains a piece of disk management information stored in the newly connected HDD from the management information reading unit 61c, generates a piece of connected-disk information using the obtained piece of disk management information, and enters the generated piece of connected-disk information into the connected-disk management information table 72. Further, the table generating unit 61a sets an address at which the piece of connected-disk information is stored, at the connected-disk management information pointer 71h in the virtual-drive management information 71 (S12).

Following this, when finding a content (or a content part) whose entry into the content management information table 73 is yet to be confirmed in the newly connected HDD (S13: Yes), the table generating unit 61a obtains a piece of content management information corresponding to the content (or content part) from the management information reading unit 61c, and performs an entry confirmation process (described later) on the content (or content part) (S14). When completing the entry confirmation process on all the contents (or content parts) stored in the newly connected HDD (S13:No), the table generating unit 61a increments the disk total number 71b in the virtual-drive management information 71 by one, and adds the disk entire capacity, the disk unavailable capacity, and the disk available capacity of the newly connected HDD, respectively to the virtual-drive entire capacity 71e, the virtual-drive unavailable capacity 71f, and the virtual-drive available capacity 71g (S15).

The update of the management information group stored in the RAM 70 required when an HDD is newly connected is enabled by the operation described above.

Figure 17:
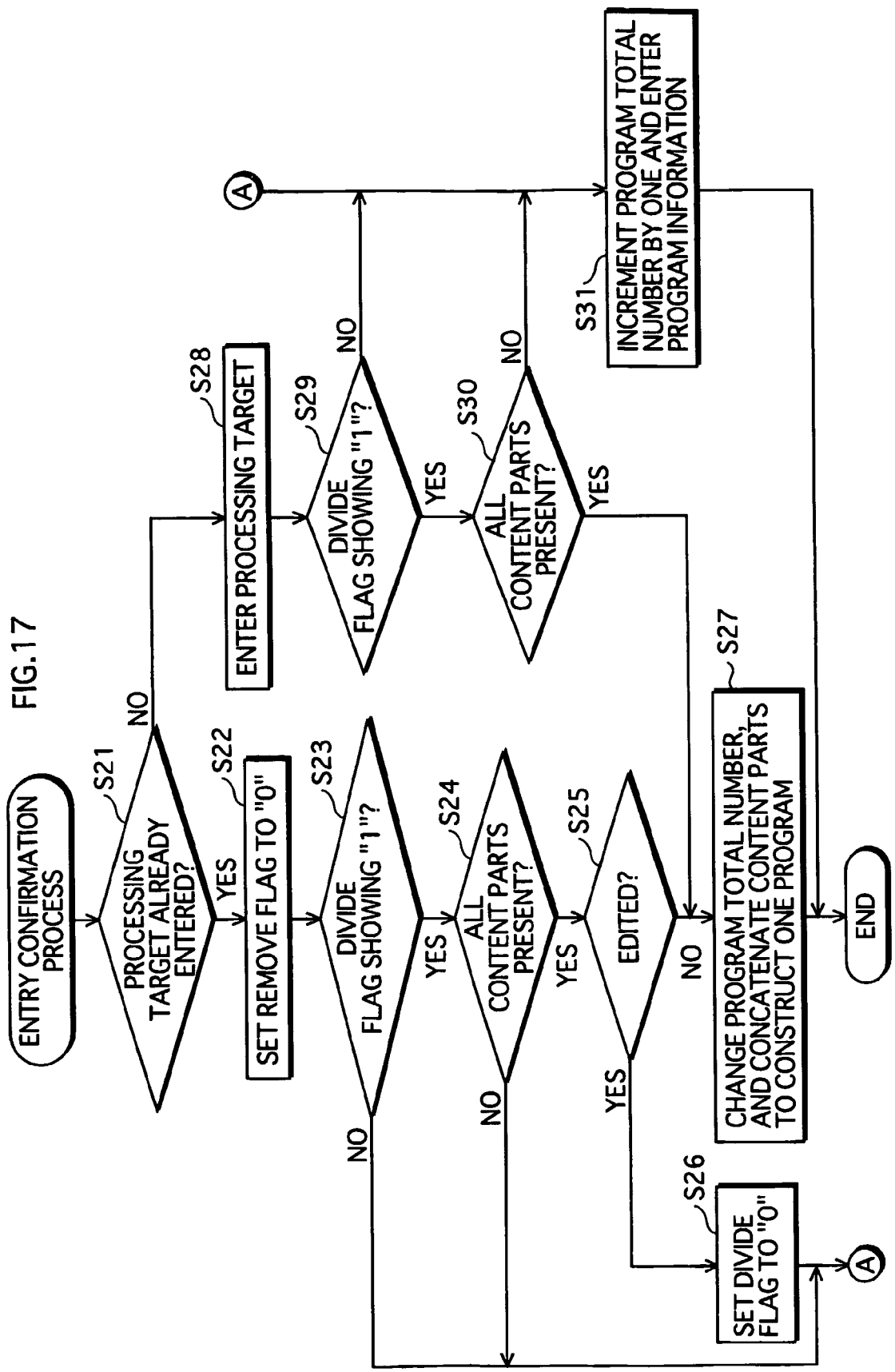
FIG. 17 is a flowchart showing a process for confirming entry into the content management information table 73.

The following describes in detail the entry confirmation process (S14 in FIG. 16). FIG. 17 is a flowchart showing the entry confirmation process.

First, the table generating unit 61a judges whether a piece of content management information corresponding to the content (or content part) read from the newly connected HDD (referred to as the "processing target") has been entered in the content management information table 73, using the program ID information and the sequence number included in the piece of content management information (S21).

When the piece of content management information corresponding to the processing target is yet to be entered into the content management information table 73 (S21:No), i.e., when the processing target has not been entered into the DVD/HDD recorder 100, the table generating unit 61a enters the piece of content management information into the content management information table 73 (S28).

When the divide flag 73c in the entered piece of content management information does not show "0", i.e., when the processing target is not a content part (S29:No), the table generating unit 61a increments the program total number 71c in the virtual-drive management information 71 by one, and enters a piece of program information of the processing target as a viewable program, into the program list table 74 (S31). The entry confirmation process ends here. It should be noted here that a program title included in the piece of content management information is used as the program name 74a of the piece of program information to be entered in S31, the content ID information included in the piece of content management information is used as the program ID information 74b, the virtually-one-program flag 74c is set to "0", and the disk ID information in the piece of disk management information table stored in the newly connected HDD is set at the storage disk information 74d.

When the divide flag 73c in the entered piece of content management information shows "1", i.e., when the processing target is a content part (S29:Yes), the logical-concatenation judging unit 61b judges whether this content part can be logically-concatenated together with the other content parts to construct a virtually-one-content, and notifies the table generating unit 61a of the judgment result.

The logical-concatenation judging unit 61b judges whether the content management information table 73 includes pieces of content management information corresponding to all the content parts the number of which is equal to the total division number 73*e* in the newly entered piece of content management information, and that have the same program ID information as that of the processing target. The logical-concatenation judging unit 61*b* also judges whether the remove flag 73*d* shows "0" for the pieces of content management information corresponding to all the content parts having the same program ID information as that of the processing target. The remove flag 73*d* showing "0" for all the pieces of content management information means that all the corresponding content parts are stored in the HDDs connected to the DVD/HDD recorder 100 (S30).

When all the content parts are stored in the HDDs connected to the DVD/HDD recorder 100 (S30:Yes), the logical-concatenation judging unit 61*b* determines that the processing target content part can be logically concatenated together with other content parts to construct a virtually-one-content, and notifies the table generating unit 61*a* of this judgment result. The table generating unit 61*a* decrements the program total number 71*c* by the number of content parts that have been already entered as individually viewable programs (the number being one smaller than the total division number 73*e* included in the piece of content management information), and increments the program total number 71*c* by one for this virtually-one-content. Further, the table generating unit 61*a* deletes pieces of program information corresponding to the content parts that have been entered as individually viewable programs, from the program list table 74, and enters the virtually-one-content as one viewable program into the program list table 74 (S27). The entry confirmation process ends here. Here, the program title included in the corresponding piece of content management information is used as the program name 74*a* in the newly entered piece of program information. The content ID information included in the corresponding piece of content management information is used as the program ID information 74*b*. The virtually-one-program flag 74*c* is set to "1". The disk ID information of the disk management information held by the newly connected HDD and the disk ID information that has been set at the storage disk information 74*d* in a piece of program information for each of the other content parts are newly set at the storage disk information 74*d*.

When any of the content parts are not stored in the HDDs connected to the DVD/HDD recorder 100 (S30:No), the logical-concatenation judging unit 61*b* determines that the processing target content part cannot be logically concatenated together with other content parts to construct a virtually-one-content, and notifies the table generating unit 61*a* of this judgment result. The table generating unit 61*a* increments the program total number 71*c* by one, and enters, as an individually viewable program, a piece of program information corresponding to the processing target content part, into the program list table 74 (S31). The entry confirmation process ends here.

When the piece of content management information corresponding to the processing target read from the newly connected HDD has been entered in the content management information table 73 (S21:Yes), the table generating unit 61*a* sets the remove flag 73*d* in the piece of content management information to "0" (S22). Following this, the table generating unit 61*a* judges whether the divide flag 73*c* shows "1", i.e., whether the processing target is a content part (S23). When the divide flag 73*c* shows "0", i.e., when the processing target is not a content part (S23:No), the table generating unit 61*a* increments the program total number 71*c* in the virtual-drive management information 71 by one, and enters a piece of program information of the processing target as a viewable program, into the program list table 74 (S31). The entry confirmation process ends here. When the divide flag 73*c* shows "1", i.e., when the processing target is a content part (S23:Yes), the logical-concatenation judging unit 61*b* judges whether the processing target content part can be concatenated together with other content parts to construct a virtually-one-content, by the following procedures, and notifies the table generating unit 61*a* of the judgment result.

First, the logical-concatenation judging unit 61*b* judges whether the content management information table 73 includes pieces of content management information corresponding to all the content parts the number of which is equal to the total division number 73*e* and that have the same program ID information as that of the processing target content part, and also whether the remove flag 73*d* shows "0" for the pieces of content management information corresponding to all the content parts having the same program ID information as that of the processing target content. The remove flag 73*d* showing "0" for all the pieces of content management information means that all the corresponding content parts are stored in the HDDs connected to the DVD/HDD recorder 100 (S24).

When any of the content parts are not stored in the HDDs connected to the DVD/HDD recorder 100 (S24:No), the logical-concatenation judging unit 61*b* determines that the processing target content part cannot be logically concatenated together with other contents to construct a virtually-one-content, and notifies the table generating unit 61*a* of this judgment result. The table generating unit 61*a* increments the program total number 71*c* by one, and enters, as an individually viewable program, a piece of program information corresponding to the processing target content part, into the program list table 74 (S31). The entry confirmation process ends here.

When all the content parts are stored in the HDDs connected to the DVD/HDD recorder 100 (S24:Yes), the logical-concatenation judging unit 61*b* judges whether the processing target content part has been edited, based upon the recording start position 73*g* and the recording length 73*h* included in the corresponding piece of content management information in the content management information table 73 (S25).

When the recording start position 73*g* and the recoding length 73*h* do not match the recording start position and the recording length included in the piece of content management information read from the HDD by the management information reading unit 61*c* (S25:No), the logical-concatenation judging unit 61*b* judges that the processing target content part has been edited in the divided state and the processing target content part cannot be logically concatenated together with other content parts to construct the virtually-one-content, and notifies the table generating unit 61*a* of this judgment result. To avoid such a case where this processing target content part is again subjected to the same judgment process, the table generating unit 61*a* sets the divide flag 73*c* for the processing target content part to "0" (S26), increments the program total number 71*c* included in the virtual-drive management information 71 by one, and enters a piece of program information corresponding to the processing target content part, as an individually viewable program, into the program list table 74 (S31). The entry confirmation process ends here.

When the record starting position 73*g* and the recording length 73*h* match the recording start position and the recording length of the piece of content management information read from the HDD by the management information reading unit 61*c* (S25:Yes), the logical-concatenation judging unit 61*b* judges that the processing target content part has not been edited in the divided state, and therefore, the processing target content part can be concatenated together with other content parts to construct the virtually-one-content, and notifies the table generating unit 61a of this judgment result. In this case, the processing target content part and other content parts to be concatenated to construct the virtually-one-content are in the logically-concatenated state, and therefore, these content parts can together be entered as one viewable program. Therefore, the table generating unit 61a decrements the program total number 71c by the number of the other content parts that have been already entered as individually viewable programs, (the number being one smaller than the total division number 73e included in the piece of content management information), and increments the program total number 71c by one for this virtually-one-content (S27). The entry confirmation process ends here.

The entry confirmation process is enabled by the operation described above. Therefore, with all storage media storing necessary content parts connected to the DVD/HDD recorder 100, the judgment performed in S30 can correctly judge that the content parts can be logically concatenated. Therefore, the DVD/HDD recorder 100 can correctly recognize and play back those content parts as a virtually-one-program, even when the content parts have been recorded as being divided into a plurality of HDDs by another DVD/HDD recorder having the same functions as the DVD/HDD recorder 100.

The first embodiment describes the case where the DVD/HDD recorder 100 judges whether the processing target has been edited in the divided state in S25. Alternatively in S25, the DVD/HDD recorder 100 may compare, for each of all content parts to be concatenated together with the processing target to construct a virtually-one-content, the recording start position 73g and the recording length 73h included in the corresponding piece of content management information, with its actual recording start position and its actual recording length in an HDD. The DVD/HDD recorder 100 may then determine, only when none of these content parts are judged to have been edited, that these content parts can be concatenated to construct the virtually-one-content, and execute the processing in S27.

Figure 18:
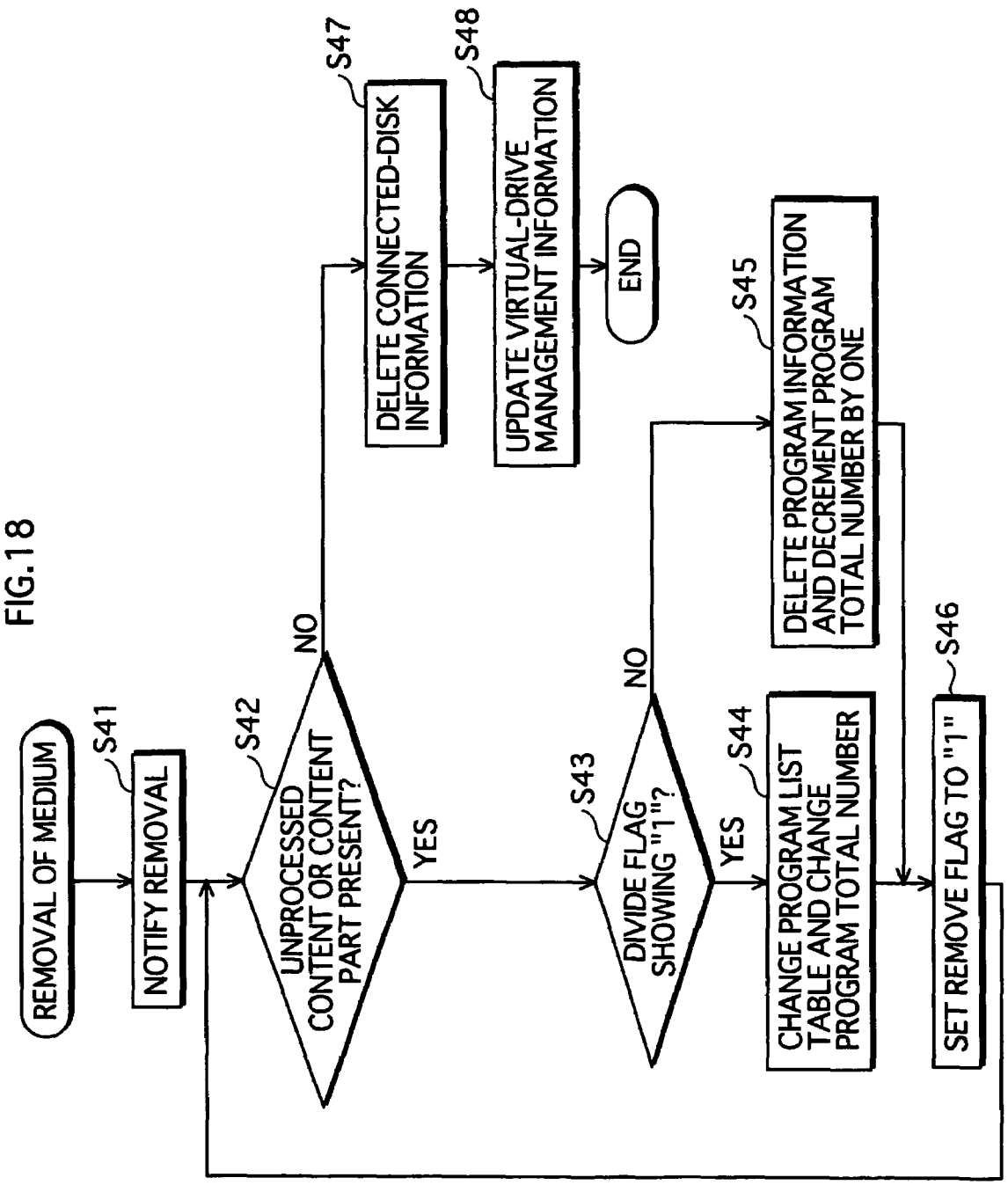
FIG. 18 is a flowchart showing an operation of the DVD/HDD recorder 100 when an HDD is removed therefrom.

The following describes the operation of the DVD/HDD recorder 100 when an HDD is removed. FIG. 18 is a flowchart showing the operation of the DVD/HDD recorder 100 when an HDD is removed therefrom.

When an HDD is removed from the DVD/HDD recorder 100, the medium detecting unit 62 detects removal of the HDD, and notifies the table generating unit 61a of the detected removal (S41). Upon receipt of the detected removal, the table generating unit 61a updates the management information group stored in the RAM 70 by the following procedures.

First, the table generating unit 61a obtains a piece of disk management information corresponding to the HDD to be removed, from the connected-disk management information table 72, and processes a content (or content part) (referred to as the "processing target") corresponding to each piece of content management information whose address is set at the program index pointer 72h in the obtained piece of connected-disk information (S42).

First, the table generating unit 61a judges whether the divide flag 73c in the piece of content management information corresponding to the processing target shows "1", i.e., whether the processing target is a content part (S43). When the processing target is a content part (S43:Yes), the table generating unit 61a deletes a piece of program information corresponding to a virtually-one-content to be constructed by concatenating the processing target content part and other content parts, and enters the other content parts whose disk ID information is set at the storage disk information 74d in the deleted piece of program information, into the program list table 74, as individually viewable programs. Further, the table generating unit 61a decrements the program total number 71c in the virtual-drive management information 71 by one for the deleted virtually-one-content, increments the program total number 71c by the number of the content parts entered into the program list table 74, and decrements the virtually-one-program total number 71d by one (S44). When the processing target is not a content part (S43:No), the table generating unit 61a deletes a piece of program information corresponding to the processing target from the program list table 74, and decrements the program total number 71c in the virtual-drive management information 71 by one (S45). Finally, the table generating unit 61a sets the remove flag 73d corresponding to the processing target in the content management information table to "1".

When all pieces of content management information whose addresses are set at the program index pointer 72h in the piece of disk management information corresponding to the HDD to be removed are processed (S42:No), the table generating unit 61a deletes the piece of connected-disk information corresponding to the HDD to be removed, from the connected-disk management information table 72 (S47). Finally, the table generating unit 61a decrements the disk total number 71b in the virtual-drive management information 71 by one, and deducts the disk entire capacity, the disk unavailable capacity, the disk available capacity of the HDD to be removed, respectively from the virtual-drive entire capacity 71e, the virtual-drive unavailable capacity 71f, and the virtual-drive available capacity 71g, and deletes an address at which the deleted piece of connected-disk information is stored, from the connected-disk management information pointer 71h (S48).

The update of the management information group stored in the RAM 70 required when an HDD is removed is enabled by the operation described above.

Figure 19:
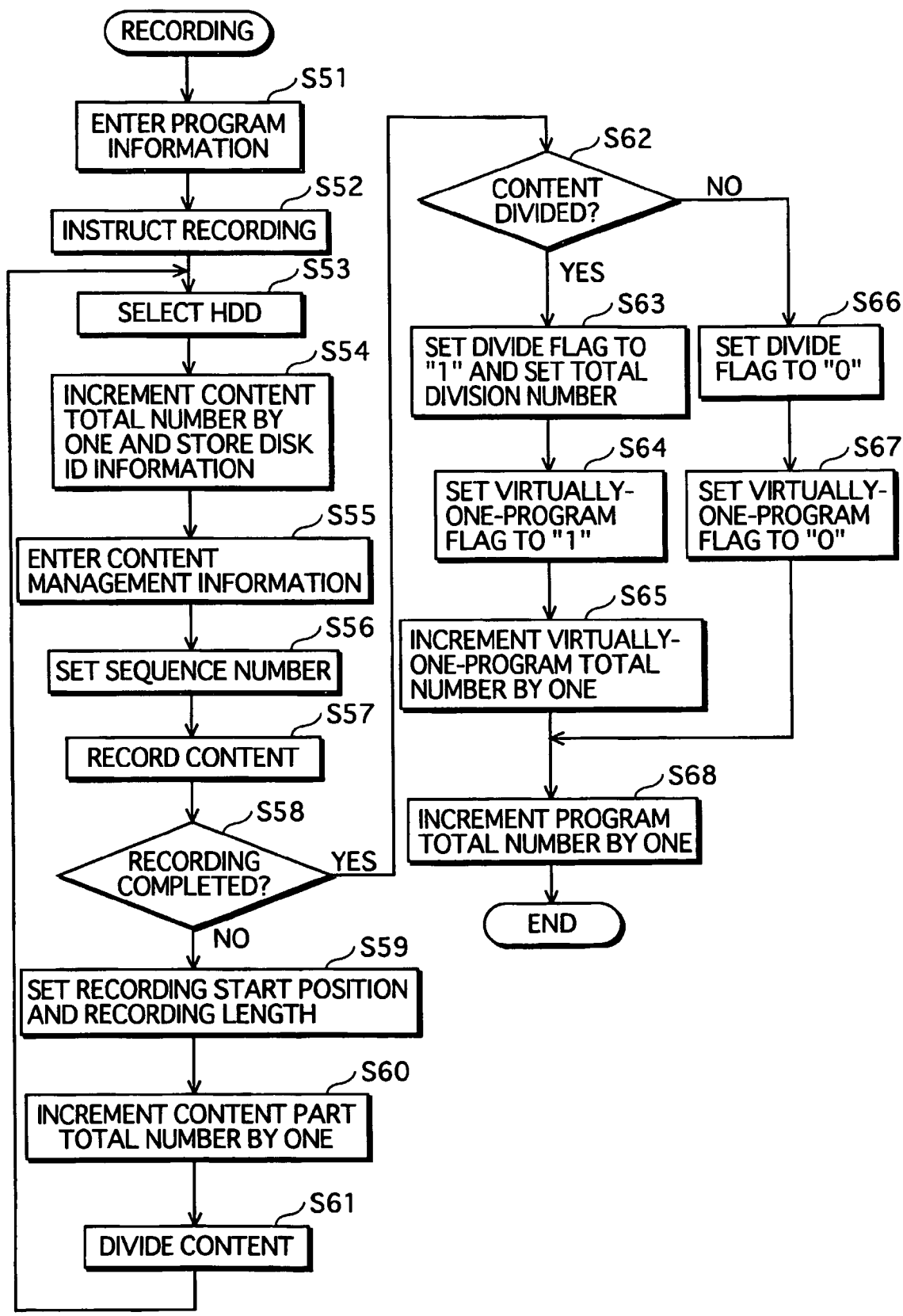
FIG. 19 is a flowchart showing an operation of the DVD/HDD recorder 100 for recording a content.

The following describes the operation of the DVD/HDD recorder 100 for recording a content. FIG. 19 is a flowchart showing the operation for recording a content.

First, the record controlling unit 63a receives an instruction to record a program (referred to as a "target program" or a "target content"), and determines program ID information 74b of the target program. The record controlling unit 63a generates a piece of program information for the target program, and enters the generated piece of program information into the program list table 74 (S51). The record controlling unit 63a then instructs the disk selecting unit 63b to select an HDD onto which the target program is to be recorded (S52). It should be noted here that the piece of program information is generated in such a manner that a title of the target program is set as the program name 74a but undefined values are set at the virtually-one-program flag 74c and the storage disk information 74d until these values are defined by the following procedures.

Upon receipt of the instruction, the disk selecting unit 63b refers to pieces of connected-disk management information included in the connected-disk management information table 72 in the order of their entries therein, and selects an HDD having an available storage area, as an HDD on which the target content is to be recorded, and notifies the record controlling unit 63a, the management information generating unit 63c, and the content recording unit 63d of the selected HDD (S53). Thereafter, the disk selecting unit 63b monitors the storage availability of the selected HDD. The record controlling unit 63a increments the content total number 72c in the piece of disk management information stored in the selected HDD by one, and sets the disk ID information 72a of the selected HDD at the storage disk information 74d in the corresponding piece of program information (S54). The management information generating unit 63c generates a piece of content management information corresponding to the target content, and enters the generated piece of content management information into the content management information table 73 (S55). The management information generating unit 63c then sets an address at which the piece of content management information is stored, at the program index pointer 72h in the piece of connected-disk information of the selected HDD. The program ID information 73a in the generated piece of content management information is set as the same value as the program ID information 74b of the target program, and the remove flag 73d is set to "0". The other items in the generated piece of content management information are set to have undefined values until values are defined by the following procedures. Hereafter, the management information generating unit 63c monitors the number of times the target content is divided, and sets the current sequence number as the sequence number 73f in the piece of content management information (S56). It should be noted here that the management information generating unit 63c sets the sequence number 73f of the first content part as "0", and sets the sequence number 73f of content parts following the first content part as numbers sequentially incremented one by one. When the target content is entirely stored in the HDD without being divided, the management information generating unit 63c sets the sequence number 73f to a null value of "−1".

Following this, the content recording unit 63d records the target content received from the receiving unit 10, into the available storage area of the selected HDD (S57). When the available storage area of the selected HDD is used up during the recording (S58:No), the disk selecting unit 63b notifies the record controlling unit 63a and the management information generating unit 63c that the available storage area has been used up. The management information generating unit 63c sets the recording start position 73g and the recording length 73h in the piece of content management information (S59). The record controlling unit 63a increments the content part total number 72d in the piece of connected-disk information corresponding to the HDD by one (S60), and instructs the dividing part 63e to divide the target content. Upon receipt of the instruction, the dividing unit 63e divides the target content (S61). The processing from S53 for selecting an HDD onto which the target content is to be recorded is repeated until the entire parts of the target content are recorded (S58: Yes). It should be noted here that the content received from the receiving unit 10 is accumulated in a buffer until the content is divided, and a content part in the accumulated content is transferred from the buffer to a newly selected HDD when recording of the content part is to be started. This ensures recording of the entire content without any missing parts.

When the target content is recorded as being divided into a plurality of HDDs (S62:Yes), the management information generating unit 63c sets the divide flag 73c in a piece of content management information corresponding to each content part to "1", and sets the total division number 73e as the number of the content parts of the target content (S63). Also, the record controlling unit 63a sets the virtually-one-program flag 74c to "1" (S64), and increments the virtually-one-program total number 71d in the virtual-drive management information 71 by one (S65). When the target content is entirely stored into one HDD (S62:No), the management information generating unit 63c sets the divide flag 73c in the piece of content management information corresponding to the target content to "0" (S66), and the record controlling unit 63a sets the virtually-one-program flag 74c in the program information to "0" (S67).

Finally, the record controlling unit 63a increments the program total number 71c in the virtual-drive management information 71 by one (S67).

The content recording is enabled by the operation described above.

With the above operation, the DVD/HDD recorder 100 can record one content as being divided into a plurality of HDDs when finding that an available storage area of one HDD is not large enough to store the entire content.

The above operation is based on the case where the size of the target content is unknown, like when recording of the target content is spontaneously started by a user instruction. When the size of the target content can be calculated in advance, like when the recording of the target content is preset, an HDD having an available storage area large enough to record the entire target content may be selected in advance as an HDD onto which the target content is to be recorded.

Figure 20:
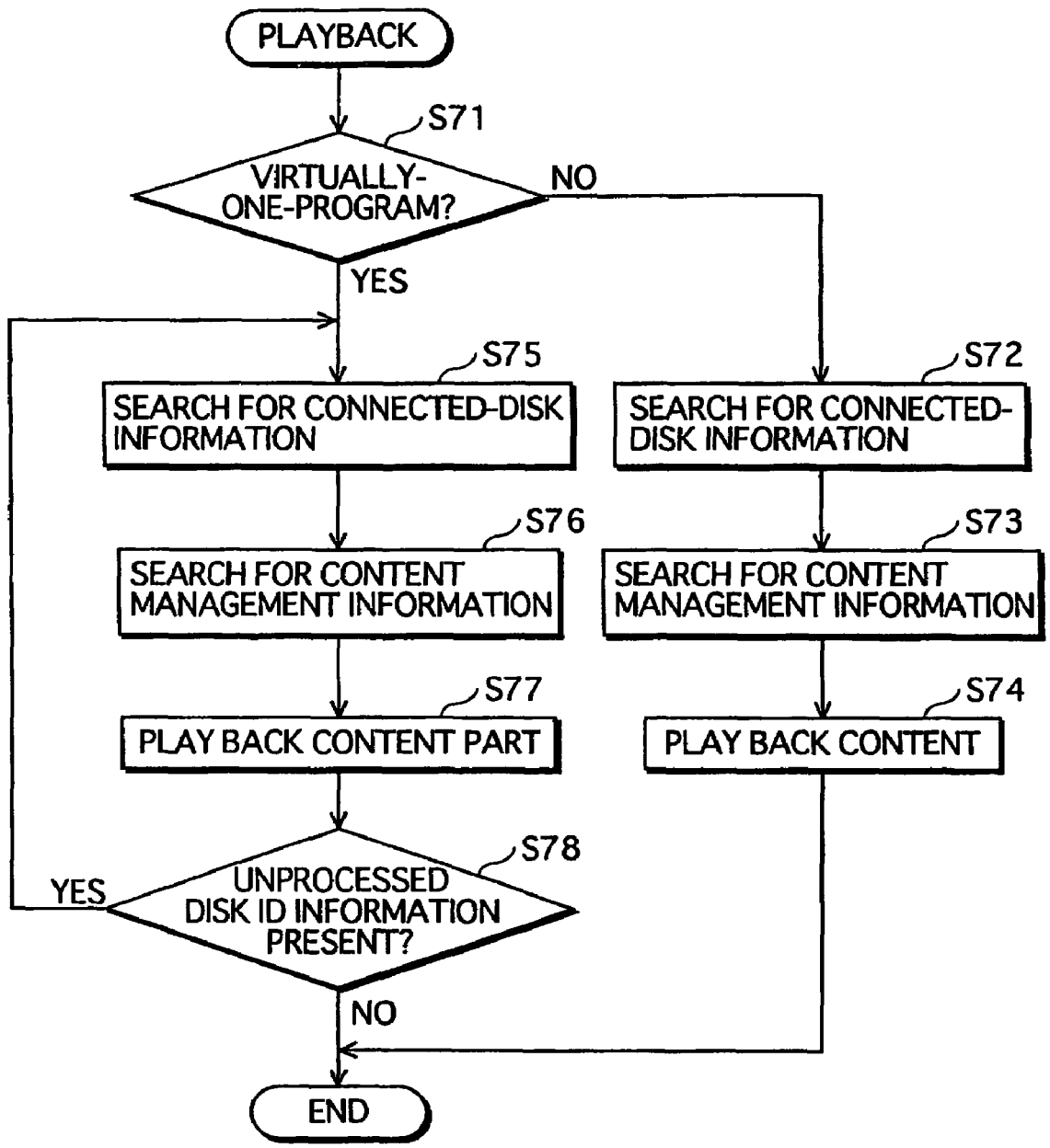
FIG. 20 is a flowchart showing an operation of the DVD/HDD recorder 100 for playing back a content.

The following describes the operation of the DVD/HDD recorder 100 for playing back a content. FIG. 20 is a flowchart showing the operation for playing back a content.

The playback controlling unit 64a obtains a piece of program information corresponding to a program designated by the user (referred to as a "target program") from the program list table 74, and judges whether the virtually-one-program flag 74c shows "1" (S71).

When the virtually-one-program flag 74c shows "0", meaning that the target program is not a virtually-one-program (S71:No), the playback controlling unit 64a searches the connected-disk management information table 72 using the disk ID information set at the storage disk information 74d in the piece of program information (S72). The playback controlling unit 64a refers to pieces of content management information whose addresses are set at the program index pointer 72h in the piece of obtained connected-disk information, to obtain a piece of content management information whose program ID information 73a matches the program ID information 74d of the target program. The playback controlling unit 64a instructs the content reading unit 64b to play back a content corresponding to the obtained piece of content management information (S73). The content reading unit 64b reads the content and plays back the read content (S74).

When the virtually-one-program flag 74c shows "1", meaning that the target program is a virtually-one-program (S71:Yes), the playback controlling unit 64a searches the connected-disk management information table 72 for the first disk ID information set at the storage disk information 74d in the piece of program information (S75), and refers to pieces of content management information whose addresses are set at the program index pointer 72h in the obtained piece of connected-disk information, to obtain a piece of content management information corresponding to a content part corresponding to the target program, using the program ID information 74b of the target program (S76). The playback controlling unit 64a instructs the content reading unit 64b to play back the content part corresponding to the obtained piece of content management information. The content reading unit 64b reads and plays back the content part (S77). When the piece of program information includes next disk ID information set at the storage disk information 74d, i.e., when another content part corresponding to the target program is yet to be played back (S78:Yes), the playback controlling unit 64a repeats the processing from S75 for searching the connected-disk management information table 72 for next disk ID information, until all the disk ID information set at the storage disk information 74 is processed, i.e., until all the content parts corresponding to the target program are played back (S78: No).

The content playback is enabled by the operation described above.

It should be noted here that searching for a next content part is performed during reading of a preceding content part. This ensures continuous reading of the entire content without any missing parts.

The first embodiment describes the case where a program corresponding to a virtually-one-content to be constructed by concatenating content parts cannot be viewed when an HDD storing one of the content parts is removed, and the remaining content parts after the removal are entered as individually viewable programs into the program list table 74. However, the present invention should not be limited such.

For example, pieces of program information corresponding to these remaining content parts may not be generated, so that these content parts in the divided state cannot be viewed. In this case, the operation when an HDD is removed is modified as follows. When a processing target stored in an HDD to be removed is a content part (S43:Yes in FIG. 18), apiece of program information corresponding to a virtually-one-content constructed by the processing target content part and other content parts is deleted from the program list table 74, and the program total number 71*c* in the virtual drive management information is decremented by one, and pieces of program information corresponding to the other content parts are not generated. Also, the operation when an HDD is newly connected is modified as follows. When all content parts to be concatenated to construct a virtually-one-content are not stored in connected HDDs (S24:No in FIG. 17), a piece of program information corresponding to a content part stored in the newly connected HDD is not generated. Further, when the content part stored in the newly connected HDD has been edited (S25:No in FIG. 17), this content part and other content parts having the same program ID information thereafter cannot be logically concatenated, and therefore, this content part stored in the newly connected HDD and the other content parts stored in HDDS that have been connected to the DVD/HDD recorder 100 may be all deleted.

Also, the content parts in the divided state maybe entered into the program list table 74 as one viewable program with its program part missing.

The following describes the operation of the DVD/HDD recorder 100 when the content parts in the divided state are not entered as individually viewable programs but are entered as one viewable program with its program part missing.

Figure 21:
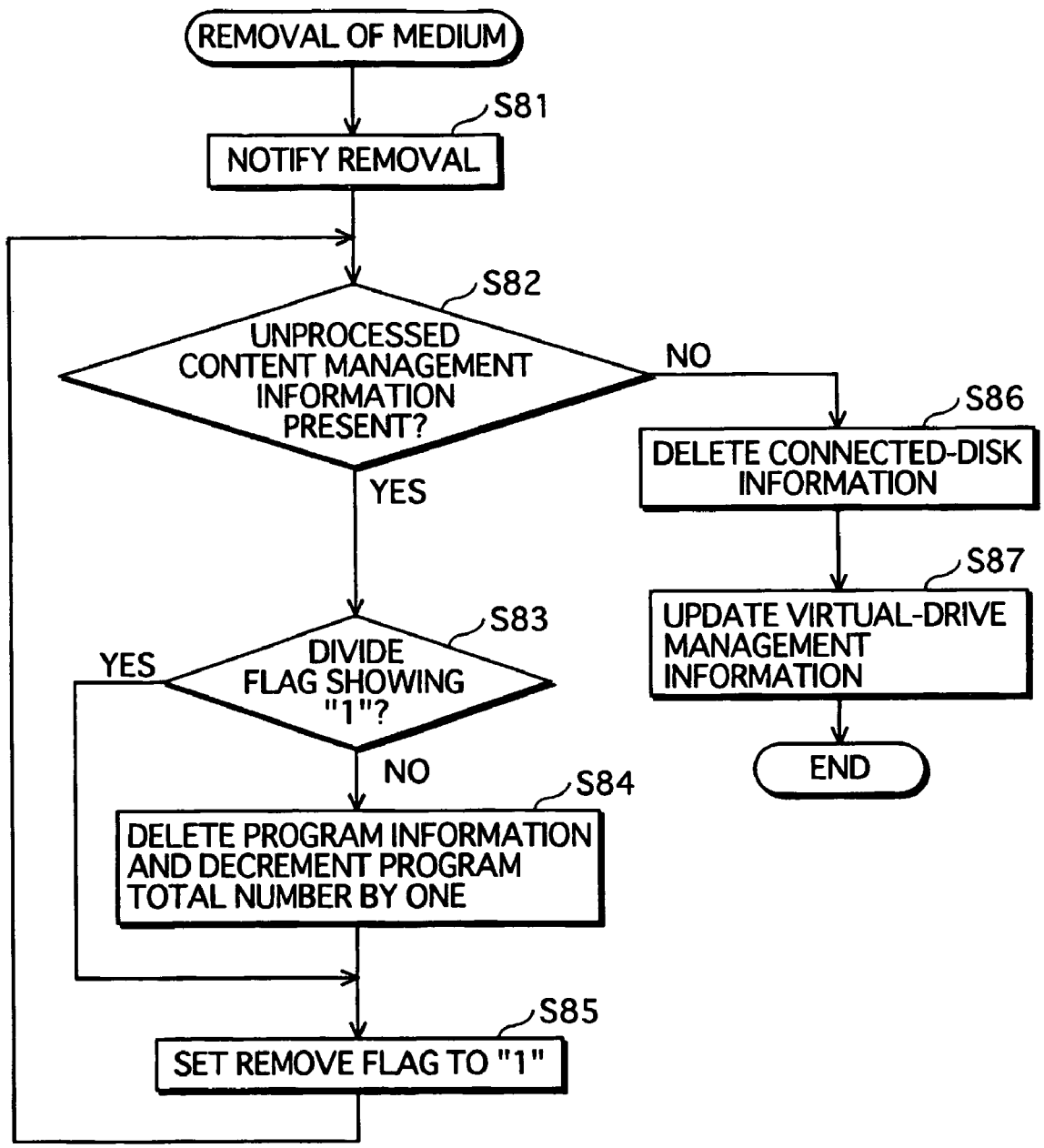
FIG. 21 is a flowchart showing an operation of the DVD/HDD recorder 100 when an HDD is removed therefrom, which enables a virtually-one-program in the divided state to be viewable.

The following first describes the operation for updating the management information group stored in the RAM 70 when an HDD is removed. FIG. 21 is a flowchart showing an operation of the DVD/HDD recorder 100 when an HDD is removed therefrom, which enables a virtually-one-program in the divided state to be viewable.

It should be noted here that the operation part that is the same as the part of the operation shown in FIG. 18 for entering each of the content parts in the divided state as an individually viewable program is not described here. Only the operation part that is different from the operation shown in FIG. 18 is described here.

First, when the divide flag 73*c* in the piece of content management information corresponding to the processing target shows "1", i.e., when the processing target is a content part (S83:Yes in FIG. 21, S43:Yes in FIG. 18), the operation shown in FIG. 18 is such that the table generating unit 61*a* deletes a piece of program information corresponding to a virtually-one-content to be constructed by concatenating the processing target content part and other content parts, and enters the other content parts whose disk ID information is set at the storage disk information 74*d* of the deleted piece of program information, into the program list table 74, as individually viewable programs. Further, the table generating unit 61*a* decrements the program total number 71*c* in the virtual-drive management information 71 by one for the deleted virtually-one-content, increments the program total number 71*c* by the number of the content parts entered into the program list table 74, and decrements the virtually-one-program total number 71*d* by one (S44 in FIG. 18).

On the other hand, in this modification where the content parts in the divided state are not entered as individually viewable programs but are entered as one viewable program with its program part missing, the table generating unit 61*a* does not update the program list table 74 and the virtual drive management information 71.

As a result of this, even when content parts are in the divided state where an HDD storing one of the content parts is removed, the corresponding virtually-one-program is not deleted from the program list table 74, but is presented to the user as one viewable program.

Figure 22:
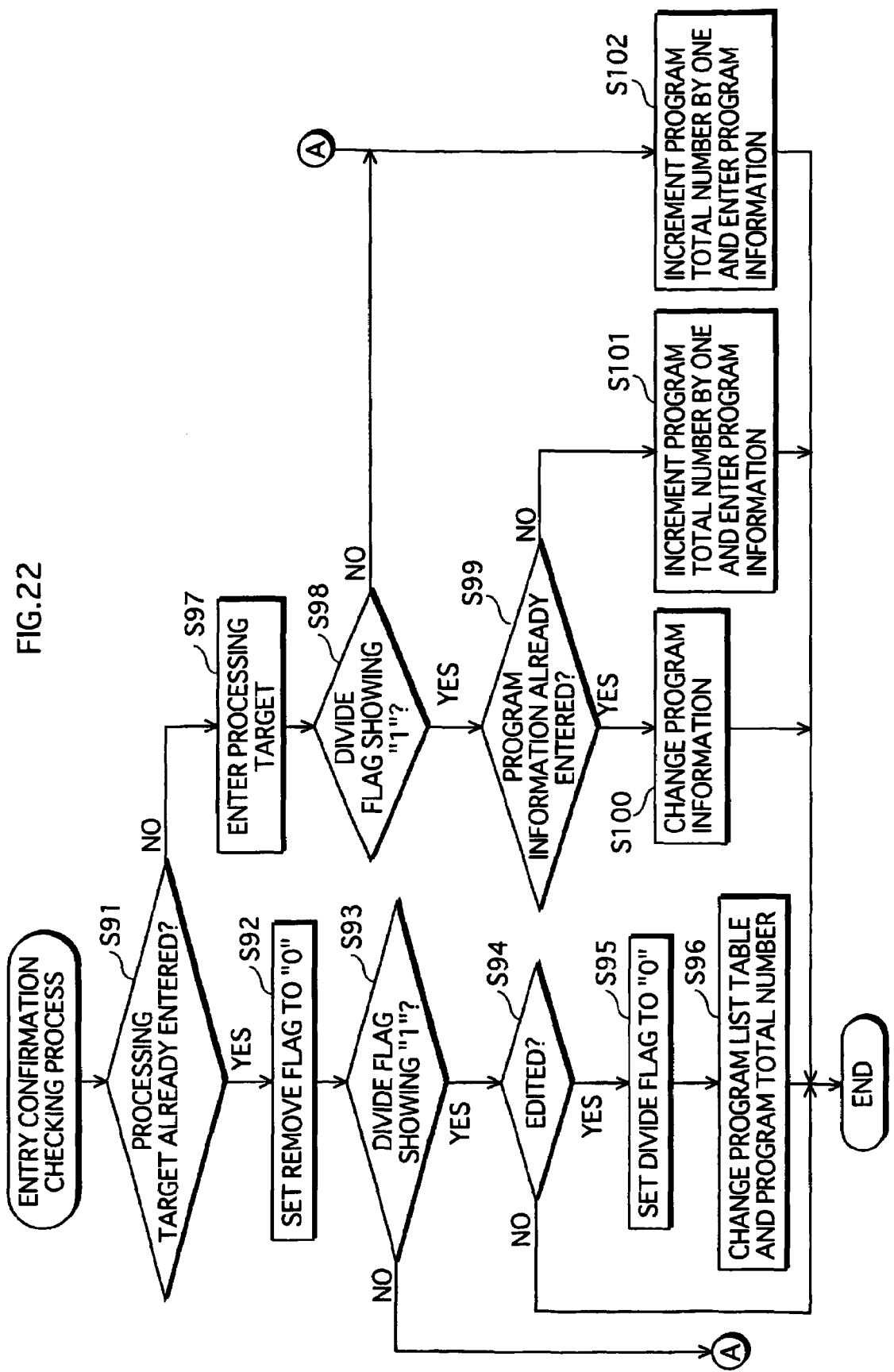
FIG. 22 is a flowchart showing a process for confirming entry into the content management information 73 when an HDD is connected.

The following describes the process of confirming entry into the content management information table 73 when an HDD is connected. FIG. 22 is a flowchart showing the entry confirmation process to be executed when an HDD is connected, which enables a virtually-one-program in the divided state to be viewable.

It should be noted here that the operation part that is the same as the part of the operation shown in FIG. 17 for making each of the content parts in the divided state as an individually viewable program is not described here. Only the operation part that is different from the operation shown in FIG. 17 is described here.

In S97 in FIG. 22 and S28 in FIG. 17, when the divide flag 73*c* in the piece of content management information corresponding to the processing target shows "1", i.e., when the processing target is a content part (S98:Yes in FIG. 22, S29: Yes in FIG. 17), the operation shown in FIG. 17 is such that the logical-concatenation judging unit 61*b* judges whether all the other content parts to be concatenated together with the processing target content part to construct a virtually-one-content are stored in the HDDs connected to the DVD/HDD recorder 100 (S30 in FIG. 17).

On the other hand, in this modification where the content parts in the divided state are entered as one viewable program with its program part missing, the table generating unit 61*a* judges whether a piece of program information including the program ID information 74*b* that is the same as the program ID information 73*a* in the newly entered piece of content management information, i.e., whether a virtually-one-content constructed by the processing target content part has been already entered as a virtually-one-program (S99 in FIG. 22).

When the piece of program information including the program ID information 74*b* that is the same as the program ID information 73*a* in the newly entered piece of content management information is included in the program list table 74 (S99:Yes in FIG. 22), the table generating unit 61*a* adds the disk ID information 72*a* of the HDD storing the processing target content part at the storage disk information 74*d* (S100 in FIG. 22). The confirmation entry process ends here. For additionally setting the disk ID information 72*a* at the storage disk information 74*d*, the table generating unit 61*a* refers to the sequence number 73*f* of each content part constructing the virtually-one-program, and determines the order in which the disk ID information corresponding to each content part is set at the storage disk information 74*d*.

When the piece of program information including the program ID information 74b that is the same as the program ID information 73a in the newly entered piece of content management information is not included in the program list table 74 (S99:No in FIG. 22), the table generating unit 61a increments the program total number 71c by one and the virtually-one-program total number 71d by one in the virtual-drive management information 71, and enters a piece of program information for a content corresponding to the entered piece of content management information, into the program list table 74 (S101 in FIG. 22). The entry confirmation process ends here. Here, the program title included in the corresponding piece of content management information is used as the program name 74a in the newly entered piece of program information. The content ID information included in the corresponding piece of content management information is used as the program ID information 74b. The virtually-one-program flag 74c is set to "1". The disk ID information included in the disk management information held by the newly connected HDD is set at the storage disk information 74d.

When the piece of content management information corresponding to the processing target has been entered in the content management information table 73 (S91:Yes in FIG. 22, S21:Yes in FIG. 17), and also the divide flag 73c for the processing target shows "1", i.e., the processing target is a content part (S93:Yes in FIG. 22, S23:Yes in FIG. 17), the operation in FIG. 17 is such that the logical-concatenation judging unit 61b judges whether all the other content parts to be concatenated together with the processing target content part to construct a virtually-one-content are stored in the HDDs connected to the DVD/HDD recorder 100 (S24 in FIG. 17).

On the other hand, in this modification where the content parts in the divided state are entered as one viewable program with its program part missing, the logical-concatenation judging unit 61b judges whether the processing target content part has been edited, based on the recording start position 73g and the recording length 73h in the piece of content management information (S94 in FIG. 22).

When the recording start position 73g and the recording length 73h match the actual recording start position and the actual recording length of the processing target content part obtained based on an address where the processing target content part is stored in the HDD (S94:Yes in FIG. 22), the logical-concatenation judging unit 61b judges that the processing target content part has not been edited, and therefore, judges that the processing target content part and the other content parts can be concatenated to construct the virtually-one-content. In this case, the entry confirmation process ends here, without the table generating unit 61a updating the program list table 74.

When the recording start position 73g and the recording length 73h do not match the actual recording start position and the actual recording length of the processing target content part (S94:No in FIG. 22), the logical-concatenation judging unit 61b judges that the processing target content part has been edited. In this case, the table generating unit 61a sets the divide flag 73c to "1" for a piece of content management information corresponding to each of the other content parts to be concatenated together with the processing target content part to construct the virtually-one-content, to thereafter avoid entry of this virtually-one-content as a virtually-one-program (S95 in FIG. 22). The table generating unit 61a then deletes a piece of program information corresponding to the processing target content part from the program list table 74, and enters pieces of program information for the content parts whose disk ID information is set at the storage disk information 74d, as individually viewable programs. Further, the table generating unit 61a decrements the program total number 71c in the virtual drive management information 71 by one for this virtually-one-content, and increments the program total number 71c by the number of the content parts whose pieces of program information have been newly entered (S96 in FIG. 22). The entry confirmation process ends here.

With the operation described above, when a content part stored in a newly connected HDD has not been edited, the corresponding missing program part of a virtually-one-program can be made viewable. When a content part stored in a newly connected HDD has been edited, the corresponding missing program part of a virtually-one-program cannot be made viewable thereafter. In the latter case, the other content parts corresponding to the virtually-one-program with its program part missing are entered into the program list table 74 as individually viewable programs.

It should be noted here that the update of the program list table 74 to be performed when the processing target content part has been edited should not be limited to the example described above. The edited content part may be excluded from the content parts corresponding to the virtually-one-program. In this case, the processing in S96 is modified as follows. The disk ID information corresponding to the edited content part is deleted from the storage disk information 74d in the piece of program information, and the total division number for a piece of content management information corresponding to each content part constructing the virtually-one-program is decremented by one. This results in generation of a new virtually-one-program that is constructed by content parts smaller in number by one than the previous virtually-one-program. Further, the edited content part can be entered into the program list table 74 as an individual program, resulting in generation of a new program.

Figure 23:
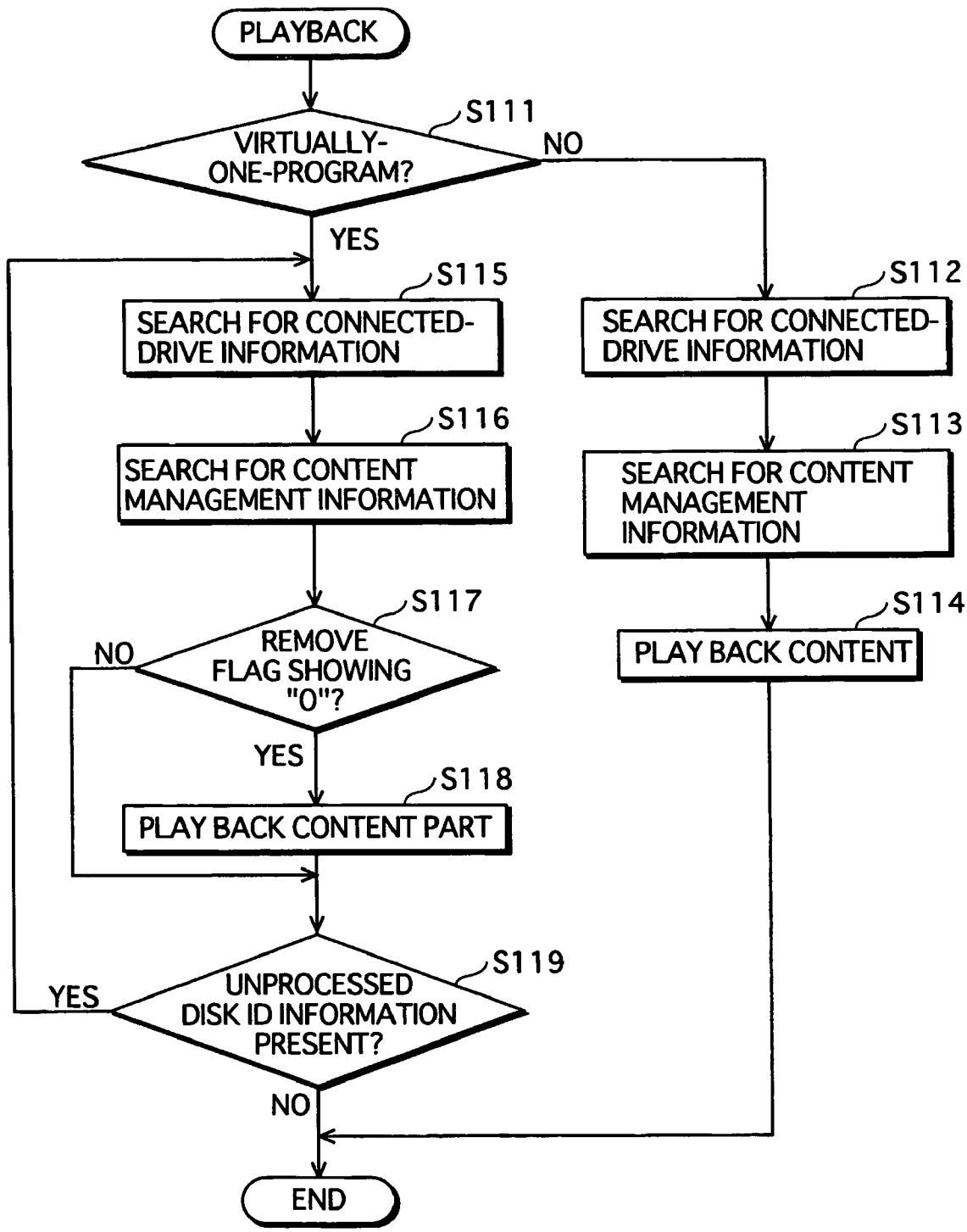
FIG. 23 is a flowchart showing an operation for playing back a content, which enables a virtually-one-program in the divided state to be viewable.

The following describes the operation of the DVD/HDD recorder 100 for playing back a content. FIG. 23 is a flowchart showing an operation for playing back a content, which enables a virtually-one-program in the divided state to be viewable.

It should be noted here that the operation part that is the same as the part of the operation shown in FIG. 20 for making each of the content parts in the divided state as an individually viewable program is not described here. Only the operation part that is different from the operation shown in FIG. 20 is described here.

After obtaining a piece of content management information corresponding to the target content from pieces of content management information whose addresses are set at the program index pointer 72h in the piece of connected-disk information, using the program ID information 74b of the target program (S116 in FIG. 23 and S76 in FIG. 20), the operation shown in FIG. 20 is such that the content reading unit 64b plays back the content part corresponding to the obtained content management information (S77 in FIG. 20).

On the other hand, in this modification where the content parts in the divided state are entered as one viewable program with its program part missing, the playback controlling unit 64a judges whether the remove flag 73d in the obtained piece of content management information shows "0", i.e., whether an HDD storing the content part to be played back has been connected to the DVD/HDD recorder 100 (S117 in FIG. 23).

When the remove flag 73d for the content part shows "0", i.e., when the HDD storing the content part has been connected (S117:Yes in FIG. 23), the playback unit 64 plays back the obtained content part (S118 in FIG. 23). When the remove flag 73d for the content part shows "1", i.e., when the HDD storing the content part is removed (S117:No in FIG. 23), the playback unit 64 does not play back the obtained content part, and advances to the subsequent processing (S119 in FIG. 23).

With the operation described above, when an HDD storing a content part to construct a virtually-one-program is removed, the virtually-one-program can be played back with such a missing program part being skipped.

In this case where the content parts in the divided state are entered as one viewable program with its program part missing, the software 110 may have a GUI generating unit 65g instead of the GUI generating unit 65c.

Figure 24:
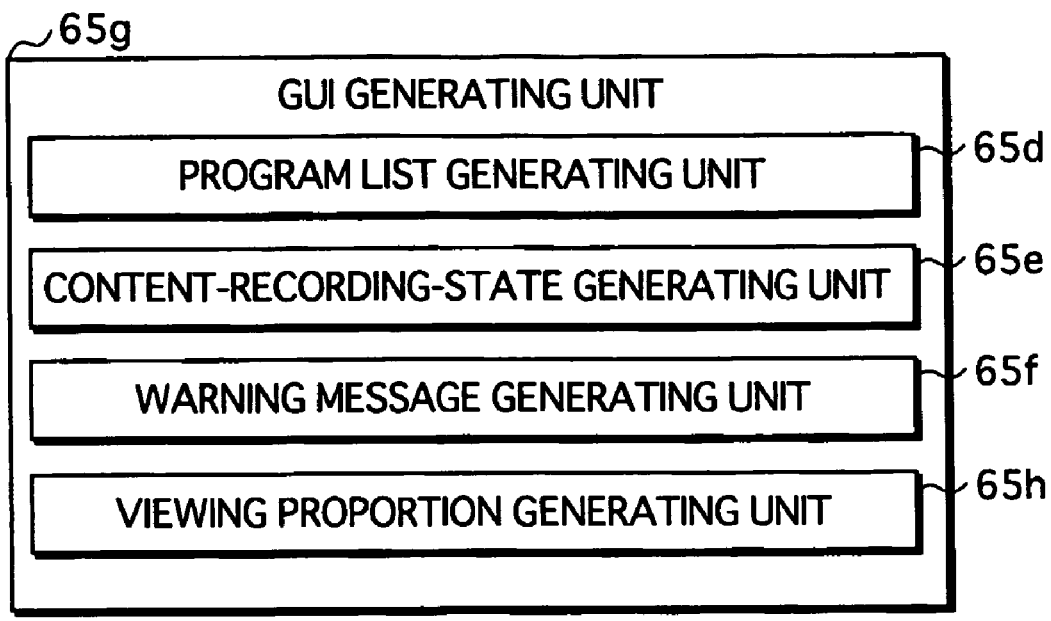
FIG. 24 shows a configuration of a GUI generating unit 65g that internally has a viewing proportion generating unit 65h.

FIG. 24 shows a configuration of the GUI generating unit 65g that internally has a viewing proportion generating unit 65h. The GUI generating unit 65g includes the viewing proportion generating unit 65h that generates a viewing proportion window displaying playable parts and unplayable parts of a virtually-one-program.

Figure 25:
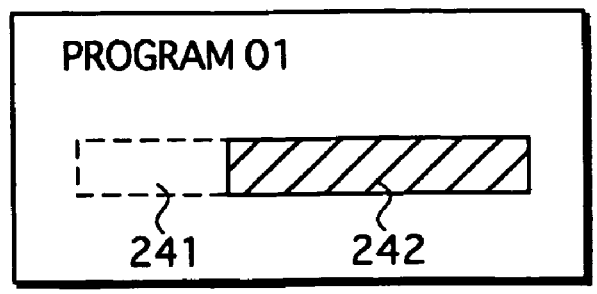
FIG. 25 shows a viewing proportion window for displaying the state of a virtually-one-program with its program part missing.

The viewing proportion generating unit 65h generates a viewing proportion window that is composed of a display portion 241 that is unshaded and a display portion 242 that is shaded. The unshaded display portion 241 indicates a playable portion of a program. The shaded display portion 242 indicates an unplayable portion of the program. FIG. 25 shows the viewing proportion window for displaying the state of a virtually-one-program with its program part missing.

It should be noted here that the viewing proportion generating unit 65h may generates a viewing proportion window for displaying a proportion of the playback time for a playable portion and the playback time for an unplayable portion. Alternatively, the viewing proportion generating unit 65h may combine the program list window shown in FIG. 12 with the viewing proportion window, to generate a window for listing all programs and their unplayable and playable portions.

It should be noted here that the operation for recording a content in the case where the content parts in the divided state are entered as one viewable program with its program part missing is the same as the operation shown in FIG. 19.

Second Embodiment

<Outline>

When recording a content, the DVD/HDD recorder 100 relating to the first embodiment checks an available capacity of each HDD in the order where each HDD is set at the connected-drive management information pointer 71h in the virtual-drive management information 71, and selects the first HDD that is found to have an available capacity, as a target medium onto which the content is to be recorded. On the other hand, a DVD/HDD recorder 200 relating to a second embodiment of the present invention selects the target medium, based upon such a criterion that enables easy management of contents when an HDD is connected or removed.

<Configuration>

Figure 26:
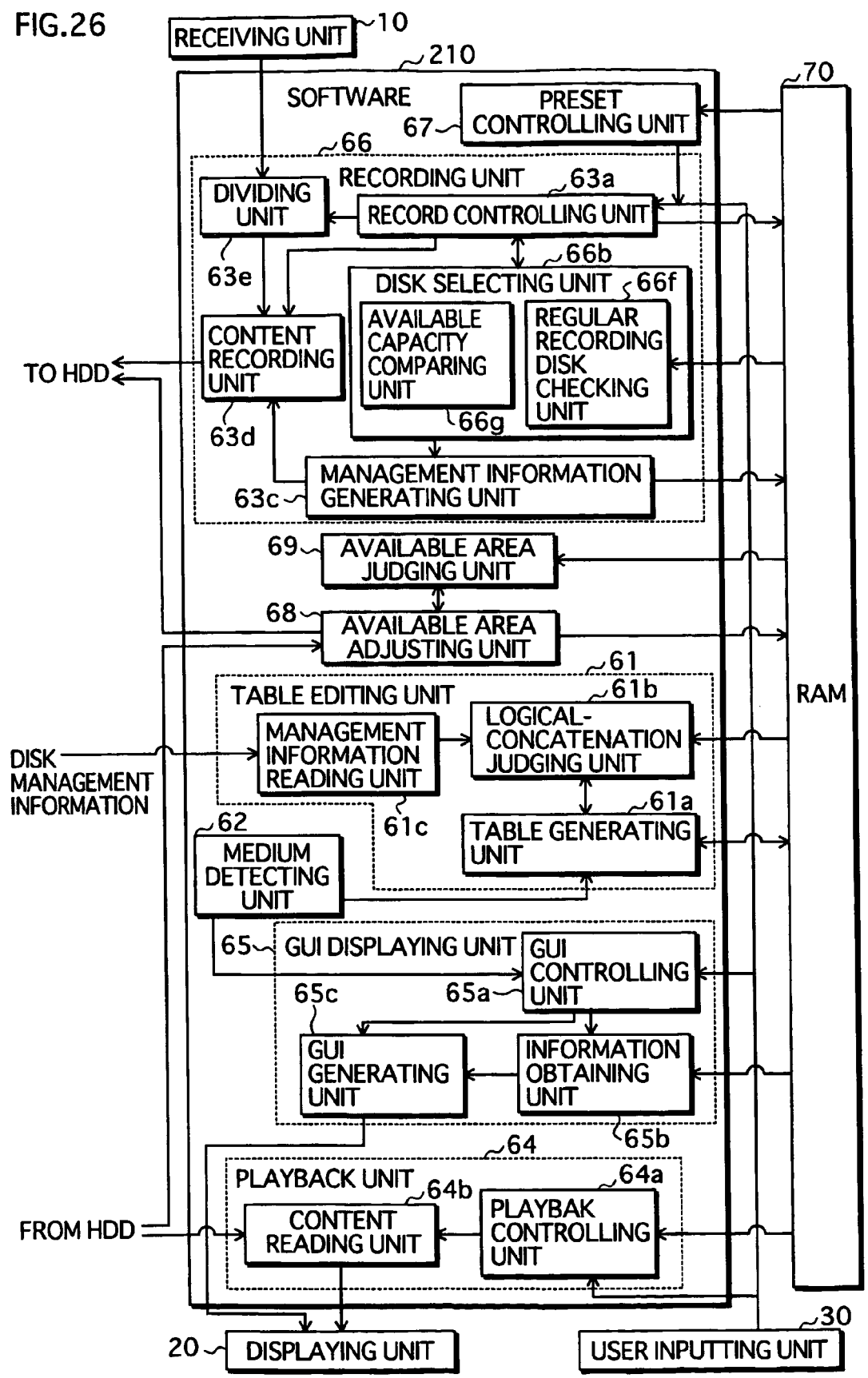
FIG. 26 is a functional block diagram showing a functional configuration of software 210 for controlling a DVD/HDD recorder 200 relating to a second embodiment of the present invention.

FIG. 26 is a functional block diagram showing a functional configuration of software 210 controlling the DVD/HDD recorder 200 relating to the second embodiment.

The configuration of the software 210 shown in FIG. 26 is the same as the configuration of the software 110 described in the first embodiment except that a recording unit 66 is provided instead of the recording unit 63, and a preset controlling unit 67, an available area adjusting unit 68, and an available area judging unit 69 are additionally provided. Also, a RAM 70 in the present embodiment stores a content management information table 75 instead of the content management information table 73. It should be noted here that the elements of the software 210 that are the same as those of the software 110 are given the same reference numerals as those elements, and are not described in the present embodiment.

Based on presetting information, the preset controlling unit 67 instructs the recording unit 66 to start recording, at a recording start time on a recording start date (recording start date and time).

One piece of presetting information is stored in the RAM 70 for one preset recording.

FIG. 27 shows a data structure of one piece of presetting information. The piece of presetting information includes the items "preset-recording ID", "recording start date and time", "recording end date and time", and "recording channel (CH)".

The "preset-recording ID" is an identifier unique to the piece of presetting information. The recording unit 66 is specifically given a notification of the preset-recording ID together with an instruction to start recording (referred to as a "record instruction"). It should be noted here that the preset-recording ID can be used by a regular recording disk checking unit 66f, to judge whether a plurality of contents have been recorded based on the same piece of presetting information.

It should be noted here that the recording start date and time, and the recording end date and time may be set not only as being effective once, but also as being effective cyclically. With the recording start date and time and the recording end date and time set as being effective cyclically, the DVD/HDD recorder 200 can regularly record a content at a particular set time every day or every week, based on one piece of presetting information.

The disk selecting unit 66b in the recording unit 66 internally has an available capacity comparing unit 66g and the regular recording disk checking unit 66f. When a plurality of HDDs each have an available storage area, the disk selecting unit 66b notifies the content recording unit 63d of an HDD selected by the available capacity comparing unit 66g, as an HDD onto which a content is to be recorded (referred to as a "target HDD"). When the available storage area of the selected HDD is used up during the recording, the disk selecting unit 66b selects another HDD as a target HDD, and notifies the content recording unit 63d of the selected HDD.

In the case of preset recording, the disk selecting unit 66b notifies the content recording unit 63d of an HDD selected by the regular recording disk checking unit 66f, with precedence over an HDD selected by the available capacity comparing unit 66g.

The available capacity comparing unit 66g obtains the disk available capacity 72g from each piece of connected-disk management information included in the connected-disk management information table 72, and selects an HDD with the largest disk available capacity 72g as a target HDD.

In the case of preset recording, the regular recording drive checking unit 66f searches the content management information table 75 for a piece of content management information whose preset-recording ID 75j has the same value as the preset-recording ID in the piece of presetting information corresponding to this preset recording. The regular recording drive checking unit 66f then selects, as a target HDD, an HDD storing a content corresponding to the obtained piece of content management information.

FIG. 28 shows a data structure of the content management information table 75 stored in the RAM 70.

A piece of content management information in the content management information table 75 is the same as a piece of content management information in the content management information table 73, except that the item "preset-recording ID" 75j is additionally provided.

The "preset-recording ID" 75j is set, when the corresponding content is recorded based on the preset recording, as the value of the preset-recording ID included in the piece of presetting information corresponding to this preset recording. The other items of the piece of content management information included in the content management table 75 are the same as those in the content management information table 73.

When both of the HDD 41 and the HDD 42 have available storage areas, the available area adjusting unit 68 moves a content stored in the HDD 42 to the HDD 41, to create a larger available storage area in the HDD 42. The available area adjusting unit 68 starts its operation upon receipt of an instruction from the user inputting unit 30.

The available area judging unit 69 judges whether both of the HDD 41 and the HDD 42 have available storage areas, and notifies the available area adjusting unit 68 of the judgment result.

<Operations>

The following describes the operations of the DVD/HDD recorder 200 with the above-described configuration.

The following first describes the recording operation, in particular, the operation for selecting an HDD onto which a content is to be recorded (a target HDD).

Figure 29:
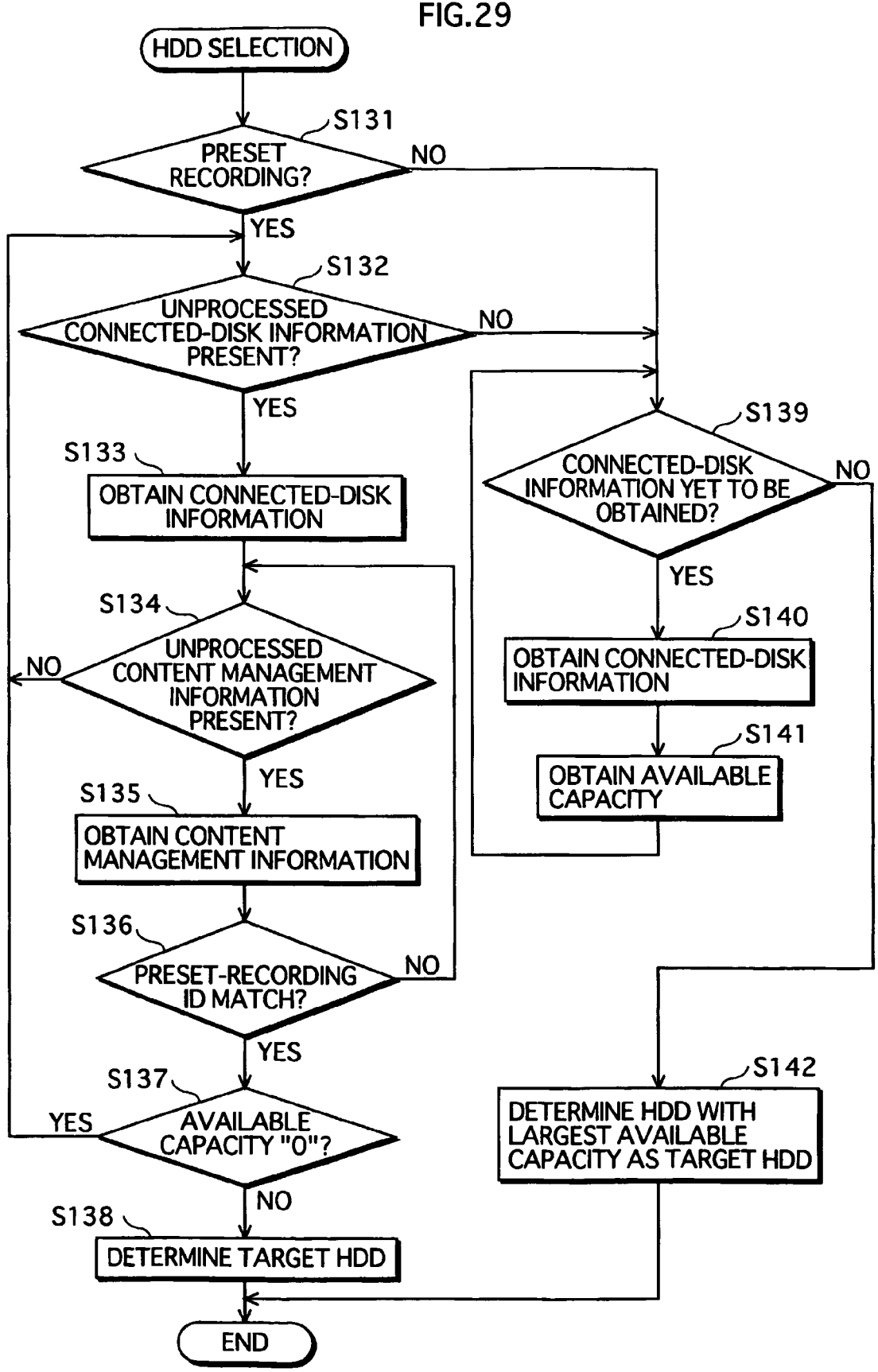
FIG. 29 is a flowchart showing the operation of a disk selecting unit 66b to select a target HDD.

FIG. 29 is a flowchart showing the operation of the disk selecting unit 66b to select a target HDD.

The disk selecting unit 66b judges whether a record instruction received by the record controlling unit 63a includes a preset-recording ID (S131). When the record instruction includes a preset-recording ID, i.e., when the record instruction is based on preset recording (S131:Yes), the disk selecting unit 66b selects a target HDD using the regular recording disk checking unit 66f.

The regular recording disk checking unit 66f judges whether another content has been recorded based on the same piece of presetting information as this time, by the following procedures.

When an address for an unprocessed piece of connected-disk information is set at the connected-disk management information pointer 71h in the virtual-drive management information 71 (S132:Yes), the regular recording disk checking unit 66f obtains the unprocessed piece of connected-disk information from the connected-disk management information table 72, as a processing target (S133). Further, when an address for an unprocessed piece of content management information is set at the program index pointer 72h in the obtained piece of connected-disk management information (S134:Yes), the regular recording disk checking unit 66f obtains the unprocessed piece of content management information from the obtained piece of connected-disk management information (S135).

The regular recording disk checking unit 66f judges whether the preset-recording ID 75j in the obtained piece of content management information with the preset-recording ID included in the record instruction, to see if they match (S136). When the preset-recording ID 75j in the obtained piece of content management information and the preset-recording ID included in the record instruction match (S136:Yes), and when the disk available capacity 72g in the piece of connected-disk information of the processing target is not "0" (S137:No), the regular recording disk checking unit 66f selects an HDD corresponding to the piece of connected-disk information of the processing target as a target HDD, and notifies the content recording unit 63d of the selected HDD (S138). When the preset-recording ID 75j in the obtained piece of content management information and the preset-recording ID included in the record instruction match (S136: Yes), but when the disk available capacity 72g in the piece of connected-disk information of the processing target is "0" (S137:Yes), the regular recording disk checking unit 66f moves its processing onto another piece of connected-disk information as the processing target. When the preset-recording ID 75j in the obtained piece of content management information and the preset-recording ID included in the record instruction do not match (S136:No), the regular recording disk checking unit 66f moves its processing onto another piece of content management information.

When all pieces of content management information whose addresses are set at the program index pointer 72h have been processed (S134:No), the regular recording disk checking unit 66f further processes each of the pieces of connected-disk management information whose addresses are set at the connected-disk management information pointer 71h in the virtual-drive management information 71. When all the pieces of connected-disk management information have been processed (S132:No), the regular recording disk checking unit 66f ends its processing, and the available capacity comparing unit 66g selects a target HDD.

When the record instruction received by the record controlling unit 63a does not include a preset-recording ID and is based upon a user operation via the user inputting unit (S131: No), the disk selecting unit 66b selects a target HDD using the available capacity comparing unit 66g.

The available capacity comparing unit 66g selects an HDD having the largest available storage area among HDDs connected to the DVD/HDD recorder 200 by the following procedures.

First, when the disk available capacity 72g is yet to be obtained from a piece of connected-disk management information among all the pieces of connected-disk management information whose addresses are set at the connected-disk management information pointer 71h in the virtual-drive management information 71 (S139:Yes), the available capacity comparing unit 66g searches the connected-disk management information table 72 for such a piece of connected-disk management information (S140), and obtains the disk available capacity 72g from the piece of connected-disk management information (S141). After obtaining the disk available capacity 72g from all the pieces of connected-disk management information (S139:No), the available capacity comparing unit 66g compares the obtained disk available capacity 72g of each piece of connected-disk management information, and selects an HDD with the largest disk available capacity 72g as a target HDD, and notifies the content recording unit 63d of the selected HDD (S142).

The selection of the target HDD is enabled by the above-described operation.

When a record instruction received by the recording unit 66 is based on preset regular recording for regularly recording every day or every week based on one piece of presetting information, the regular recording disk checking unit 66f selects, as a target HDD, an HDD storing a content that has been previously recorded based on the same preset recording as this time, if such an HDD has an available storage area. With this operation, contents to be recorded regularly based on the preset recording are stored in the same HDD.

When the record instruction received by the recording unit 66 is based on preset regular recording, but an HDD storing a content that has been previously recorded based on the same preset recording does not have an available storage area, or when the record instruction is not based on preset regular recording, i.e., when the record instruction is based on a user operation or based on preset recording for recording only once, the available capacity comparing unit 66g selects, as a target HDD, an HDD having the largest available storage area among the HDDs connected to the DVD/HDD recorder 200. Due to this, a possibility of one content being stored into one HDD can be raised.

The following describes the operation of the available area adjusting unit 68 for combining available storage areas of two HDDs into one HDD.

Figure 30:
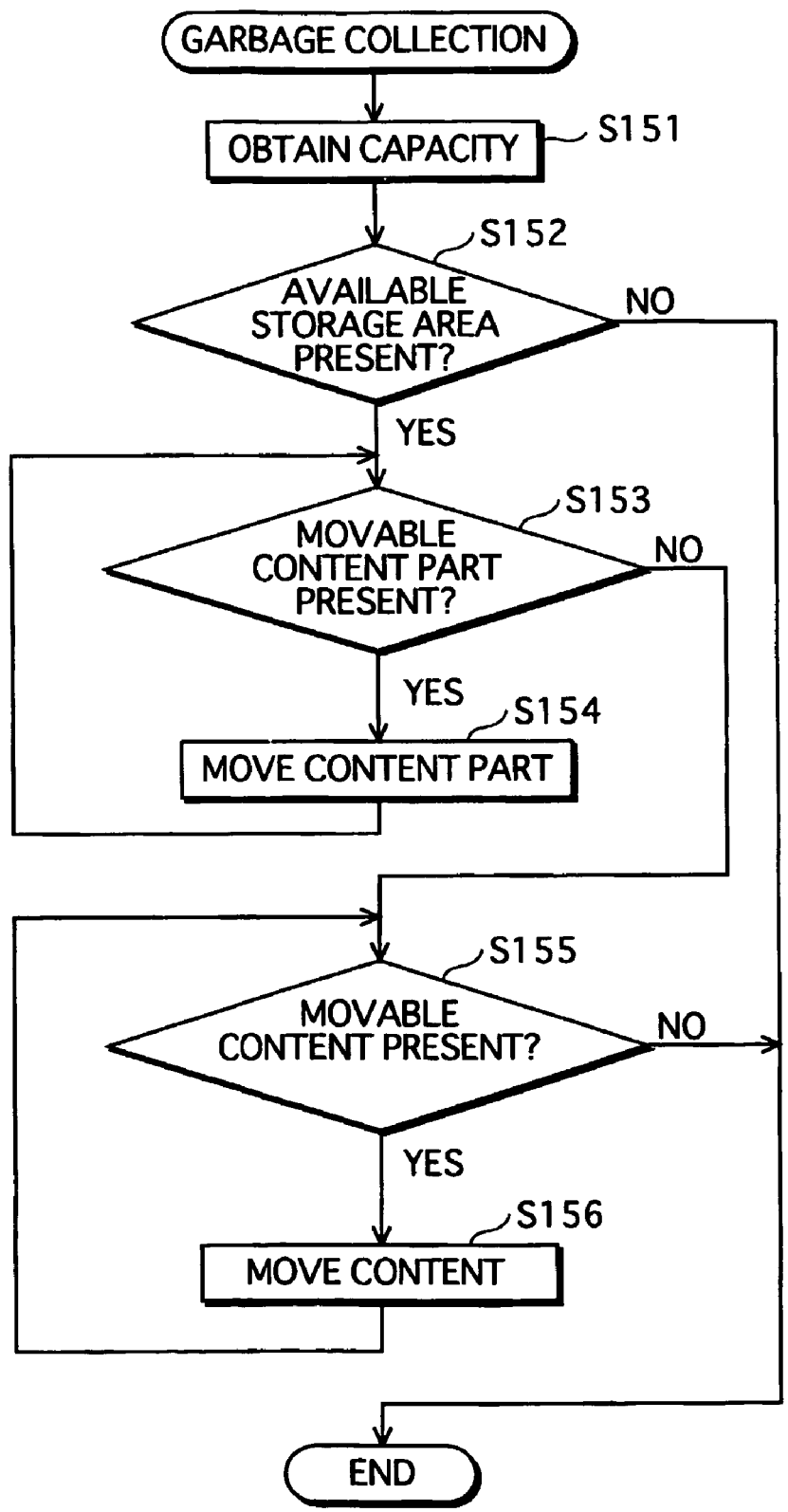
FIG. 30 is a flowchart showing the operation for combining available storage areas of two HDDs into one HDD.

FIG. 30 is a flowchart showing the operation for combining available storage areas of two HDDs into one HDD.

The available area judging unit 69 receives an instruction to combine the available storage areas of two HDDs into one HDD. The available area judging unit 69 then obtains an address of a piece of connected-disk information for each of the HDD 41 and the HDD 42, and obtains the disk available capacity 72g of each of the HDD 41 and the HDD 42 from the connected-disk management information table 72 (S151). The available area judging unit 69 judges whether the available area 72g of each of the HDD 41 and the HDD 42 is not "0", i.e., whether each of the HDD 41 and the HDD 42 has an available storage area (S152).

When one or both of the HDD 41 and the HDD 42 does not have an available storage area (S152:No), the available area judging unit 66 ends its processing.

When both of the HDD 41 and the HDD 42 have available storage areas (S152:Yes); the available area judging unit 66 notifies the available area adjusting unit 68 that the two HDDs have available storage areas.

The available area adjusting unit 68 that has received the notification judges whether a content part that is smaller than the size of the available storage area of the HDD 41 and that constructs a virtually-one-program entered in the program list table 74 is stored in the HDD 42 (S153). When a content part that is smaller than the size of the available storage area of the HDD 41 and that constructs a virtually-one-program entered in the program list table 74 is stored in the HDD 42 (S153:Yes), the available area adjusting unit 68 moves this content part from the HDD 42 to the HDD 41 (S154), and updates the management information group stored in the RAM 70.

The processing in S152 and S154 is repeated until the HDD 42 no longer stores a content part that is smaller than the size of the available storage area of the HDD 41 and that constructs a virtually-one-program entered in the program list table 74 (S153:No). The available area adjusting unit 68 then judges whether a content that is smaller than the size of the available storage area of the HDD 41 is stored in the HDD 42 (S155). When such a content smaller than the size of the available storage area of the HDD 41 is stored in the HDD 42 (S155:Yes), the available area adjusting unit 68 moves the content from the HDD 42 to the HDD 41 (S156), and updates the management information group stored in the RAM 70.

The processing in S155 and S156 is repeated until the HDD 42 no longer stores a content that is smaller than the size of the available storage area of the HDD 41 (S155:No). The available area adjusting unit 68 then ends its processing.

The combining of available storage areas of two HDDs into one HDD is enabled by the above-describe operation.

With the above operation, a larger available storage area can be created in one HDD, and therefore, a possibility of one content being stored into one HDD can be raised.

It should be noted here that the combining of available storage areas of a plurality of HDDs into one HDD may not necessarily be started by a user operation. For example, the combining may be started at a predetermined time. Also, the processing in S151 and S152 in FIG. 30 for obtaining the disk available capacity 72g of the HDD 41 and the HDD 42 and for judging whether the disk available capacity 72g for both of the HDD 41 and the HDD 42 is not "0", i.e., whether both of the HDD 41 and the HDD 42 have available storage areas, may be constantly executed during when the DVD/HDD recorder 200 is in a standby mode (where operations of recording, playback, updating of management information etc. are not being executed).

Although the above operation is described as that a content (or content part) is moved from the HDD 42 to the HDD 41, to combine their available storage areas into one available storage area of the HDD 42, the present invention should not be limited to such. A content (or content part) may be moved from the HDD 41 to the HDD 42, to combine their available storage areas into one available storage area of the HDD 41. Alternatively, contents (or content parts) may be moved to and from between the HDD 41 and the HDD 42.

Although the above operation is described as that a source and a destination of a content (or content part) to be moved are fixed, the source and the destination may be appropriately changed according to the state of the content storage state of each HDD. For example, a value obtained by adding (a) a total data size of contents that can be moved from the HDD 41 to the HDD 42 and (b) an available capacity of the HDD 41 may be compared with a value obtained by adding (c) a total data size of contents that can be moved from the HDD 42 to the HDD 41 and (d) an available capacity of the HDD 42. As a result of the comparison, an HDD with a larger value may be determined as a source from which contents are to be moved.

Third Embodiment

The DVD/HDD recorders 100 and 200 relating to the first and second embodiments have the configuration where the same information as the management information (disk management information and content management information) stored in a storage medium is also stored in the RAM 70 of the DVD/HDD recorder 100 and 200, for the purpose of alleviating an access load between the DVD/HDD recorders 100 and 200 and the storage medium.

On the other hand, a DVD/HDD recorder 300 relating to a third embodiment of the present invention has a configuration where individual information for individually managing a content (or content part) and concatenation information for concatenating content parts to construct a virtually-one-content are stored only in a storage medium storing the content or the content part, and the RAM 70 only stores information showing the correspondence between a program to be operated by the application layer and a content (or content part) stored in each storage medium.

<Configuration>

The DVD/HDD recorder 300 relating to the third embodiment is a storage media management apparatus for recording contents in compliance with the DVD-VR format (DVD-Video Recording Format).

The following first describes a hardware configuration of the DVD/HDD recorder 300.

Figure 31:
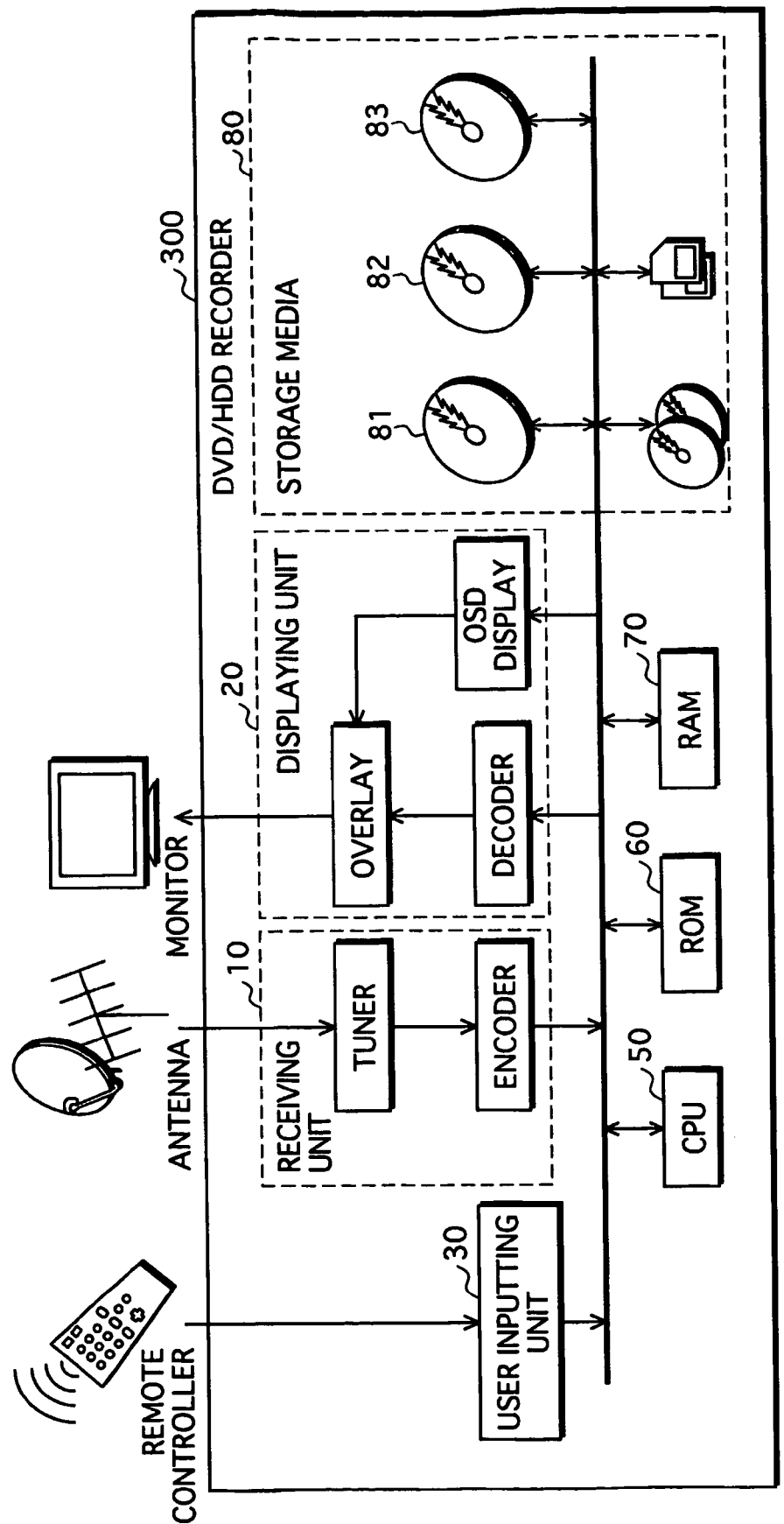
FIG. 31 shows a hardware configuration of a DVD/HDD recorder 300 relating to a third embodiment of the present invention.

FIG. 31 shows a hardware configuration of the DVD/HDD recorder 300 relating to the third embodiment. The DVD/HDD recorder 300 has the same configuration as that of the DVD/HDD recorder 100 relating to the first embodiment except that storage media 80 are provided instead of the storage media 40. It should be noted here that the elements of the DVD/HDD recorder 300 that are the same as those of the DVD/HDD recorder 100 are given the same reference numerals as those elements, and are not described in the present embodiment.

The DVD/HDD recorder 300 has, as the storage media 80, a DVD 81, a DVD 82, and a DVD 83 connected respectively to three slots designed for DVD-RAMs. The DVD 81, the DVD 82, and the DVD 83 are DVD-RAMs that can be connected or removed by a user operation, and that include a storage area in which the user can write or delete data, and a management area where the user cannot write or delete data. In the storage area, a content (or content part) and management information for the content (or content part) defined by the DVD-VR format are stored. In the management area, a manufacture's serial number for uniquely identifying the storage medium has been written by the manufacturer.

The RAM 70 stores the program list table 76.

The following briefly describes a content and content management information stored in the DVD 81, the DVD 82, and the DVD 83.

Figure 32:
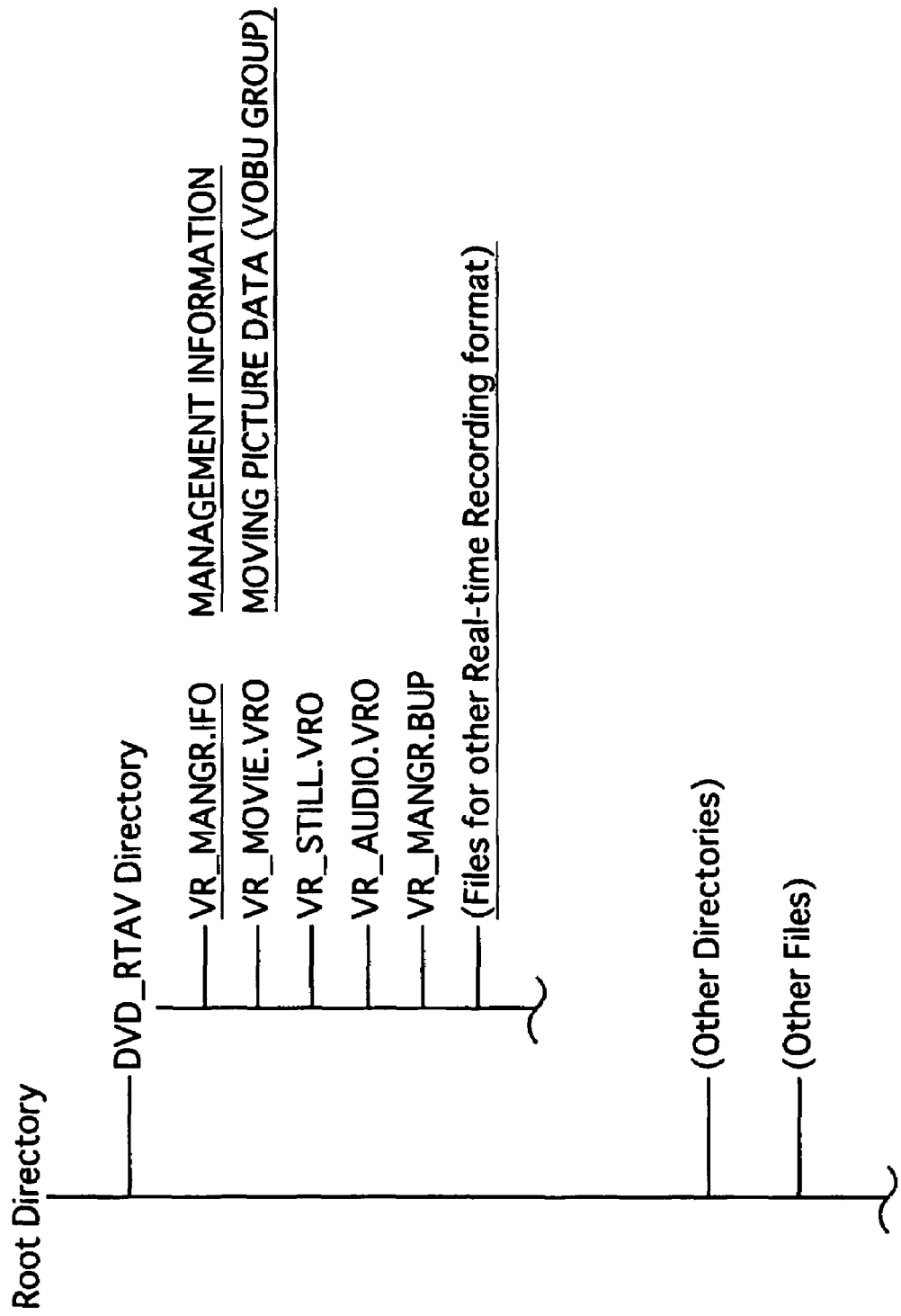
FIG. 32 shows information stored in DVDs 81, 82, and 83, using a directory structure defined by the DVD-VR format.

FIG. 32 shows information stored in the DVD 81, the DVD 82, and the DVD 83, using a directory structure defined by the DVD-VR format.

In the DVD 81, the DVD 82, and the DVD 83, the DVD_RTAV (RealTime Recording Audio Video) directory is located below the Root directory.

Below the DVD_RATV directory, files such as "VR_MANGR.IFO", "VR_MOVIE.VRO", "VR_STILL.VRO", "VR_AUDIO.VRO", and "VR_MANGR.BUP" are located.

The "VR_MOVIE.VRO" is a movie file storing a content recorded by the DVD/HDD recorder 300. The "VR_STILL.VRO" is a still picture file, and the "VR_AUDIO.VRO" is an audio file.

The "VR_MANGR.IFO" stores a playback path, management information, etc. for a content. The "VR_MANGR.BUP" is a backup file for the "VR_MANGR.IFO".

Figure 33:
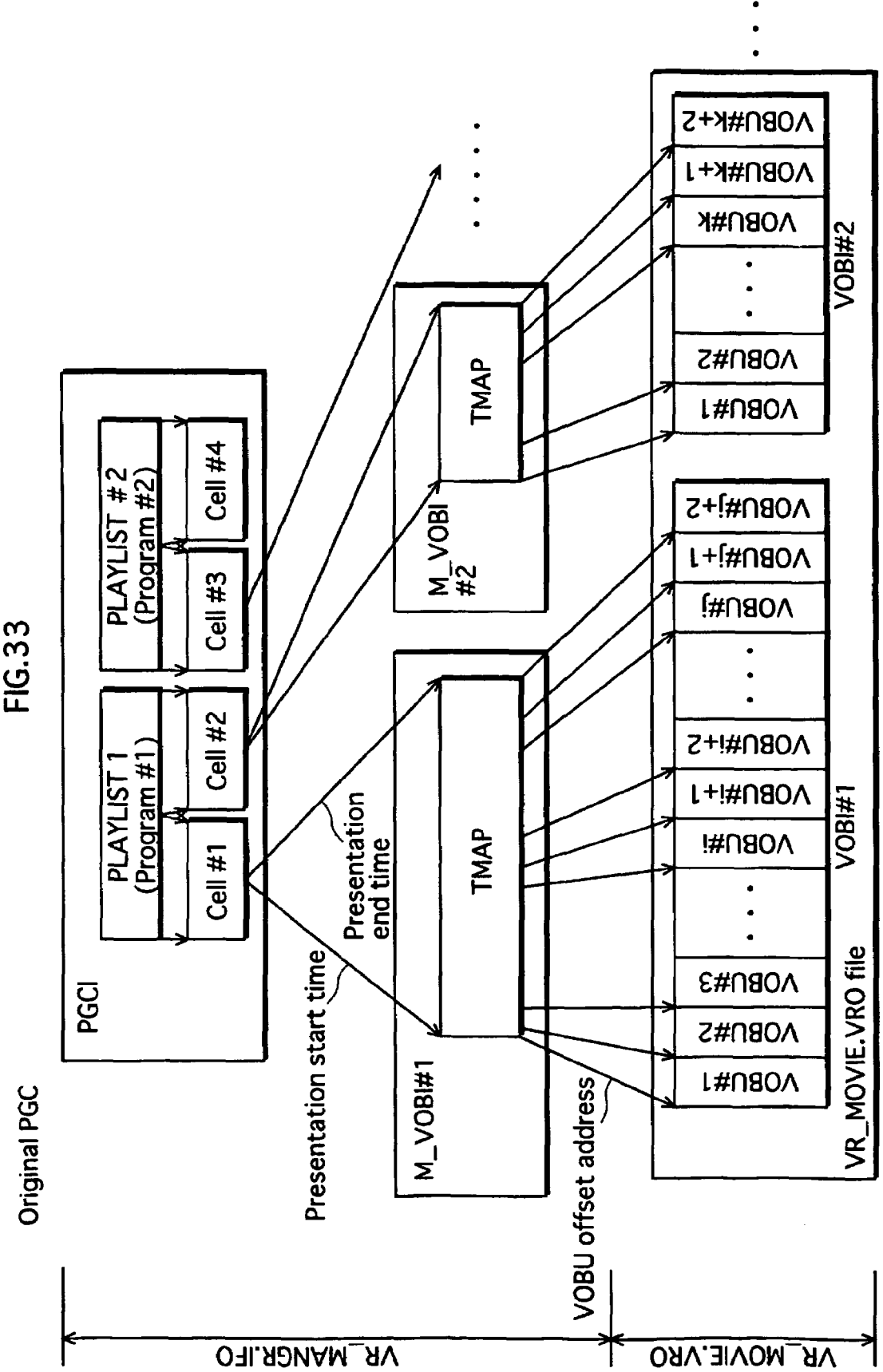
FIG. 33 shows the relationship between a content stored in VR_MOVIE.VRO, and a playback path set in VR_MANGR.IFO.

FIG. 33 shows the relationship between a content stored in the "VR_MOVIE.VRO", and a playback path set in the "VR_MANGR.IFO".

A play list showing a playback path for a content is composed of a plurality of pieces of CELL (playback section) information. Each piece of CELL information defines a logical play back section by time information indicating In-point and Out-point.

A content is composed of a plurality of VOBUs (video object units). A VOBU is a small unit for decoding. Playback of a content can be started from any of its VOBUs. A playback time differs for each VOBU because a content is encoded using the MPEG2, which is a variable length encoding format. Therefore, a VOBU to be read first cannot be designated using time information.

Each piece of CELL information can designate a reading position of each VOBU using LBA, via a reference table "TMAP (time map)" to be used to indirectly reference a start address of a VOBU using time information.

This is the end of brief description on a content and management information stored in the DVD 81, the DVD 82, and the DVD 83.

The following describes RTR_VGM 301 (RTR_VGM: Real Time Recording Video Manager) stored in the "VR_MANGR.IFO".

Figure 34:
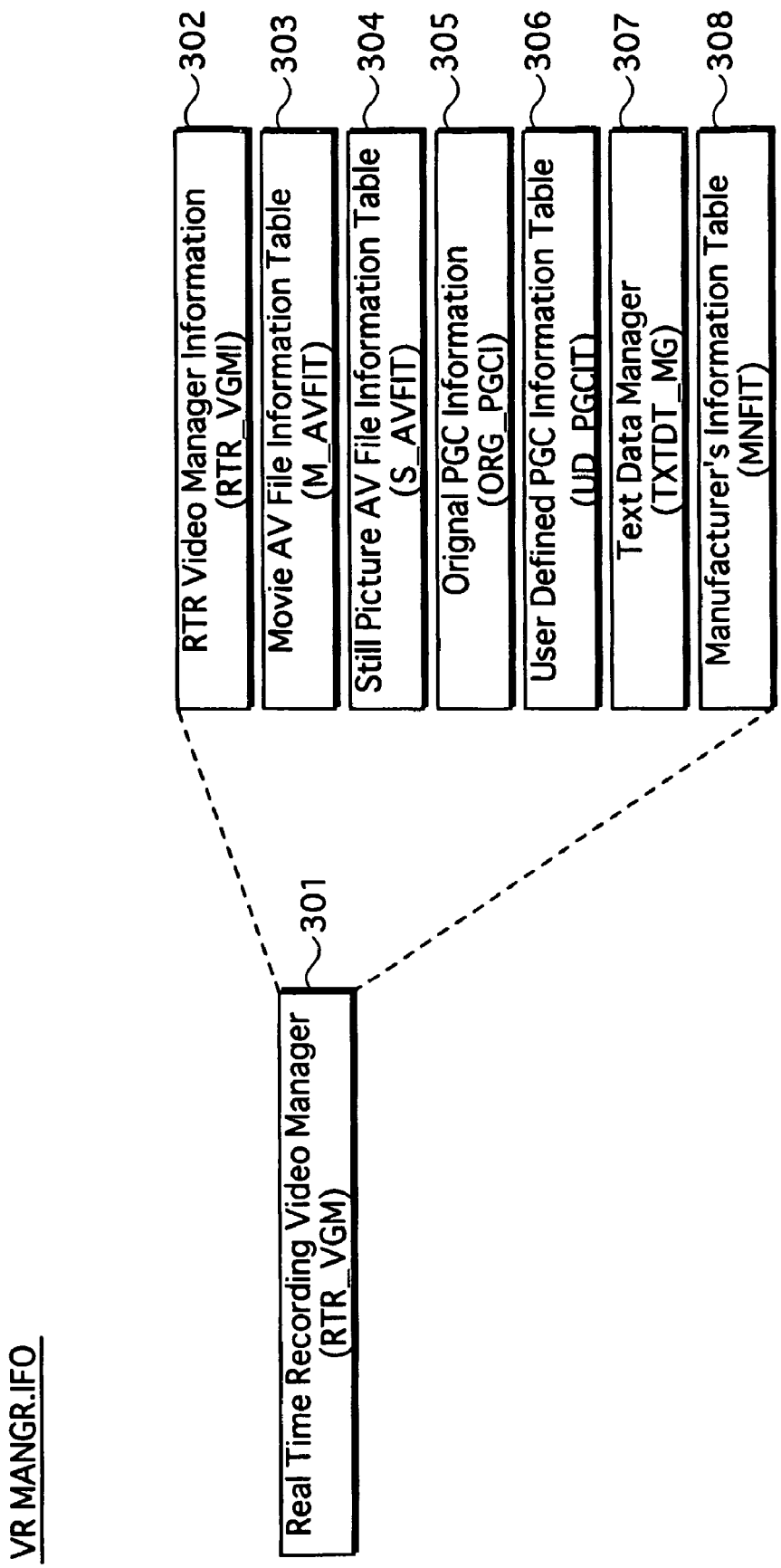
FIG. 34 shows a data structure of RTR_VGM 301.

FIG. 34 shows a data structure of RTR_VGM 301. Args shown in the figure, RTR_VGM 301 is composed of RTR_VGMI 302, M_AVFIT 303, S_AVFIT 304, ORG_PGCI 305, UD_PGCIT 306, TXTDT_MG 307, and MNFIT 308. The RTR_VGMI 302 includes a pointer etc., pointing to each playlist stored in a storage medium. The M_AVFIT 303 includes detailed setting of a TMAP. The S_AVFIT 304 has the same data structure as the M_AVFIT 303. The ORG_PGCI 305 includes setting of a playback path for a content. The UD_PGCIT 306 includes setting of a user-defined playback path. The TXTDT_MG 307 includes setting of information (broadcast station information, display channel name, bit rate information etc.) uniquely added as management information for a content. The MNFIT 308 includes setting of an identifier etc., for identifying a storage media management apparatus that has handled a content for recording or updating purposes, a manufacturer of the apparatus, etc.

As shown in FIG. 35A, the ORG_PGCI 305 has PGI 309 set for each content (contents with content number "1" to "m") stored in a storage medium. The PGI 309 set for each content includes such information as RPM_TXTI 310 containing a content name, and IT_TXT_SRPN 311 containing a serial number ($1^{st}$ to $n^{th}$) indicating a position at which management information uniquely added for the content is stored in the TXTDT_MG 307.

Further, as shown in FIG. 35B, the TXTDT_MG 307 stores such information as $1^{st}$ to $n^{th}$ IT_TXTs 313 storing management information uniquely added for each content, and IT_TXT_SRP 312 containing a pointer pointing to IT_TXT 313 shown by the IT_TXT_SRPN 311.

This is the end of description on the RTR_VGM 301.

Here, the following describes the relationship between information set in the RTR_VGM 301 and the program list table 76 for managing a content that is stored as being divided into a plurality of storage media as a virtually-one-program.

Figure 36:
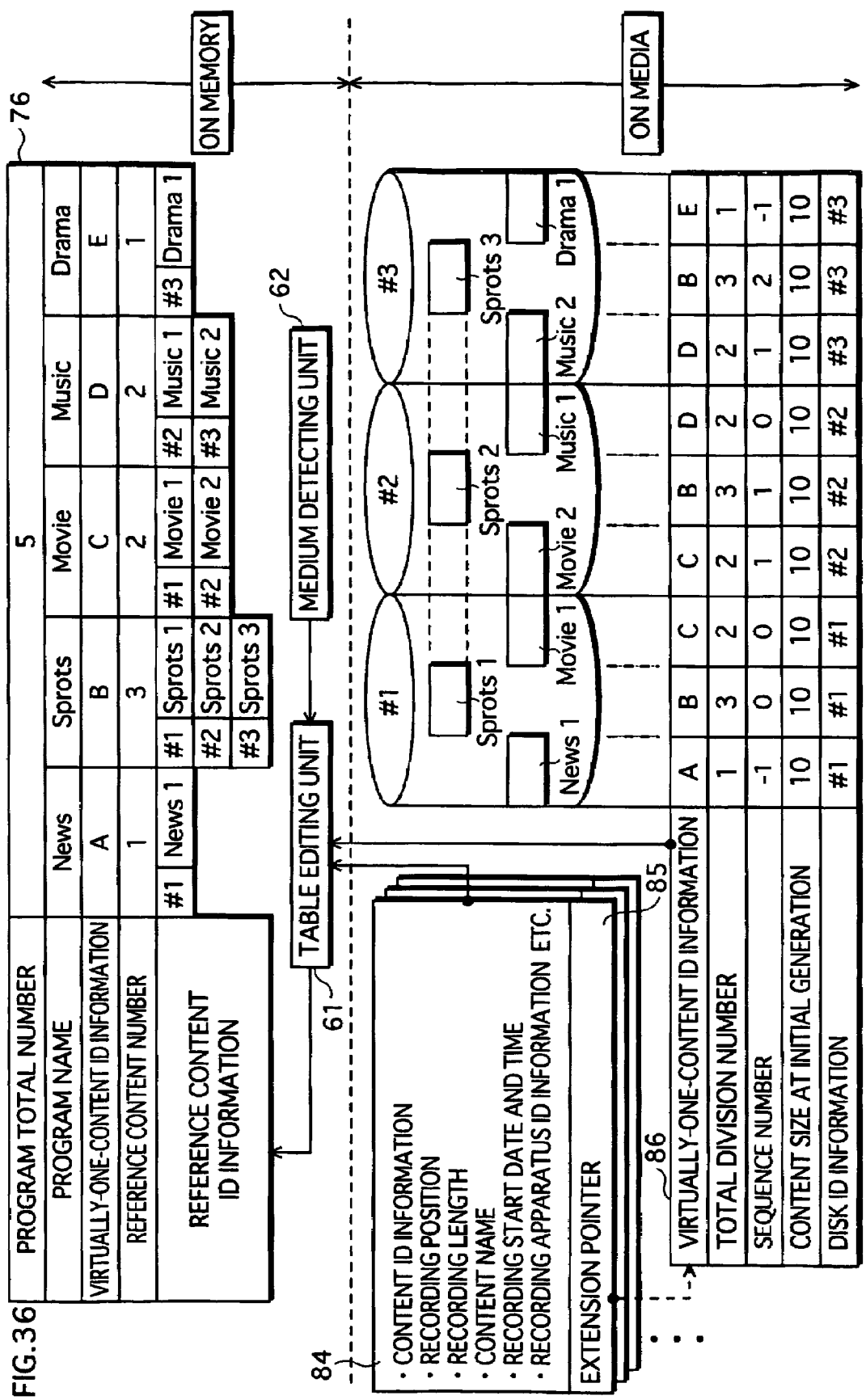
FIG. 36 schematically shows the relationship between management information stored in the RAM 70 and management information stored in a removable storage medium in the DVD/HDD recorder 300.

FIG. 36 schematically shows management information stored in the RAM 70 in the DVD/HDD recorder 300 and management information stored in a removable storage medium.

In the figure, content part management information 84, an extension pointer 85, and content part concatenation information 86 are information set in the RTR_VGM 301 stored in each of the DVD 81, the DVD 82, and the DVD 83.

The content part management information 84 is for individually managing and using the corresponding content (or content part), and is set in the RTR_VGM 301 according to the conventional DVD_VR format. The content part concatenation information 86 corresponding to a content part is for concatenating all necessary content parts to construct a virtually-one-content. The content part concatenation information 86 is unique information added to the RTR_VGM 301 in the DVD/HDD recorder 300 relating to the third embodiment. The content part concatenation information 86 is specifically stored in the IT_TXT 313 for each content (or content part).

The IT_TXT 313 storing the content part concatenation information 86 for each content (or content part) is given a number set in the IT_TXT_SRPN 311 in the corresponding PGI 309. Hereafter, the IT_TXT_SRPN 311 indicating where the content part concatenation information 86 is stored is referred to as the extension pointer 85.

The program list table 76 is stored in the RAM 70 in the DVD/HDD recorder 300. The program list table 76 is updated using the content part management information 84 and the content part concatenation information 87 (i) when connection or removal of a storage medium is detected, (ii) when a storage medium is formatted, or (iii) when a content is recorded or edited.

This is the end of description on the relationship between information set in the RTR_VGM 301 and the program list table 76 for managing content parts stored in a plurality of storage media as a virtually-one-program.

The following describes each of the content part management information 84, the content part concatenation information 86, and the program list table 76. The following first describes the content part management information 84 in detail.

The content part management information 84 is for individually managing a content (or content part) stored in each storage medium in the FS layer.

Each of the DVD 81, the DVD 82, and the DVD 83 stores content part management information 84 corresponding to each content (or content part) stored therein.

The content part management information 84 includes, for the corresponding content (or content part), the items "content ID information", "recording position", "recording length", "content name", "recording start date and time", "recording apparatus ID information", etc. These items of information can be obtained from information set based on the conventional DVD-VR format in the RTR_VGM 301 in a storage medium storing the corresponding content.

To be more specific, the content ID information is a number given to the PGI 309 of the corresponding content. The recording position is a start address of the corresponding content, and can be obtained by referencing the TMAP set in the M_AVFIT 303 using the In-point time of the CELL information positioned at the start of the playback path set in the ORG_PGCI 305. The recording length is a value obtained by summing up playback times calculated using the IN-point time and the Out-point time of each piece of CELL information constituting a playback path for the corresponding content. The content name is a title of a content obtained via broadcasting, and is stored in the PRM_TXTI 310. The recording start date and time is information about a time on a day at which recording of the corresponding content is started. The recording date and time of the first VOB among VOBs constituting the corresponding content is obtained from the M_AVFIT 303. The recording apparatus ID information identifies a storage media management apparatus that has recorded the corresponding content, and is set in the MNFIT 308.

Also, the content part management information further includes the extension pointer 85.

The extension pointer 85 is a number given to the IT_TXT 313 storing the content part concatenation information of the corresponding content by the DVD/HDD recorder 300 relating to the third embodiment. The extension pointer 85 is stored in the IT_TXT_SRPN 311 included in the PGI 309 of the corresponding content.

The following describes in detail the content part concatenation information 86.

The content part concatenation information 86 is information uniquely defined by the present invention and is added to the RTR_VGM defined by the DVD-VR format. The content part concatenation information 86 corresponding to a content part is for managing all necessary content parts to construct a virtually-one-content. It should be noted here that the figure shows the content part concatenation information 86 as one table, but the content part concatenation information 86 is actually such that each piece of information is stored in the IT_TXT 313 included in the RTR_VGM 301 in a storage medium storing the corresponding content (or content part).

According to the DVD-VR format, the IT_TXT 313 stores one of broadcast station information, a display channel name, bit rate information, etc. Identifiers defined by the DVD-VR format such as "OTHERS", "BROADCAST", and "MEMO" are set at the first byte of the IT_TXT 313, to indicate which information is stored in the IT_TXT 313. The size of the information is set at the second byte of the IT_TXT 313, and the information is stored at the third and following bytes of the IT_TXT 313.

When the content part concatenation information 86 is stored into the IT_TXT 313 in the DVD/HDD recorder 300, the identifier "OTHERS" is set at the first byte, the size of the content part concatenation information 86 is stored at the second byte, and various items of information such as virtually-one-content ID information, a total division number, a sequence number, a content size at initial generation, and disk ID information are stored at the third and following bytes.

Specifically, values shown below are set as these various items of content part concatenation information 86 (virtually-one-content ID information, a total division number, a sequence number, a content size at initial generation, and disk ID information).

A value for the virtually-one-content ID information is determined under one of the conditions (i) and (ii).

(i) When the content part concatenation information 86 corresponds to a content part, a piece of content part management information for the first content part (with a sequence number described later being "0"), among all content parts to be concatenated together with this content part to construct a virtually-one-content, is referred to, and a value obtained by concatenating a value of the recording apparatus ID information and a value of the recording start date and time is set as the virtually-one-content ID information.

(ii) When the content part concatenation information 86 does not correspond to a content part, a piece of content part management information for the corresponding content is referred to, and a value obtained by concatenating a value of the recording apparatus ID information and a value of the recording start date and time is set as the virtually-one-content ID information.

A value for the total division number is determined under one of the conditions (i) and (ii).

(i) When the content part concatenation information 86 corresponds to a content part, a total number of content parts to be concatenated together with this content part to construct a virtually-one-content is set as the total division number.

(ii) When the content part concatenation information 86 does not correspond to a content part, a value "1" is set as the total division number.

A value for the sequence number is determined under one of the conditions (i) and (ii).

(i) When the content part concatenation information 86 corresponds to a content part, a value is set as the sequence number in such a manner that "0" is given to the firstly recorded content part, and numbers incremented one by one are sequentially given to content parts following the first content part.

(ii) When the content part concatenation information 86 does not correspond to a content part, a null value of "−1" is set as the sequence number.

A value for the content size at initial generation is determined under one of the conditions (i) and (ii).

(i) When the content part concatenation information 86 corresponds to a content (or content part) that is recorded by the DVD/HDD recorder 300, the size of the content (or content part) at the time of recording is set as the content size at initial generation.

(ii) When the content part concatenation information 86 corresponds to a content (or content part) that is entered into the program list table 76 as one program composed of the number of content parts set at the total division number, and this content (or content part) has been edited by the DVD/HDD recorder 300, the size of the edited content is set as the content size at initial generation.

(iii) When the content part concatenation information 86 corresponds to a content (or content part) that is not entered into the program list table 76 as one program composed of the number of content parts set at the total division number and this content (or content part) has been edited by the DVD/

HDD recorder 300, or when this content (or content part) has been edited by another storage media management apparatus, a value is not changed (the size of the content before being edited is set as the content size at initial generation).

As the disk ID information, a manufacture's serial number of a storage medium storing the content part concatenation information 86 is set. It should be noted here that the manufacture's serial number is an identifier uniquely identifying a storage medium, and is written into the management area by the manufacturer.

The following describes the program list table 76 in detail.

The program list table 76 is a reference table for indirectly designating a content (or content part) (the FS layer) stored in a storage medium using a program (the virtual FS layer) to be handled by the user. The program list table 76 stores the correspondence between each program and a content (or content part). The program list table 76 includes an item of information "program total number", and for each program, a piece of program information including the items, "program name", "virtually-one-content ID information", "reference content number", and "reference content ID information".

The "program total number" is the number of programs included in the program list table 76.

The items "program name", "virtually-one-content ID information", "reference content number", "reference content ID information" are set for each program stored in the program list table 76. Specifically, values shown below are set at these items of information under one of the conditions (i) and (ii).

(i) When the piece of program information corresponds to a program composed of a plurality of content parts, a content name set as the content part management information 84 for the content part with the sequence number "0" among the content parts is set as the program name.

(ii) When the piece of program information corresponds to a program composed of a content, a content name of the content set as the content part management information 84 is set as the program name.

Virtually-one-content ID information set in the content part concatenation information 86 for the corresponding program is as the virtually-one-content ID information.

The number of content parts ("1" in the case of a content) constructing the corresponding program is set as the reference content number. It should be noted here that the reference content number may not necessarily match the total division number set in the content part concatenation information 86 for a content part constructing the corresponding program.

The disk ID information set in the content part concatenation information 86 for the corresponding program and the content ID information set in the content part concatenation information 84 are set as the reference content ID information. It should be noted here that when the corresponding program is composed of a plurality of content parts, disk ID information and content ID information for each content part is set as the reference content ID information in the order of smaller values of the sequence number included in the content part concatenation information 86.

This is the end of detailed description on the content part management information 84, the content part concatenation information 86, and the program list table 76.

<Operations>

Finally, the following describes, in detail, the operation of the table editing unit 61 in the DVD/HDD recorder 300 with the above-described configuration, for updating the program list table 76.

Figure 37:
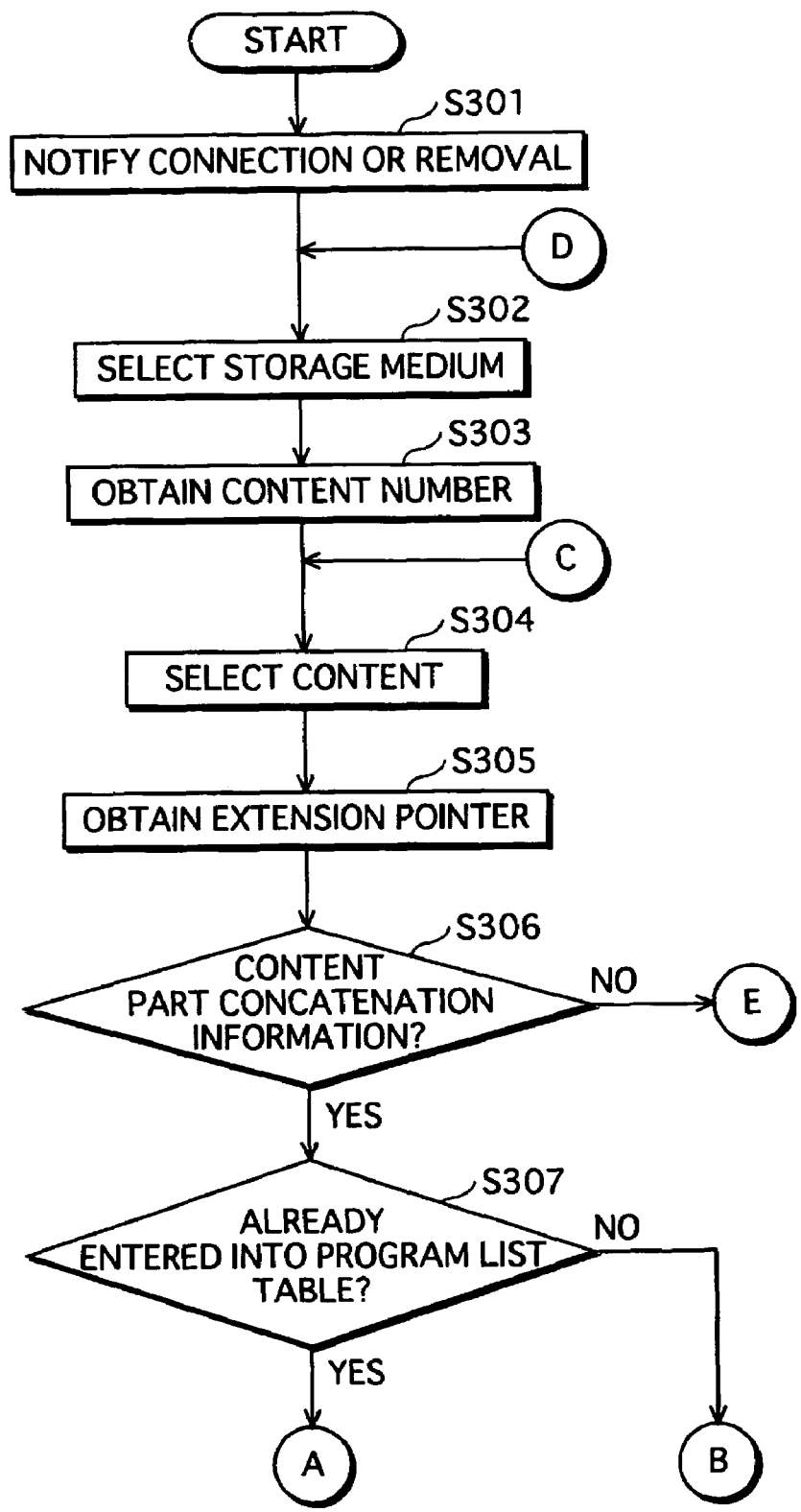
FIG. 37 is a flowchart showing an operation of the DVD/HDD recorder 300 when connection or removal of a storage medium is detected.
Figure 38:
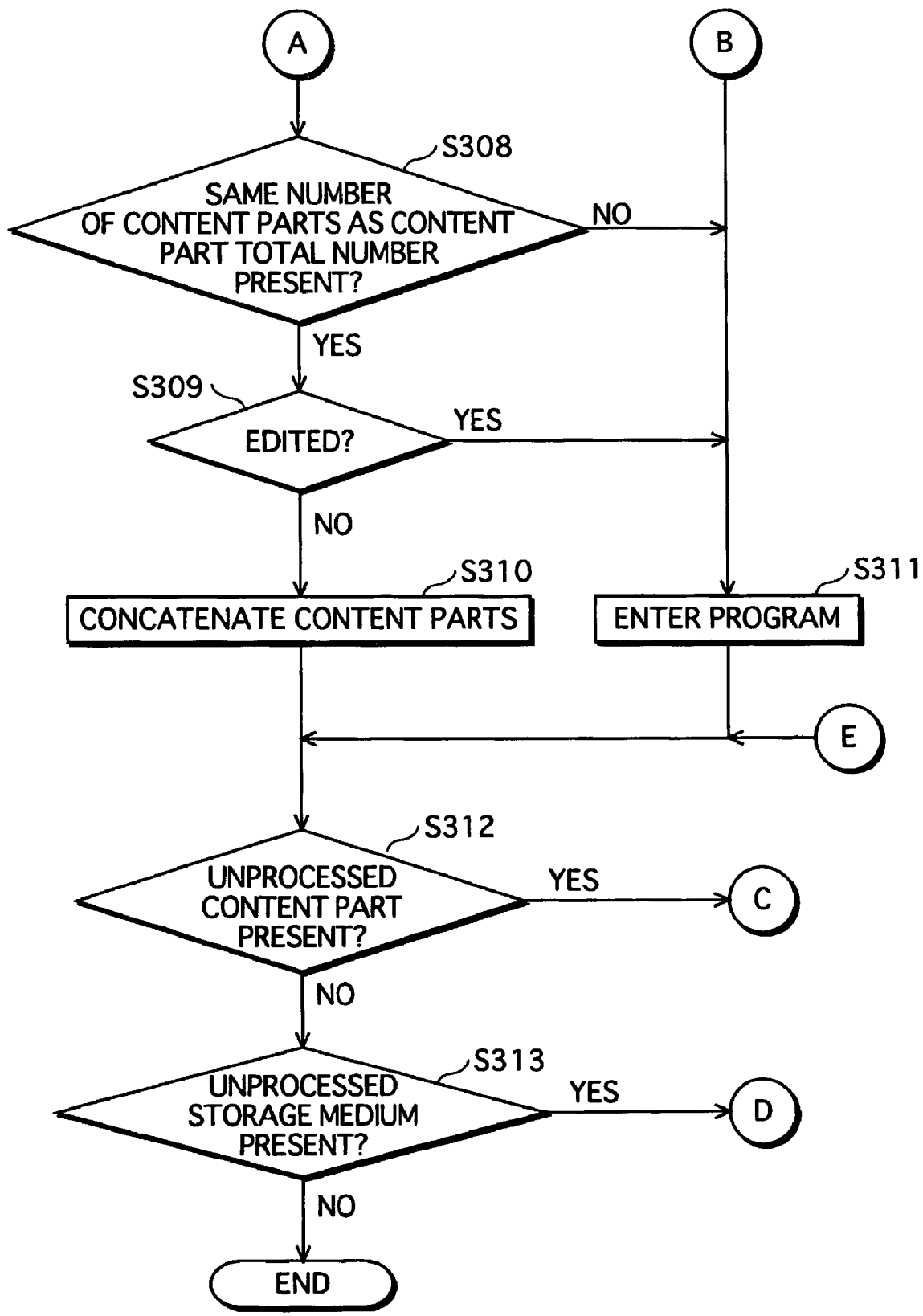
FIG. 38 is a flowchart showing the operation of the DVD/HDD recorder 300 when connection or removal of a storage medium is detected.

FIGS. 37 and 38 are flowcharts showing the operation of the DVD/HDD recorder 300 relating to the third embodiment when connection or removal of a storage medium is detected.

When detecting connection or removal of a storage medium, the medium detecting unit 62 notifies the table generating unit 61a of the detected connection or removal (S301). The table generating unit 61a receives the notification, and selects one of unprocessed storage media, for example, a storage media having the smallest value of the manufacture's serial number among the storage media (S302). The management information reading unit 61c reads the "VR_MANGR.IFO" file from the DVD_RTAV directory of the selected storage medium. The management information reading unit 61c then obtains the number of contents (or content parts) stored in the storage medium, using information included in the RTR_VGM 301 (S303).

The table generating unit 61a selects contents (or content parts) as a processing target, one after another, in the order of smaller values of the PGI 309 set in the RTR_VGM 301, i.e., values of the content ID information in the content part management information 84 (S304). The table generating unit 61a then obtains the IT_TXT_SRPN 311 of the processing target, i.e., the extension pointer 85 (S305). The table generating unit 61a further judges whether information stored in the IT_TXT 313 designated by the extension pointer 85 is content part concatenation information 86 (S306). When the IT_TXT 313 does not store content part concatenation information 86 (S306:No), the table generating unit 61a does not enter the processing target into the program list table 76, but moves to the judgment as to whether an unprocessed content (or content part) is present (S312). Here, a content for which such content part concatenation information 86 is not stored has not been recorded by the storage medium management apparatus of the present invention. Although such a content (or content part) is not entered into the program list table 76, it can be normally played back in compliance with the conventional DVD-VR format.

When the IT_TXT 313 stores the content part concatenation information 86 (S306:Yes), the table generating unit 61a obtains a value of the virtually-one-content ID information set in the content part concatenation information 86 for the processing target, and judges whether the program list table 76 includes a program whose virtually-one-content ID information has the same value as the obtained value (S307). When the program list table 76 does not include a program whose virtually-one-content ID information has the same value as the obtained value (S307:No), the table generating unit 61a enters a new program for which the items of information "program name", "virtually-one-content ID information", "reference content number" and "reference content ID information" are set in the following ways (i) to (iv), into the program list table 76. The table generating unit 61a then increments the program total number in the program list table 76 by one (S311).

(i) Program Name

A content name included in the content part management information 84 for the processing target is set as the program name.

(ii) Virtually-One-Content ID Information

Virtually-one-content ID information included in the content part concatenation information 86 for the processing target is set as the virtually-one-content ID information.

(iii) Reference Content Number

A value "1" is set as the reference content number.

(iv) Reference Content ID Information

Disk ID information included in the content part concatenation information 86 and content ID information included in the content part management information 84 for the processing target are set as the content ID information After updating the program list table 76 in this way, the table generating unit 61a moves to the judgment as to whether an unprocessed content (or content part) is present (S312).

When the program list table 76 includes a program whose virtually-one-content ID information has the same value as the obtained value (S307:Yes), the table generating unit 61a instructs the logical-concatenation judging unit 61b to judge whether the processing target can be logically concatenated together with other contents to construct a virtually-one-content.

Upon receipt of the instruction, the logical-concatenation judging unit 61b detects all programs whose virtually-one-content ID information is the same as that of the processing target, from the program list table 76. The logical-concatenation judging unit 61b then compares the number of the detected programs with the total division number set in the content part concatenation information 86 for the processing target. When the number of the detected programs is smaller than a value obtained by subtracting one from the total division number (S308:No), the logical-concatenation judging unit 61b notifies the table generating unit 61a of the judgment result as being negative.

When the number of the detected programs is equal to a value obtained by subtracting one from the total division number (S308:Yes), the logical-concatenation judging unit 61b further compares the content size at initial generation set in the content part concatenation information 86 for the processing target with the current size of the processing target. When the sizes do not match (S309:Yes), the logical-concatenation judging unit 61b judges that the processing target has been edited by a storage media management apparatus that does not have the same functions as those of the DVD/HDD recorder 300, and notifies the table generating unit 61a of the judgment result as being negative. When the sizes match (S309:No), the logical-concatenation judging unit 61b judges that the processing target has not been edited by a storage media management apparatus that does not have the same functions as those of the DVD/HDD recorder 300, and notifies the table generating unit 61a of the judgment result as being positive.

Upon receipt of the negative judgment result, the table generating unit 61a updates the program list table 76 by the above-described processing in S311, and then advances to the judgment as to whether an unprocessed content (or content part) is present (S312).

Upon receipt of the positive judgment result, the table generating unit 61a deletes all the programs whose virtually-one-content ID information is the same as the processing target, from the program list table 76. The table generating unit 61a enters a new program for which the items of information "program name", "virtually-one-content ID information", "reference content number" and "reference content ID information" are set in the following ways (i) to (iv), into the program list table 76. The table generating unit 61a then decrements the program total number in the program list table 76 by a value obtained by subtracting two from the total division number set in the content part concatenation information 86 for the processing target (S310).

(i) Program Name

A content whose virtually-one-content ID information is the same as that of the processing target and the sequence number in the content part concatenation information 86 is "0" is detected from a processed storage medium, and the content name included in the content part concatenation information 86 for the detected content is set as the program name.

(ii) Virtually-One-Content ID Information

Virtually-one-content ID information included in the content part concatenation information 86 for the processing target is set as the virtually-one-content ID information.

(iii) Reference Content Number

A value of the total division number included in the content part management information 84 for the processing target is set as the reference content number.

(iv) Reference Content ID Information

Content parts whose virtually-one-content ID information is the same as that of the processing target are detected, and Disk ID information included in the content part concatenation information 86 for each detected content part and content ID information included in the content part management information 84 for each detected content are set as the reference content ID information in the order of smaller values of the sequence number in the content part concatenation information 86.

After updating the program list table 76 in this way, the table generating unit 61a moves to the judgment as to whether an unprocessed content is present (S312), and processes contents the number of which is obtained in S303.

The table generating unit 61a repeats the processing from S302 to S312 on all storage media, and then ends the update of the program list table 76.

This is the end of description on the operation of the table editing unit 61 in the DVD/HDD recorder 300 for updating the program list table 76.

Here, the following describes a specific example where the program list table 76 is updated according to the above-described procedures.

Figure 39:
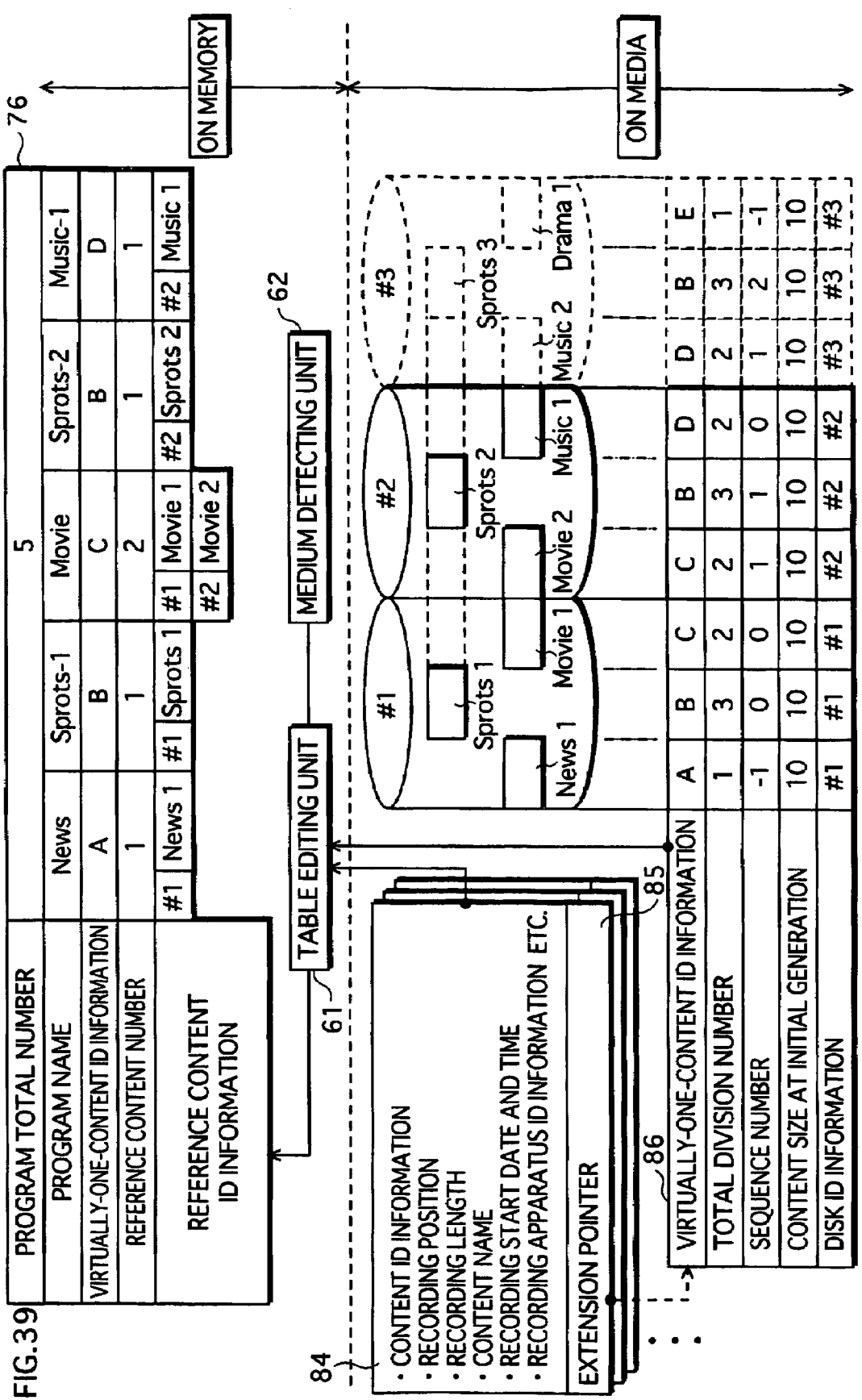
FIG. 39 schematically shows a program list table 76 that is updated when a storage medium is removed.

The following first describes, with reference to FIG. 39, the update of the program list table 76 when a storage medium with disk ID information #3 is removed from the DVD/HDD recorder that is in the state shown in FIG. 36.

The program "Sports" and the program "Music" included in the program list table 76 in FIG. 36 respectively have the content part "Sports 3" and the content part "Music 2" that are stored in the storage medium #3. Therefore, the program list table 76 shown in FIG. 39 includes the content parts "Sports 1", "Sports 2", and "Music 1" as the programs "Sports-1", "Sports-2", and "Music-1".

Also, the program "Drama" included in the program list table 76 in FIG. 36 has the content "Drama 1" stored in the storage medium #3. Therefore, the program "Drama" has been deleted in the updated program list table 76 shown in FIG. 39.

The program "News" has the corresponding content stored in the storage medium #1. The program "Movie" has the corresponding content parts stored in the storage mediums #1 and #2. Therefore, these programs remain in the updated program list table 76 shown in FIG. 39.

Figure 40:
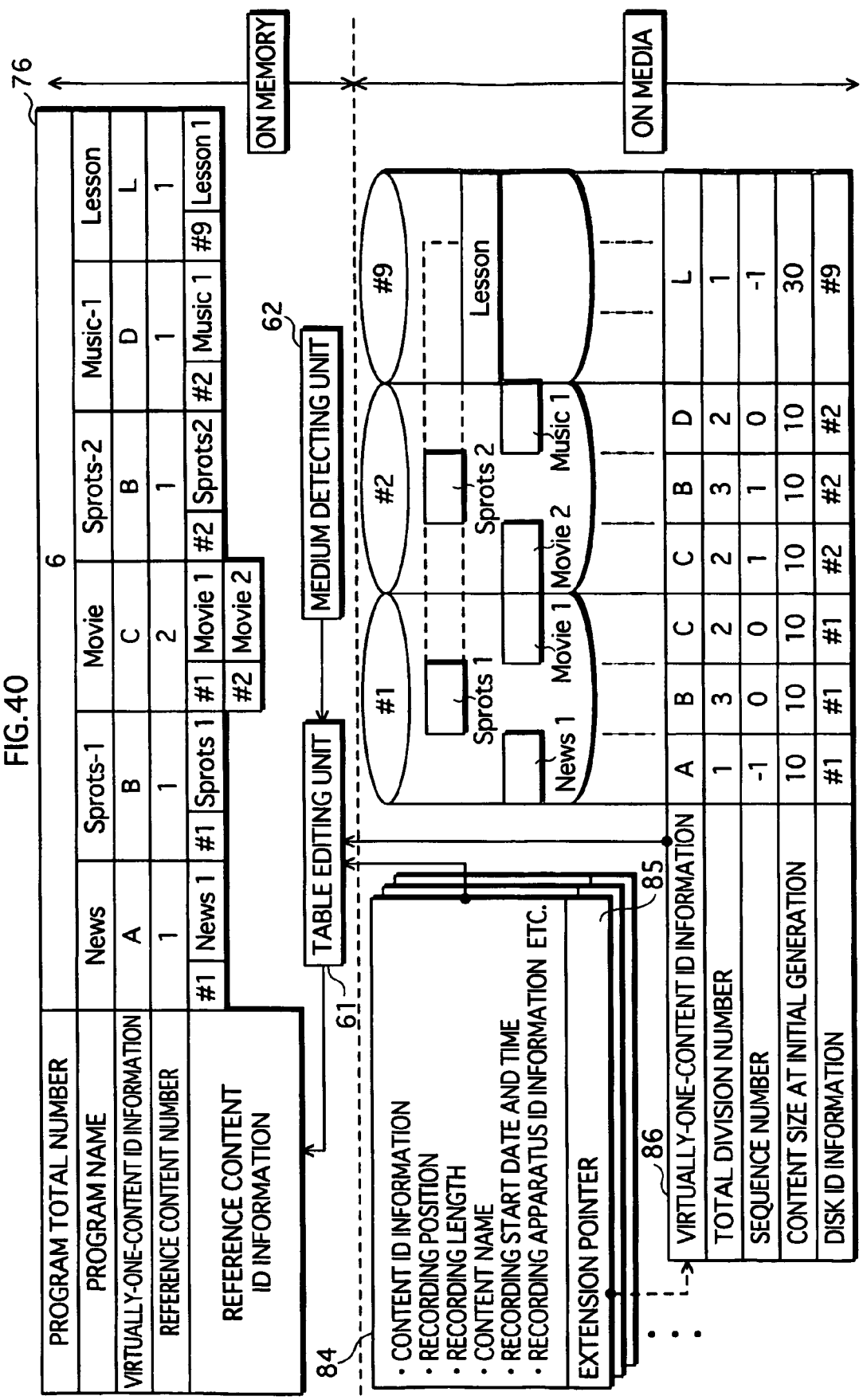
FIG. 40 schematically shows the program list table 76 updated when a storage medium is connected.

The following describes, with reference to FIG. 40, the update of the program list table 76 when a storage medium with disk ID information #9 is connected to the DVD/HDD recorder that is in the state shown in FIG. 39.

The storage medium #9 does not store a content whose virtually-one-content ID information is the same as that of the content (or content part) stored in the storage medium #1 and the storage medium #2. Therefore, the programs in the program list table 76 shown in FIG. 39 corresponding to the contents (or content parts) stored in the storage medium #1 and the storage medium #2 are included in the program list table 76 shown in FIG. 40 updated when the storage medium

9 is connected. Also, the content "Lesson" stored in the storage medium #9 is entered into the program list table 76 as the new program "Lesson".

Figure 41:
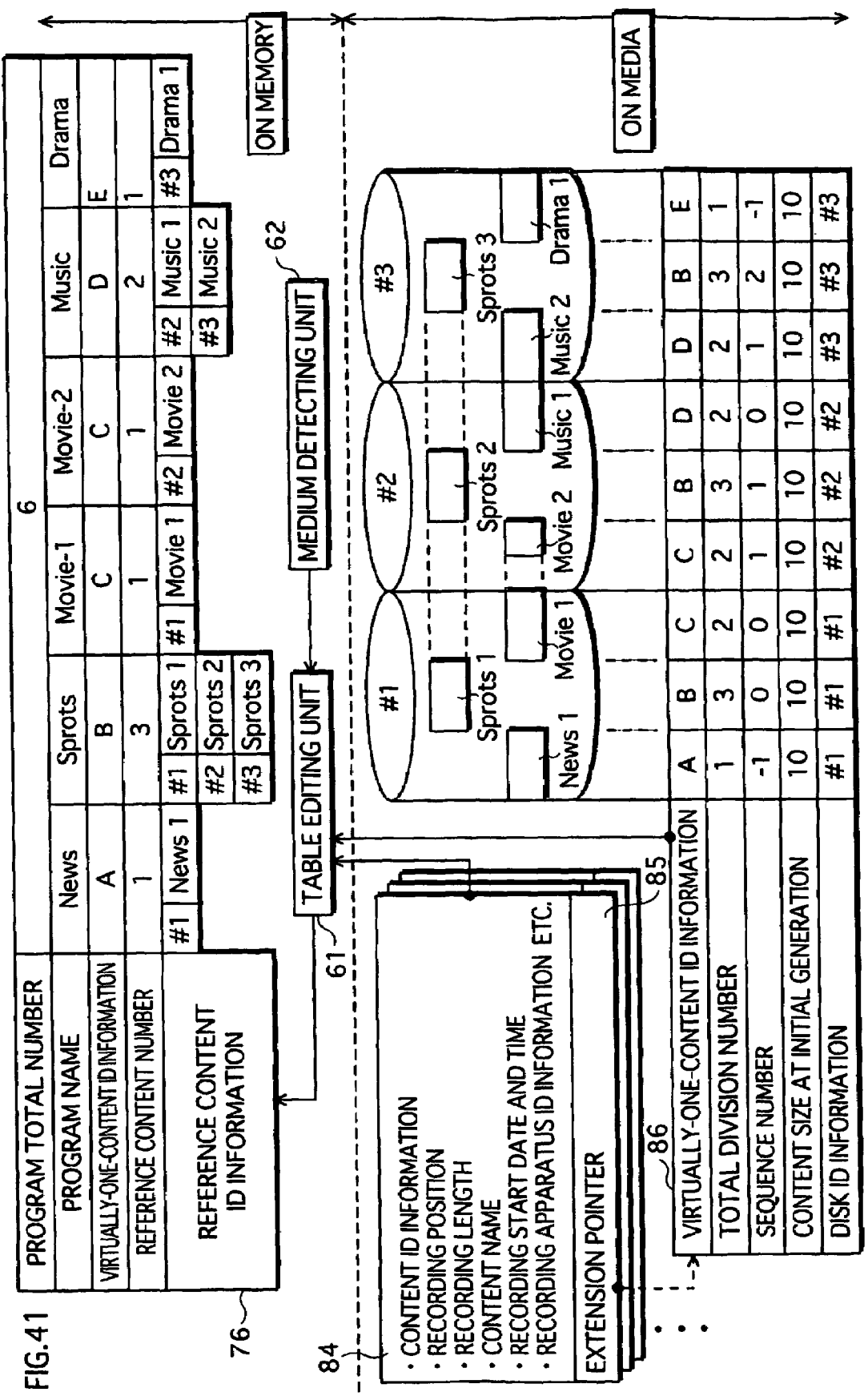
FIG. 41 schematically shows another example of the program list table 76 updated when a storage medium is connected.

The following describes, with reference to FIG. 41, the update of the program list table 76 when a storage medium with disk ID information #2 is removed, a content stored in the storage medium #2 is edited by another storage media management apparatus, and the storage medium #2 is again connected to the DVD/HDD recorder 300.

In the state shown in FIG. 36, the content size of the content part "Movie 2" is the value "10" of the content size at initial generation set in the content part concatenation information 86. The logical-concatenation judging unit 61b judges that this content part "Movie 2" and the content part "Movie 1" stored in the storage medium #1 can be logically concatenated. Therefore, the program "Movie" composed of the content part "Movie 1" and the content part "Movie 2" is entered into the program list table 76.

In the state shown in FIG. 41, the content part "Movie 2" has been edited, with its size being reduced. Because this content part has been edited by another storage media management apparatus, a value of the content size at initial generation remains to be "10". Therefore, the logical-concatenation judging unit 61b judges that the content part "Movie 2" cannot be logically concatenated with the Movie 1". Therefore, the content part "Movie 1" and the content part "Movie 2" are entered into the program list table 76 as individual programs.

This is the end of description on the specific example of the program list table 76 updated by the table editing unit 61.

<Modifications>

Although the present invention is described based on the first to third embodiments, the invention should not be limited to specific examples described above. For example, the following modifications are possible.

(1) The present invention may be a method including the processing procedures described in the first to third embodiments. Also, the present invention may be a computer program that realizes the method on a computer, or may be a digital signal represented by the computer program.

Also, the above computer program or the digital signal may be recorded on computer-readable storage media. Examples of computer-readable storage media include a flexible disk, a hard disk, a CD-ROM, an MO, a DVD, a DVD-ROM, a DVD-RAM, a BD (Blu-ray Disc), and a semiconductor memory.

Also, the above computer program or the digital signal may be transmitted via a electric communication line, a wireless/cable communication line, and a network such as the Internet.

Also, the present invention may be a computer system including a microprocessor and a memory. In this case, the memory may store the computer program, and the microprocessor may operate based on the computer program stored in the memory.

Also, the program or the digital signal may be transferred as being stored in the storage media, or via a network, so that the program or the digital signal may be executed on an independent computer system.

(2) The present invention may be a system LSI that executes a program realizing the processing procedures shown in the flowcharts described in the first to third embodiments, for controlling the storage media management apparatus. The system LSI is typically composed of a core CPU, a DSP (Digital Signal Processor), a DRAM (Dynamic RAM), and a flash memory. The system LSI may include an ASIC (Application Specific Integrated Circuit) instead of a DSP. The components may be provided as chips using such methods as SiP (System in Package) and SoC (System on Chip).

(3) Although the first to third embodiments describe the case where connection and removal of a storage medium can be performed at a freely-chosen timing, connection and removal of a storage medium may require an instruction by a GUI operation.

(4) Although the first to third embodiments describe the configuration of the storage media management apparatus where two storage media or three storage media are managed as one virtual drive, the number of storage media to be managed by the storage media management apparatus of the present invention should not be limited to such. The storage media management apparatus may manage three or more storage media as one virtual drive. Also, the storage media management apparatus may hold in its memory a plurality of pieces of information (program list tables etc.), to manage three or more storage media as two or more virtual drives.

(5) Although the first and second embodiments describe the configuration of the storage media management apparatus that always holds in its memory information necessary for managing a virtual drive (the virtual-drive management information, connected-drive management information table, content management information table, and program list table), the present invention should not be limited to such. For example, when the storage-media management apparatus has one storage medium connected thereto, the storage media management apparatus may not hold such information necessary for managing a virtual drive in its memory, but may newly generate necessary information when a storage medium is newly connected thereto.

(6) Although the first to third embodiments describe the case where storage media whose storage areas are to be managed are described as HDDs and DVD-RAMs, the features of the storage media management apparatus of the present invention should not be limited to physical properties of HDDs and DVD-RAM, but can be applied to any storage media that can store contents. Examples of storage medias to which the present invention can be applied include optical disks such as a BD-ROM, a DVD-ROM, a DVD–RW, a DVD–R, a DVD+RW, a DVD+R, a CD-R, a CD-RW, magneto-optical disks such as a PD and an MO, semiconductor memory cards such as a compact flash card, a Smartmedia, a memory stick, a multimedia card, and a PCM-CIA card, magnetic recording disks such as a flexible disk, a SuperDisk, a Zip, and a Click!, removable hard disk drives such as an ORB, a Jaz, a SparQ, a SyJet, an EZFley, and a Microdrive, and built-in hard disk drives.

Further, although the first to third embodiments describe a method for managing storage areas of a plurality of storage media using HDDs or using DVD-RAMs, the features of the storage media management apparatus of the present invention should not be limited to physical properties of the storage media, but can be applied to any combinations of storage media of different types that can store contents. For example, the present invention can be applied to a combination of an HDD and a DVD-RAM, or freely-chosen combinations of any storage media such as optical disks, magneto-optical disks, semiconductor memory cards, magnetic recording disks, removable hard disk drives and built-in hard disk drives.

(7) Although the above embodiments describe the case where the judgment as to whether a target content part has been edited is performed in the logical-concatenation judgment, using the recording start position and the recording length of the target content part in the first and second embodiments, and using the size of the target content part in the third embodiment, this judgment may be performed using other judgment criteria. For example, the content part concatenation information may additionally include the first and last images of each content part in the state where the content part can be concatenated with other content parts. This information can then be used to judge whether a target content part has been edited. When a storage medium storing a content part is newly connected, the judgment as to whether this content part has been edited is performed by comparing these first and last images included in the content part concatenation information, to see if these images match the content part stored in the newly connected storage medium. In this case, even when a content part has been edited by another storage media management apparatus, the edited content part may be concatenated with a preceding and following content parts and viewed as a virtually-one-content, if the first and last images of the edited content part are continuous to the preceding and following content parts respectively. Also, in such a case where a content is recorded onto a storage medium in compliance with the DVD-VR format, pieces of CELL information constituting a content playlist may be saved into content part concatenation information in the storage media management apparatus of the present invention, so that the judgment as to whether a content part has been edited can be performed more correctly when a storage medium storing the content part is newly connected.

(8) Although the third embodiment describes the case where the recording date and time of the first VOBU of a content is obtained as the recording start date and time in the corresponding content part management information 84, information about the date and time at which the recording of the content is started may be obtained by other methods as the recording start date and time of the content part management information 84. For example, the recording date and time included in bit rate information of the content stored in the IT_TXT 313 in compliance with the DVD-VR format may be obtained as the recording start date and time of the content part management information 84.

Figure 42:
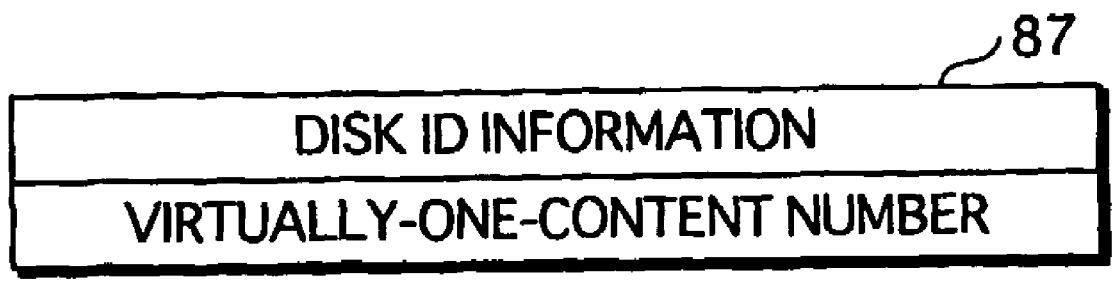
FIG. 42 shows a data structure of virtually-one-content disk information relating to a modification of the present invention.

(9) Although the third embodiment describes the case where the manufacture's serial number for a storage medium storing a content is used as the disk ID information in the content part concatenation information 86, any information uniquely identifying each storage medium may be used as the disk ID information. For example, a value obtained by concatenating (a) a serial number of the storage medium given when the storage medium is formatted by the DVD/HDD recorder 300 and (b) a manufacture's serial number of the DVD/HDD recorder 300 may be used as the disk ID information, and the virtually-one-content disk information 87 using this disk ID information shown in FIG. 42 may be generated and stored in the storage medium. Due to this, a storage medium can be thereafter uniquely identified by setting a value of the disk ID information in the virtually-one-content disk information 87 as the disk ID information in the virtually-one-content drive information 86. It should be noted here that information stored in the storage area is usually deleted and management information of the storage medium is usually initialized when the storage medium is formatted. In the case of the disk ID information of the virtually-one-content drive information 87, however, a value given to the storage medium storing the virtually-one-content disk information 87 when the storage medium is firstly formatted may not be deleted at the subsequent formatting, but may be used thereafter.

Although the third embodiment describes the case where a value obtained by concatenating the recording apparatus ID information and the recording start date and time included in the content part management information 84 corresponding to a content part that is the start of a virtually-one-content is used as the virtually-one-content ID information, any information that can uniquely identify the original content before being divided can be used as the virtually-one-content ID information in the content part concatenation information 86. For example, the number of virtually-one contents each of which is recorded as being divided into a plurality of storage media in the DVD/HDD recorder 300 may be held as the number of virtually-one-contents included in the virtually-one-content disk information of each storage medium. In this case, the virtually-one-content disk information 87 may be read from a storage medium storing a content part that is the start of the virtually-one-content, and a value obtained by concatenating (a) the disk ID information and (b) a serial number of the virtually-one-content that is a value obtained by adding one to the number of virtually-one-content may be used as the disk ID information in the content part concatenation information 86 of the newly recorded content.

(10) The first to third embodiments and the modifications may be freely combined.

INDUSTRIAL APPLICATION

The present invention can be applied to a storage media management apparatus to which a plurality of removable storage media can be connected, and that uses such removable storage media for recording broadcast of long hours etc. The present invention can also be applied to a storage media management method etc., using a plurality of removable storage media for recording broadcast of long hours etc.

The invention claimed is:

1. A storage media management apparatus to and from which a plurality of storage media are to be connected and disconnected, comprising:
   a dividing unit operable to divide a content into a plurality of content parts;
   a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable;
   a writing unit operable to write each content part together with a corresponding piece of management information, to a different one of the storage media;
   a reading unit operable to read the pieces of management information from storage media that have been connected;
   a reconstruction judging unit operable, when a content part stored in one of the storage media is to be used, (a) to judge that the content is to be reconstructed and made usable when the reading unit succeeds in reading all of the pieces of management information, and (b) to judge that the content parts are to be individually made usable, when the reading unit fails to read any of the pieces of management information; and
   a program information generating unit operable (a) to generate, based on reconstruction information included in each piece of management information read by the reading unit, reconstruction program information for presenting the content as one program, when the reconstruction judging unit judges that the content is to be reconstructed and made usable, and (b) to generate, for each piece of management information read by the reading unit, individual program information for presenting a corresponding content part as an individual program, when the reconstruction judging unit judges that the content parts are to be individually made usable.

2. A storage media management apparatus to and from which a plurality of storage media are to be connected and disconnected, comprising:
- a dividing unit operable to divide a content into a plurality of content parts;
- a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable;
- a writing unit operable to write each content part together with a corresponding piece of management information, to a different one of the storage media;
- a reading unit operable to read the pieces of management information from storage media that have been connected;
- a reconstruction judging unit operable, when a content part stored in one of the storage media is to be used, (a) to judge that the content is to be reconstructed and made usable when the reading unit succeeds in reading all of the pieces of management information, and (b) to judge that the content parts are to be individually made usable, when the reading unit fails to read any of the pieces of management information; and
- a program information generating unit operable (a) to generate, based on reconstruction information included in each piece of management information read by the reading unit, reconstruction program information for presenting the content as one program, when the reconstruction judging unit judges that the content is to be reconstructed and made usable, and (b) to not generate the reconstruction program information, when the reconstruction judging unit judges that the content parts are to be individually made usable.

3. A storage media management apparatus to and from which a plurality of storage media are to be connected and disconnected, comprising:
- a dividing unit operable to divide a content into a plurality of content parts;
- a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable;
- a writing unit operable to write each content part together with a corresponding piece of management information, to a different one of the storage media;
- a reading unit operable to read the pieces of management information from storage media that have been connected;
- a reconstruction judging unit operable, when a content part stored in one of the storage media is to be used, to judge whether the content is to be reconstructed and made usable, or the content parts are to be individually made useable, based on the piece of management information stored in each storage medium; and
- a program information generating unit operable (a) to generate, based on reconstruction information included in each piece of management information read by the reading unit, reconstruction program information for presenting the content as one program, when the reconstruction judging unit judges that the content is to be reconstructed and made usable, and (b) to generate, for each piece of management information read by the reading unit, individual program information for presenting a corresponding content part as an individual program, when the reconstruction judging unit judges that the content parts are to be individually made usable;

wherein
each piece of management information includes alteration information indicating whether a corresponding content part has been altered in a disconnected-state, which is a state in which a storage medium storing the corresponding content part was disconnected,
the reconstruction judging unit judges that the content parts are to be individually made usable, when alteration information included in any of the pieces of management information read by the reading unit indicates that a corresponding content part has been altered in the disconnected-state, and
the program information generating unit generates, for each piece of management information read by the reading unit, individual program information for presenting a corresponding content part as an individual program, when the reconstruction judging unit judges that the content parts are to be individually made usable.

4. The storage media management apparatus of claim 3, wherein
the alteration information includes (a) initial-state information that is a part of the reconstruction information and indicates an initial state of a corresponding content part and (b) current-state information that is a part of the individual information and indicates a current state of the corresponding content part, and
the initial-state information matching the current-state information indicates that the corresponding content part has not been altered in the disconnected-state, and the initial-state information not matching the current-state information indicates that the corresponding content part has been altered in the disconnected-state.

5. A storage media management apparatus to and from which a plurality of storage media are to be connected and disconnected, comprising:
- a dividing unit operable to divide a content into a plurality of content parts;
- a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable;
- a writing unit operable to write each content part together with a corresponding piece of management information, to a different one of the storage media;
- a reading unit operable to read the pieces of management information from storage media that have been connected;
- a reconstruction judging unit operable, when a content part stored in one of the storage media is to be used, to judge whether the content is to be reconstructed and made usable, or the content parts are to be individually made useable, based on the piece of management information stored in each storage medium; and a program information generating unit operable (a) to generate, based on reconstruction information included in each piece of management information read by the reading unit, reconstruction program information for presenting the content as one program, when the reconstruction judging unit judges that the content is to be reconstructed and made usable, and (b) to generate, for each piece of management information read by the reading unit, individual program information for presenting a corresponding content part as an individual program, when the reconstruction judging unit judges that the content parts are to be individually made usable; wherein each piece of management information includes alteration information indicating whether a corresponding content part has been altered in a disconnected-state, which is a state in which a storage medium storing the corresponding content part was disconnected, the reconstruction judging unit judges that the content parts are to be individually made usable, when alteration information included in any of the pieces of management information read by the reading unit indicates that a corresponding content part has been altered in the disconnected-state, and the program information generating unit does not generate the reconstruction program information, when the reconstruction judging unit judges that the content parts are to be individually made usable.

6. The storage media management apparatus of claim 5, wherein the alteration information includes (a) initial-state information that is a part of the reconstruction information and indicates an initial state of a corresponding content part and (b) current-state information that is a part of the individual information and indicates a current state of the corresponding content part, and the initial-state information matching the current-state information indicates that the corresponding content part has not been altered in the disconnected-state, and the initial-state information not matching the current-state information indicates that the corresponding content part has been altered in the disconnected-state.

7. A storage media management apparatus to and from which a plurality of storage media are to be connected and disconnected, comprising:

a dividing unit operable to divide a content into a plurality of content parts;

a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable, each piece of management information including total number information indicating a total number of the content parts;

a writing unit operable to write each content part together with a corresponding piece of management information, to a different one of the storage media;

a reading unit operable to read the pieces of management information from storage media that have been connected;

a reconstruction judging unit operable, when a content part stored in one of the storage media is to be used, to judge whether the content is to be reconstructed and made usable, or the content parts are to be individually made useable, based on the piece of management information stored in each storage medium;

a program information generating unit operable to generate, based on reconstruction information included in each piece of management information read by the reading unit, reconstruction program information for presenting the content as one program, when the reconstruction judging unit judges that the content is to be reconstructed and made usable;

a presenting unit operable to present the content as being usable, when the program information generating unit generates the reconstruction program information for presenting the content; and a usable proportion presenting unit operable to present a proportion of (a) content parts stored in storage media that have been connected and (b) content parts not stored in the storage media that have been connected, among all the content parts a number of which is equal to the total number indicated by the total number information.

8. A storage media management apparatus to and from which a plurality of storage media are to be connected and disconnected, comprising:

a dividing unit operable to divide a content into a plurality of content parts;

a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing unit operable to write each content part together with a corresponding piece of management information, to a different one of the storage media;

a reconstruction judging unit operable, when a content part stored in one of the storage media is to be used, to judge whether the content is to be reconstructed and made usable, or the content parts are to be individually made usable, based on the piece of management information stored in each storage medium, wherein each piece of management information includes presetting-condition information indicating a condition of presetting on which writing of a corresponding content part is based, the writing unit includes a same-condition detecting unit operable to detect, when the content is written based on presetting, a same-type content whose presetting-condition information indicates a same condition of presetting as indicated by presetting-condition information corresponding to the content, and the writing unit writes one of the content parts to a storage medium storing the same-type content detected by the same-condition detecting unit when the dividing unit divides the content, and writes the content to the storage medium storing the same-type content detected by the same-type detecting unit when the dividing unit does not divide the content.

9. A storage media management apparatus to and from which a plurality of storage media are to be connected and disconnected, comprising:

a dividing unit operable to divide a content into a plurality of content parts;

a management information generating unit operable to generate a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing unit operable to write each content part together with a corresponding piece of management information, to a different one of the storage media;

a reconstruction judging unit operable, when a content part stored in one of the storage media is to be used, to judge whether the content is to be reconstructed and made usable, or the content parts are to be individually made usable, based on the piece of management information stored in each storage medium;

an available area judging unit operable to judge whether both of a first storage medium and a second storage medium have unused storage areas; and an available area adjusting unit operable to, when both of the first storage medium and the second storage medium have unused storage areas and both of the first storage medium and the second storage medium respectively store two of the content parts, move one content part stored in one of the first storage medium and the second storage medium to another one of the first storage medium and the second storage medium.

10. A storage media management method for use in a storage media management apparatus to and from which a plurality of storage media are to be connected and disconnected, the method comprising:

a dividing step of dividing a content into a plurality of content parts;

a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing step of writing each content part together with a corresponding piece of management information, to a different one of storage media;

a reading step of reading the pieces of management information from storage media that have been connected to the storage media management apparatus;

a reconstruction judging step of, when a content part stored in one of the storage media is to be used, (a) judging that the content is to be reconstructed and made usable when the reading step succeeds in reading all of the pieces of management information, and (b) judging that the content parts are to be individually made usable when the reading step fails to read any of the pieces of management information; and a program information generating step of (a) generating, based on reconstruction information included in each piece of management information read in the reading step, reconstruction program information for presenting the content as one program, when a judgment result in the reconstruction judging step shows that the content is to be reconstructed and made usable, and (b)generating, for each piece of management information read by the reading step, individual program information for presenting a corresponding content part as an individual program, when the reconstruction judging step judges that the content parts are to be individually made usable.

11. A storage media management method for use in a storage media management apparatus to and from which a plurality of storage media are to be connected and disconnected, the method comprising:

a dividing step of dividing a content into a plurality of content parts;

a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing step of writing each content part together with a corresponding piece of management information, to a different one of storage media;

a reading step of reading the pieces of management information from storage media that have been connected to the storage media management apparatus;

a reconstruction judging step of, when a content part stored in one of the storage media is to be used, (a) judging that the content is to be reconstructed and made usable when the reading step succeeds in reading all of the pieces of management information, and (b) judging that the content parts are to be individually made usable when the reading step fails to read any of the pieces of management information; and a program information generating step of (a) generating, based on reconstruction information included in each piece of management information read in the reading step, reconstruction program information for presenting the content as one program, when the reconstruction judging step judges that the content is to be reconstructed and made usable, and (b)not generating the reconstruction program information, when the reconstruction judging step judges that the content parts are to be individually made usable.

12. A storage media management method for use in a storage media management apparatus to and from which a plurality of storage media are to be connected and disconnected, the method comprising:

a dividing step of dividing a content into a plurality of content parts;

a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing step of writing each content part together with a corresponding piece of management information, to a different one of storage media;

a reading step of reading the pieces of management information from storage media that have been connected to the storage media management apparatus;

a reconstruction judging step of, when a content part stored in one of the storage media is to be used, judging whether the content is to be reconstructed and made usable, or the content parts are to be individually made usable, based on the piece of management information stored in each storage medium; and a program information generating step of (a) generating, based on reconstruction information included in each piece of management information read in the reading step, reconstruction program information for presenting the content as one program, when a judgment result in the reconstruction judging step shows that the content is to be reconstructed and made usable, and (b)generating, for each piece of management information read by the reading step, individual program information for presenting a corresponding content part as an individual program, when the reconstruction judging step judges that the content parts are to be individually made usable, wherein each piece of management information includes alteration information indicating whether a corresponding content part has been altered in a disconnected-state, which is a state in which a storage medium storing the corresponding content part was disconnected from the storage media management apparatus, a judgment result in the reconstruction judging step shows that the content parts are to be individually made usable, when alteration information included in any of the pieces of management information read in the reading step indicates that a corresponding content part has been altered in the disconnected-state, and in the program information generating step, individual program information for presenting a corresponding content part as an individual program is generated for each piece of management information read in the reading step, when a judgment result in the reconstruction judging step shows that the content parts are to be individually made usable.

13. The storage media management method of claim 12, wherein the alteration information includes (a) initial-state information that is a part of the reconstruction information and indicates an initial state of a corresponding content part and (b) current-state information that is a part of the individual information and indicates a current state of the corresponding content part, and the initial-state information matching the current-state information indicates that the corresponding content part has not been altered in the disconnected-state, and the initial-state information not matching the current-state information indicates that the corresponding content part has been altered in the disconnected-state.

14. A storage media management method for use in a storage media management apparatus to and from which a plurality of storage media are to be connected and disconnected, the method comprising:

a dividing step of dividing a content into a plurality of content parts;

a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing step of writing each content part together with a corresponding piece of management information, to a different one of storage media;

a reading step of reading the pieces of management information from storage media that have been connected to the storage media management apparatus;

a reconstruction judging step of, when a content part stored in one of the storage media is to be used, judging whether the content is to be reconstructed and made usable, or the content parts are to be individually made usable, based on the piece of management information stored in each storage medium; and a program information generating step of (a) generating, based on reconstruction information included in each piece of management information read in the reading step, reconstruction program information for presenting the content as one program, when the reconstruction judging step judges that the content is to be reconstructed and made usable, and (b)not generating the reconstruction program information, when the reconstruction judging step judges that the content parts are to be individually made usable, wherein each piece of management information includes alteration information indicating whether a corresponding content part has been altered in a disconnected-state, which is a state in which a storage medium storing the corresponding content part was disconnected from the storage media management apparatus, and the reconstruction judging step judges that the content parts are to be individually made usable, when alteration information included in any of the pieces of management information read in the reading step indicates that a corresponding content part has been altered in the disconnected-state.

15. The storage media management method of claim 14, wherein the alteration information includes (a) initial-state information that is a part of the reconstruction information and indicates an initial state of a corresponding content part and (b) current-state information that is a part of the reconstruction information and indicates a current state of the corresponding content part, and the initial-state information matching the current-state information indicates that the corresponding content part has not been altered in the disconnected-state, and the initial-state information not matching the current-state information indicates that the corresponding content part has been altered in the disconnected-state.

16. A storage media management method for use in a storage media management apparatus to and from which a plurality of storage media are to be connected and disconnected, the method comprising:

a dividing step of dividing a content into a plurality of content parts;

a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable, each piece of management information including total number information indicating a total number of the content parts;

a writing step of writing each content part together with a corresponding piece of management information, to a different one of storage media;

a reading step of reading the pieces of management information from storage media that have been connected to the storage media management apparatus;

a reconstruction judging step of, when a content part stored in one of the storage media is to be used, judging whether the content is to be reconstructed and made usable, or the content parts are to be individually made usable, based on the piece of management information stored in each storage medium;

a program information generating step of generating, based on reconstruction information included in each piece of management information read in the reading step, reconstruction program information for presenting the content as one program, when the reconstruction judging step judges that the content is to be reconstructed and made usable;

a presenting step of presenting the content as being usable, when the program information generating step generates the reconstruction program information for presenting the content; and a usable proportion presenting step of presenting, a proportion of (a) content parts stored in storage media that have been connected to the storage media management apparatus and (b) content parts not stored in the storage media that have been connected to the storage media management apparatus, among all the content parts a number of which is equal to the total number indicated by the total number information.

17. A storage media management method for use in a storage media management apparatus to and from which a plurality of storage media are to be connected and disconnected, the method comprising:

a dividing step of dividing a content into a plurality of content parts;

a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing step of writing each content part together with a corresponding piece of management information, to a different one of storage media;

a reconstruction judging step of, when a content part stored in one of the storage media is to be used, judging whether the content is to be reconstructed and made usable, or the content parts are to be individually made usable, based on the piece of management information stored in each storage medium, wherein each piece of management information includes presetting-condition information indicating a condition of presetting on which writing of a corresponding content part is based, and the writing unit includes:

a same-condition detecting substep of detecting, when the content is written based on presetting, a same-type content whose presetting-condition information indicates a same condition of presetting as indicated by presetting-condition information corresponding to the content; and a same-condition writing substep of writing one of the content parts to a storage medium storing the same-type content detected in the same-condition detecting substep when the content is divided in the dividing step, and writing the content to the storage medium storing the same-type content detected in the same-type detecting substep when the content is not divided in the dividing step.

18. A storage media management method for use in a storage media management apparatus to and from which a plurality of storage media are to be connected and disconnected, the method comprising:

a dividing step of dividing a content into a plurality of content parts;

a management information generating step of generating a plurality of pieces of management information in correspondence to the content parts, each piece of management information including (a) reconstruction information for reconstructing the content by concatenating a corresponding content part with the other content parts, and (b) individual information for making the corresponding content part individually usable;

a writing step of writing each content part together with a corresponding piece of management information, to a different one of storage media;

a reconstruction judging step of, when a content part stored in one of the storage media is to be used, judging whether the content is to be reconstructed and made usable, or the content parts are to be individually made usable, based on the piece of management information stored in each storage medium;

an available area judging step of judging whether both of a first storage medium and a second storage medium have unused storage areas; and an available area adjusting step of, when both of the first storage medium and the second storage medium have unused storage areas and both of the first storage medium and the second storage medium respectively store two of the content parts, moving one content part stored in one of the first storage medium and the second storage medium to another one of the first storage medium and the second storage medium.

* * * * *